US012372803B2

(12) United States Patent
Ryu

(10) Patent No.: US 12,372,803 B2
(45) Date of Patent: Jul. 29, 2025

(54) DISPLAY DEVICE

(71) Applicant: LG ELECTRONICS INC., Seoul (KR)

(72) Inventor: Hyungsuk Ryu, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/922,752

(22) PCT Filed: Jul. 28, 2022

(86) PCT No.: PCT/KR2022/011147

§ 371 (c)(1),
(2) Date: Nov. 1, 2022

(87) PCT Pub. No.: WO2023/113135

PCT Pub. Date: Jun. 22, 2023

(65) Prior Publication Data

US 2024/0295748 A1 Sep. 5, 2024

Related U.S. Application Data

(60) Provisional application No. 63/290,676, filed on Dec. 17, 2021.

(51) Int. Cl.
*G02B 30/56* (2020.01)
*G02B 27/09* (2006.01)

(52) U.S. Cl.
CPC ......... *G02B 30/56* (2020.01); *G02B 27/0983* (2013.01)

(58) Field of Classification Search
CPC ..... G02B 30/56; G02B 30/10; G02B 27/0983
See application file for complete search history.

(56) References Cited

U.S. PATENT DOCUMENTS

2001/0036025 A1* 11/2001 Holden .................. G02B 30/56 359/859
2016/0009233 A1 1/2016 Lund

FOREIGN PATENT DOCUMENTS

| | | | |
|---|---|---|---|
| JP | 6698990 | B2 | 5/2020 |
| KR | 10-0219602 | B1 | 9/1999 |
| KR | 10-0697343 | B1 | 3/2007 |
| KR | 10-0910393 | B1 | 8/2009 |
| KR | 10-2019-0097370 | A | 8/2019 |
| KR | 10-2019-0126892 | A | 11/2019 |

(Continued)

*Primary Examiner* — Ryan D Howard

(74) *Attorney, Agent, or Firm* — Birch, Stewart, Kolasch & Birch, LLP

(57) ABSTRACT

A display device can include a case having an opening; a first optical mirror disposed on a first side within the case; a second optical mirror disposed on a second side within the case and located under the first optical mirror; and an image display unit disposed on a third side within the case and having a plurality of surfaces for outputting images. Also, the first optical mirror and the second optical mirror are configured to reflect the images output by the plurality of the surfaces of the image display unit and merge the images together to display a combined image at a space located between the opening and a viewer. Also, a second distance between the second optical mirror and the image display unit is proportional to a first distance between the first optical mirror and the second optical mirror for displaying the combined image at a predetermined height.

21 Claims, 55 Drawing Sheets

1800
1730
1740
OPb
d2
CSE
d1
OPa
1710
1700
d3
1720

(56) References Cited

FOREIGN PATENT DOCUMENTS

| | | | |
|---|---|---|---|
| KR | 10-2021-0143385 | A | 11/2021 |
| WO | WO 2016/088683 | A1 | 6/2016 |

* cited by examiner (a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

(a)

(b)

SOLID OBJECT TWO DISPLAY ONE DISPLAY

SOLID OBJECT TWO DISPLAY ONE DISPLAY (a)

(b)

(a)

(b)

SOLID OBJECT TWO DISPLAY ONE DISPLAY (c)

SOLID OBJECT TWO DISPLAY ONE DISPLAY (a)

(b)

(c)

DISPLAY DEVICE

CROSS-REFERENCE TO RELATED APPLICATIONS

This application is the National Stage filing under 35 U.S.C. 371 of International Application No. PCT/KR2022/011147, filed in the Republic of Korea on Jul. 28, 2022, which claims priority to U.S. Provisional Application No. 63/290,676 filed Dec. 17, 2021, and all these applications are hereby incorporated by reference herein in their entireties.

BACKGROUND

Technical Field

The present disclosure relates to a display device, and more particularly, to a display device capable of improving a viewing angle for displaying a floating image.

Discussion of the Related Art

A floating display device is a device that displays a floating image using an optical mirror.

Korean Registration Patent Application No. 10-0219602 (hereinafter, referred to as Prior Art Document 1) relates to a stereoscopic image display switch, and discloses displaying of a floating image using a reflector.

However, according to Prior Art Document 1, since the reflector uses a symmetrical parabolic optical surface, there are disadvantages of a narrow viewing angle and a considerable volume.

Korean Registration Patent Application No. 10-0697343 (hereinafter, referred to as Prior Art Document 2) relates to a multi-viewpoint projection apparatus and an image production apparatus using the same, and discloses displaying of a floating image using two concave mirrors.

However, according to Prior Art Document 2, since the two concave mirrors use a symmetrical parabolic optical surface, there are disadvantages of a narrow viewing angle and a considerable volume. In particular, it is disadvantageous that an internal concave mirror must increase in size.

As the size of the concave mirror increases, the probability that an upper image and a lower image of a floating image of an object have different magnifications or are distorted increases.

SUMMARY OF THE DISCLOSURE

Technical Problem

One aspect of the present disclosure is to provide a display device capable of improving a viewing angle for displaying a floating image.

Another aspect of the present disclosure is to provide a display device capable of displaying a floating image by reducing a size of the floating image.

Still another aspect of the present disclosure is to provide a display device capable of increasing a size of a floating image.

Still another aspect of the present disclosure is to provide a display device capable of increasing a size of a floating image by using a freeform optical mirror.

Still another aspect of the present disclosure is to provide a display device capable of generating a floating image by merging (or synthesizing) a plurality of images.

Still another aspect of the present disclosure is to provide a display device capable of outputting a floating image optimized according to a type of an external device.

Solution to Problem

A display device according to an implementation to achieve the above aspects and other advantages can include a case having an opening, a first optical mirror disposed on a first side in the case, a second optical mirror disposed on a second side of the case and located under the first optical mirror, and an image display unit disposed on a third side of the case and having a plurality of surfaces for outputting images. The images output to the plurality of surfaces can be reflected by the first optical mirror and the second optical mirror and merged with each other to be displayed in a space between the opening and a viewer.

In an implementation, the images output to the plurality of surfaces can be merged into a state of floating at a predetermined height from the opening of the case, to be output as a floating image.

In an embodiment, the plurality of surfaces can include a first display and a second display. A first image can be output to the first display and a second image can be output to the second display. The first image and the second image can be merged in a space floating by a predetermined height from the opening to produce a floating image.

In an implementation, the first image output to the first display can be an image in which perspective is reflected, and the second image output to the second display can be an image representing a background of the first image.

In an implementation, the case can be configured such that at least one of a size and a type thereof varies depending on a type of the image display unit.

In an implementation, the image display unit can include at least one of an object, a multi-display having a plurality of surfaces, and a single display having one surface.

In one implementation, the case can increase in size as the image display unit increases in size.

In one implementation, a height from the opening through which the images output to the plurality of surfaces is output can increase in proportion to a distance between the first optical mirror and the second optical mirror.

In one implementation, a height from the opening through which the images output to the plurality of surfaces are output can become higher as curvatures of the first optical mirror and the second optical mirror vary, even though the distance between the first optical mirror and the second optical mirror is maintained.

In one implementation, a second distance between the second optical mirror and the image display unit for outputting the images output to the plurality of surfaces at a predetermined height from the opening can be proportional to a first distance between the first optical mirror and the second optical mirror.

In one implementation, the second distance can be reduced, compared to the same first distance, based on changes in curvatures of the first optical mirror and the second optical mirror.

In an implementation, the display device can be disposed in or on at least one of a vehicle and a home appliance.

In one implementation, a type of the image display unit can be determined based on the at least one of the vehicle and the home appliance on which the display device is mounted.

Advantageous Effects of Invention

According to the present disclosure, a noble display device capable of outputting a three-dimensional image in the air by generating a floating image using a plurality of images can be provided, while reducing a size of the display device.

According to the present disclosure, a floating image with an optimized size can be provided according to an external device to which the display device according to the present disclosure is applied.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with aspects of the disclosure.

It is to be understood that both the foregoing general description and the following detailed description of the present disclosure are explanatory and are intended to provide further explanation of the disclosure as claimed.

BRIEF DESCRIPTION OF THE DRAWINGS

The accompanying drawings, which are included to provide a further understanding of the disclosure and are incorporated in and constitute a part of this application, illustrate aspects and embodiments of the disclosure and together with the description serve to explain principles of the disclosure.

DETAILED DESCRIPTION OF THE EMBODIMENTS

Figure 1A:
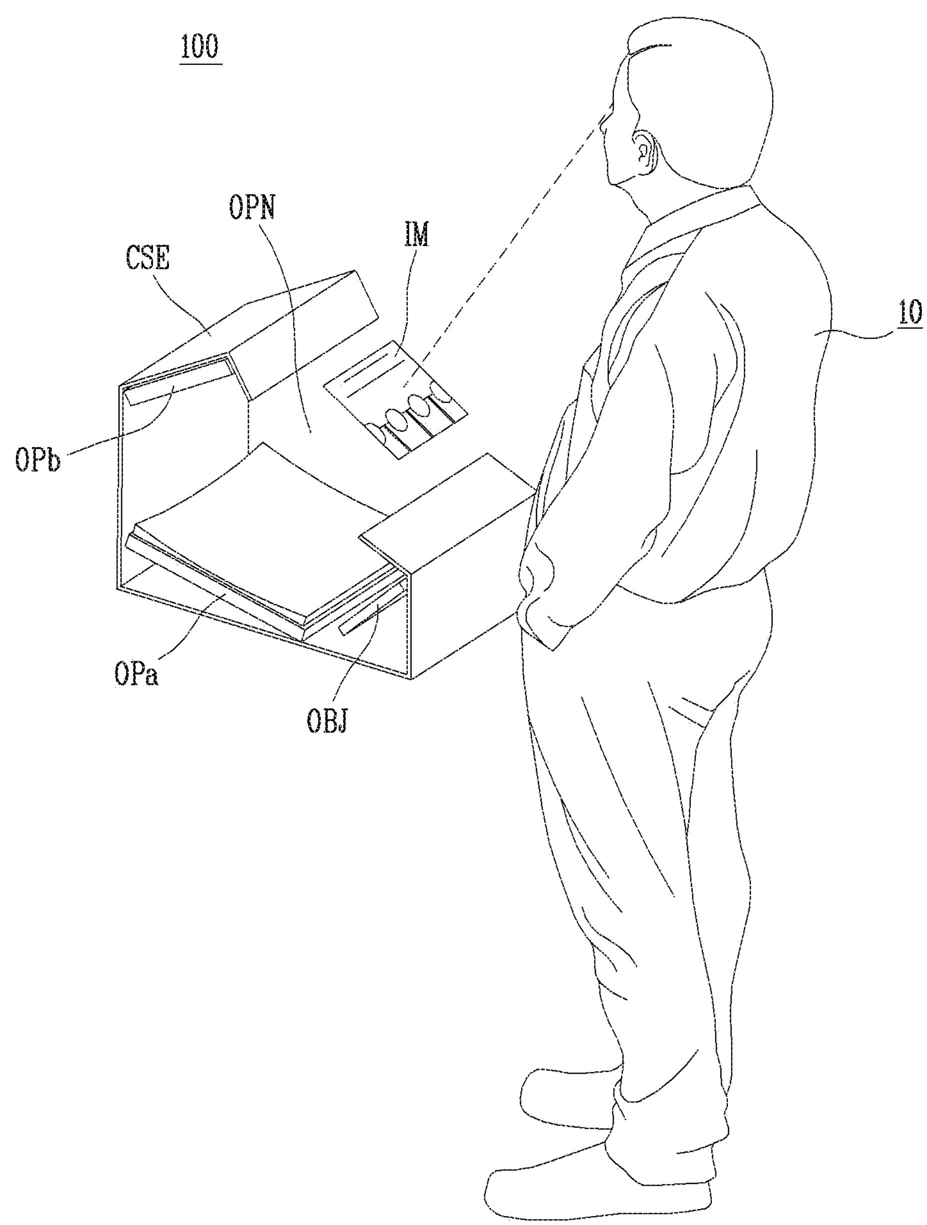
FIG. 1A is a view illustrating appearance of a display device according to an embodiment of the present disclosure.

Hereinafter, the present disclosure will be described in detail with reference to the drawings. In the drawings, in order to clearly and briefly describe the present disclosure, the illustration of parts irrelevant to the description is omitted, and the same reference numerals are used for the same or extremely similar parts throughout the specification.

Terms such as "include" or "has" are used herein and should be understood that they are intended to indicate an existence of several components, functions or steps, disclosed in the specification, and it is also understood that greater or fewer components, functions, or steps can likewise be utilized.

Also, in this specification, terms such as first and second can be used to describe various elements, but these elements are not limited by these terms. These terms are only used to distinguish one element from another.

Figure 1B:
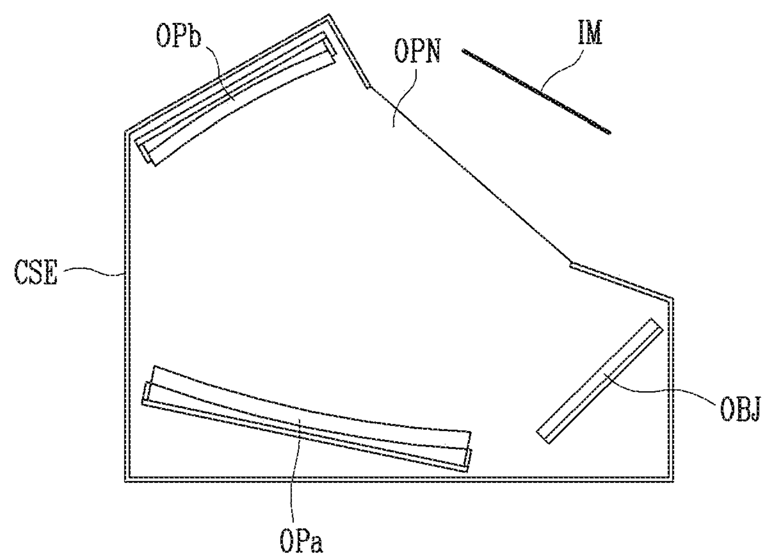
FIG. 1B is a lateral view of the display device of FIG. 1A according to an embodiment of the present disclosure.

FIG. 1A is a view illustrating appearance of a display device in accordance with an embodiment of the present disclosure, and FIG. 1B is a lateral view of the display device of FIG. 1A.

Referring to these drawings, a display device 100 according to an implementation is a device that displays a floating image IM for a viewer (observer) 10.

In this situation, the floating image IM can be an image that is displayed in the air using internal optical mirrors OPa and OPb, rather than being displayed on a display panel or the like.

To this end, the display device 100 according to the implementation includes a case CSE having an opening OPN, a first optical mirror OPb disposed on a first side (e.g., upper rear side) within the case CSE, and a second optical mirror OPa disposed on a second side (e.g., lower rear side) within the case CSE and located under the first optical mirror OPb.

Meanwhile, light from an object (article) OBJ can be reflected by the first optical mirror OPb, and the light from the first optical mirror OPb can be reflected by the second optical mirror OPa to pass through the opening OPN.

Meanwhile, a curved surface is formed on the first optical mirror OPb in the display device 100 according to the one implementation, and a residual, which is a difference between the curved surface and a parabolic surface of the first optical mirror OPb, is asymmetrical at both ends of the first optical mirror OPb. This can improve a viewing angle when displaying the floating image IM. This can also reduce a size of the display device 100.

In addition, a size of the floating image IM can be made larger. In particular, the size of the floating image IM can be made larger by using a freeform optical mirror OPb.

On the other hand, the first optical mirror OPb is disposed to face the object OBJ disposed in the case CSE, and a distance between the second optical mirror OPa and the object OBJ is preferably shorter than a distance between the first optical mirror OPb and the object OBJ. Accordingly, the viewing angle when displaying the floating image IM can be improved and the size of the display device 100 can be reduced. Thus, the floating image IM can be made larger, the viewing angle is improved and the size of the display device 100 can be reduced according to an embodiment of the present disclosure.

Meanwhile, a curved surface is formed on the second optical mirror OPa in the display device 100 according to the one implementation, and a second residual, which is a difference between the curved surface and a second parabolic surface of the second optical mirror OPa, is asymmetrical at both ends of the second optical mirror OPa. Accordingly, the viewing angle when displaying the floating image IM can be improved and the size of the display device 100 can be reduced. In addition, the size of the floating image IM can increase. In particular, the size of the floating image IM can be increased by using a freeform optical mirror OPa.

On the other hand, the first optical mirror OPb is disposed to face the object OBJ disposed in the case CSE, and a distance between the second optical mirror OPa and the object OBJ is preferably shorter than a distance between the first optical mirror OPb and the object OBJ. Accordingly, the viewing angle when displaying the floating image IM can be improved and the size of the display device 100 can be reduced.

Meanwhile, as illustrated in FIG. 1B, a size of the second optical mirror OPa disposed on the lower side within the case CSE is preferably larger than a size of the first optical mirror OPb disposed on the upper side within the case CSE. Accordingly, the second optical mirror OPa can stably reflect light coming from the first optical mirror OPb toward the opening OPN.

Figure 1C:
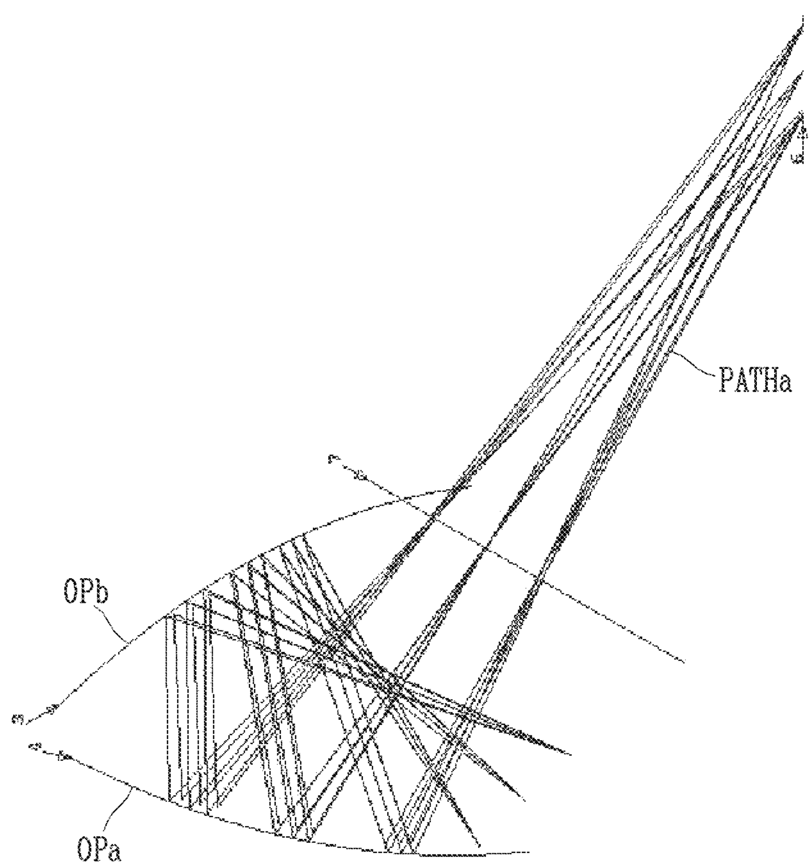
FIG. 1C is a diagram illustrating optical paths in a first optical mirror and a second optical mirror of FIG. 1A according to an embodiment of the present disclosure.

FIG. 1C is a diagram illustrating optical paths PATHa in the first optical mirror and the second optical mirror of FIG. 1A.

Referring to FIG. 1C, light from the object (article) OBJ can be reflected by the first optical mirror OPb, and the light from the first optical mirror OPb can be reflected by the second optical mirror OPa to pass through the opening OPN. Accordingly, the viewing angle when displaying the floating image IM can be improved and the size of the display device 100 can be reduced.

Figure 1D:
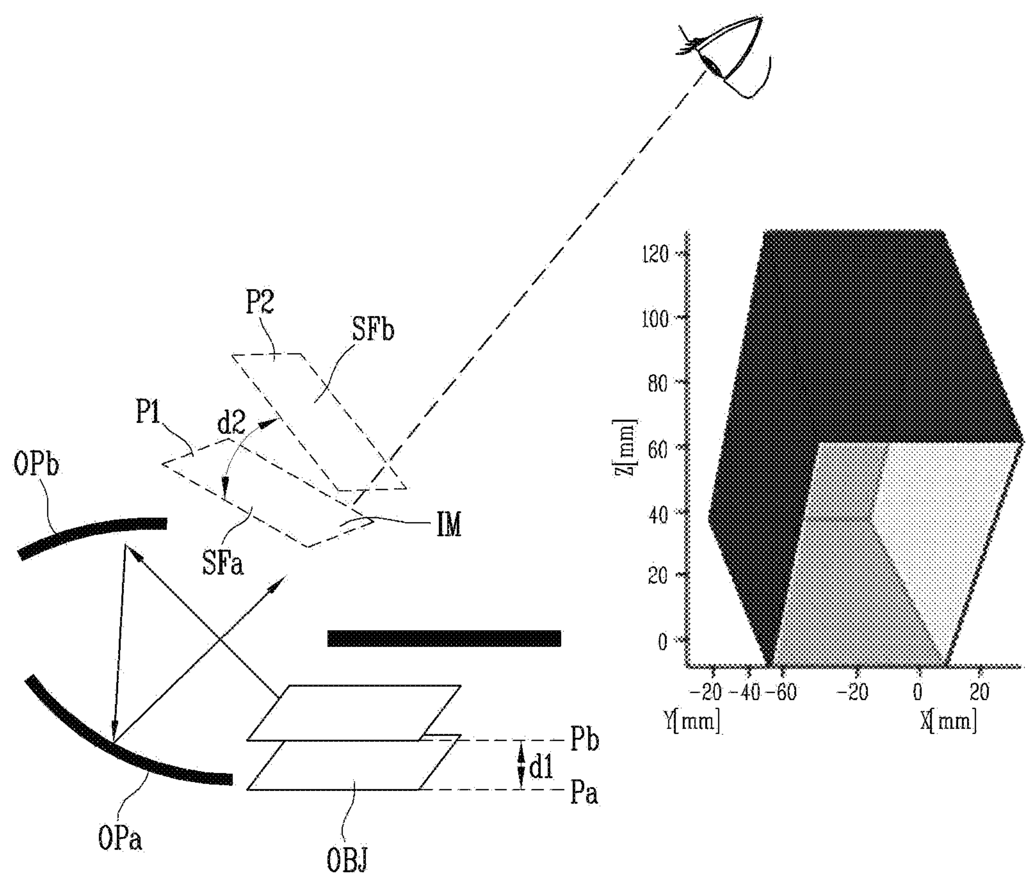
FIG. 1D is a diagram illustrating various examples of floating images displayed on the display device of FIG. 1A according to an embodiment of the present disclosure.

FIG. 1D is a diagram illustrating various examples of floating images displayed on the display device of FIG. 1A.

Referring to FIG. 1D, when the object OBJ is located at a first position Pa, light from the object OBJ can be reflected by the first optical mirror OPb, and then reflected by the second optical mirror OPa to pass through the opening OPN.

Accordingly, the floating image IM is displayed in a first space P1 between the opening OPN and the viewer 10.

In the drawing, it is illustrated that SFa, which is a partial surface of the floating image IM displayed in the first space P1, is displayed.

On the other hand, when the object OBJ is located at a second position Pb higher than the first position Pa, light from the object OBJ can be reflected by the first optical mirror OPb, and then reflected by the second optical mirror OPa to pass through the opening OPN.

Accordingly, the floating image IM is displayed in a second space P2 between the opening OPN and the viewer 10. In particular, the second space P2 is closer to the viewer 10 than the first space P1 (e.g., the higher second position Pb can cause the projected floating image to be higher and rotate more towards the viewer).

In the drawing, it is also illustrated that SFb, which is a partial surface of the floating image IM displayed in the second space P2, is displayed.

A distance d2 between the first space P1 and the second space P2 is longer than a distance d1 between the first position Pa and the second position Pb (e.g., a small increase in height for the object can result in a larger increase in height for the projected floating image IM).

In particular, when the second position Pb is located higher than the first position Pa by such predetermined distance d1, the second space P2 may not have a predetermined distance d2 from the first space P1, but can be inclined by a predetermined angle with respect to the first space P1 (e.g., rotated closer to the viewer).

As described above, in the display device 100 according to the one implementation, since the curved surfaces of the first optical mirror OPb and the second optical mirror OPa are not parabolic but freeform (e.g., a non-symmetric optical surface), an angle of the floating image can be adjusted according to the position of the object OBJ.

In particular, as the position of the object OBJ becomes higher than a height of the second optical mirror OPa, a position of the floating image IM becomes closer to the viewer 10 and the angle of the floating image IM is more inclined toward the viewer 10 between the opening OPN and the viewer 10.

That is, as the position of the object OBJ becomes higher than the height of the second optical mirror OPa, the angle of the floating image IM varies to be more inclined toward the viewer 10. This can improve a viewing angle when displaying the floating image IM.

Meanwhile, it is preferable that the curved surface GRb of the first optical mirror OPb has plural curvatures. Accordingly, the viewing angle when displaying the floating image IM can be improved and the size of the display device 100 can be reduced.

It is also preferable that the curved surface GRb of the second optical mirror OPb has plural curvatures. Accordingly, the viewing angle when displaying the floating image IM can be improved and the size of the display device 100 can be reduced.

Meanwhile, a distance between the first optical mirror OPb and the opening OPN is preferably shorter than a distance between the second optical mirror OPa and the opening OPN. Accordingly, the viewing angle when displaying the floating image IM can be improved and the size of the display device 100 can be reduced.

Figure 2:
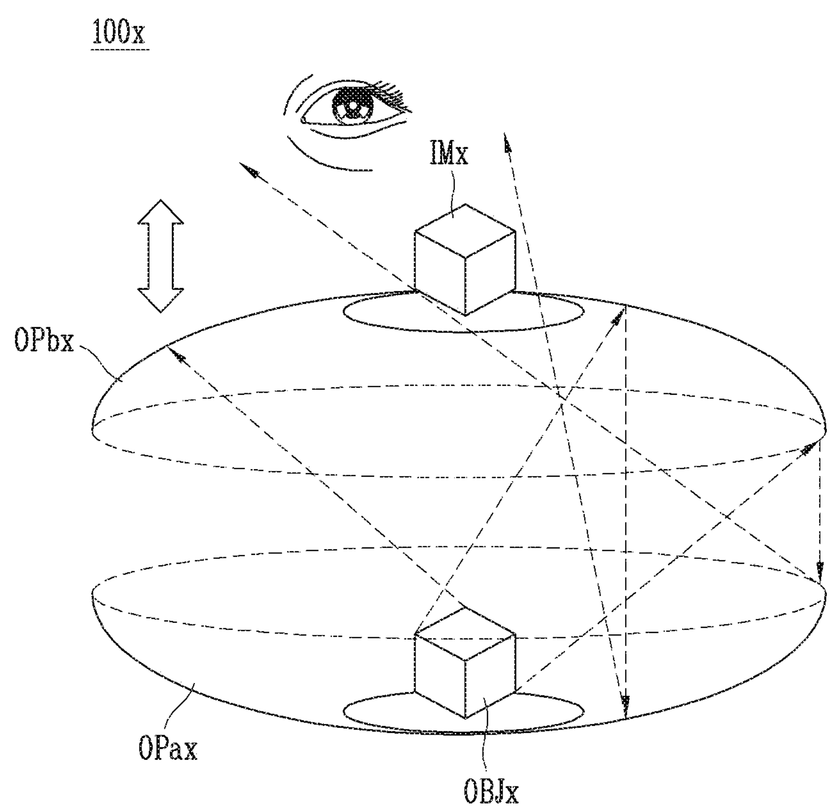
FIG. 2 is a view illustrating appearance of a display device as a comparative example in relation to the present disclosure.

FIG. 2 is a view illustrating appearance of a comparative example display device having two concave mirrors with symmetrical parabolic optical surfaces, in relation to embodiments of the present disclosure.

Referring to the drawing, a comparative display device 100*x* in relation to embodiments of the present disclosure can include two concave mirrors OPax and OPbx having symmetrical parabolic optical surfaces, as in Prior Art Document 2.

By the two concave mirrors OPax and OPbx having the symmetrical parabolic optical surfaces, a floating image IMx is shown, but since the curved surfaces of the two concave mirrors OPax and OPbx correspond to a parabola, the two concave mirrors OPax and OPbx must increase in size as a size of the object OBJx increases, which results in increasing the size of display device 100x.

The size increase of the two concave mirrors OPax and OPbx causes an increase in probability that magnifications of an upper image and a lower image of the floating image of the object OBJx will become different or distortion occurs.

Accordingly, in contrast to the comparative example shown in FIG. 2, in embodiments of the present disclosure, the curved surfaces of the first optical mirror OPb and the second optical mirror OPa in the display device 100 are freeform (e.g., a non-symmetric optical surface) rather than symmetrical parabolic optical surfaces.

For example, the curved surface of the first optical mirror OPb or the second optical mirror OPa can be formed as a freeform curved surface, such as a Zernike polynomial or an xy polynomial surface. This can reduce the magnification difference or distortion of the floating image.

On the other hand, in the implementation of the present disclosure, a residual, which is a difference between a curved surface and a parabolic surface of an optical mirror in the display device 100, is formed asymmetrically. This can improve a viewing angle when displaying the floating image IM. This can also reduce a size of the display device 100.

Figure 3A:
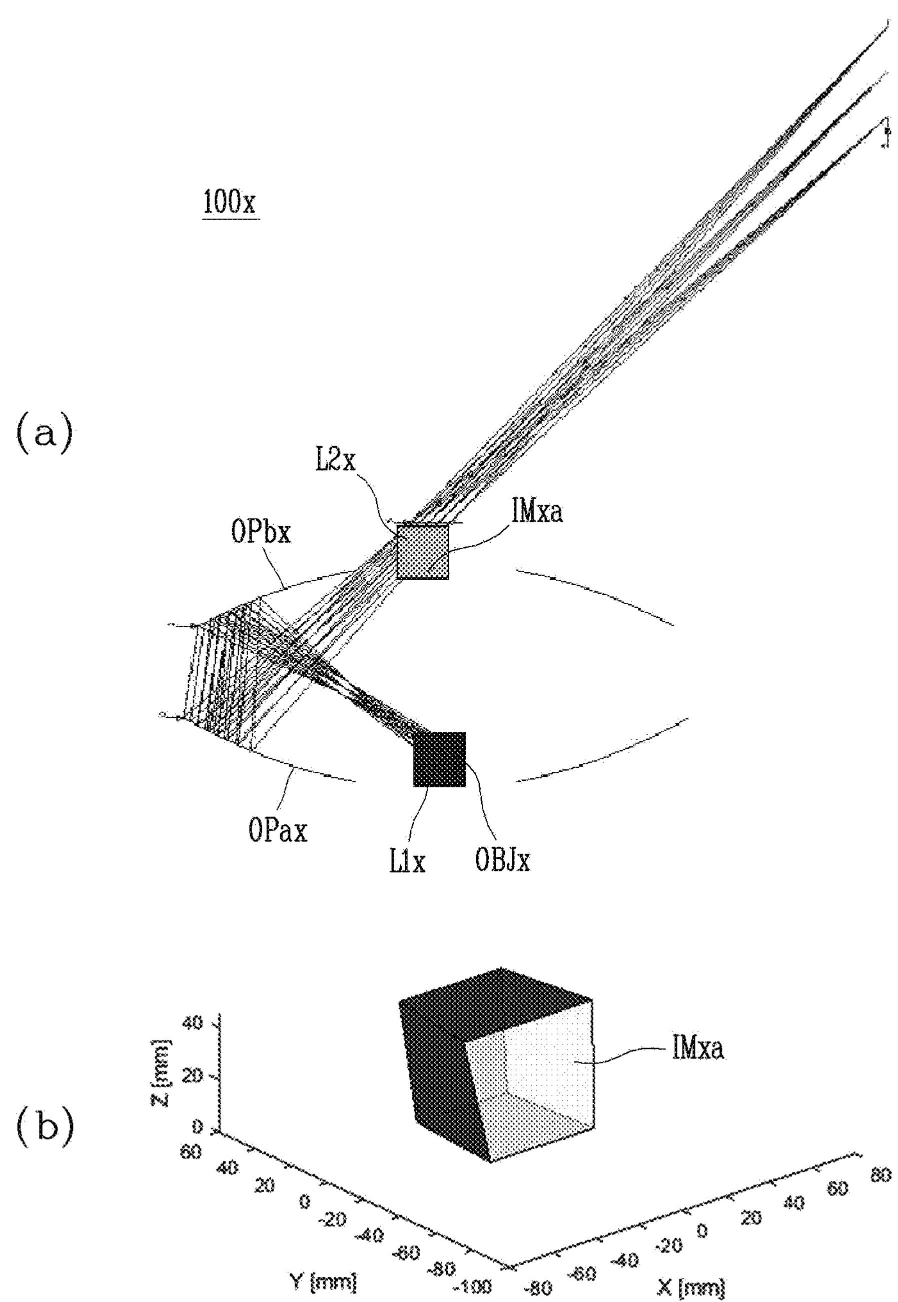
FIG. 3A is a diagram illustrating an example of a floating image by the display device of FIG. 1A according to an embodiment of the present disclosure.

FIG. 3A, including parts (a) and (b), is a diagram illustrating an example of a floating image by the display device of FIG. 1A.

Referring to the drawing, a display device 100x of FIG. 3A includes an upper concave mirror OPbx and a lower concave mirror OPax, and the upper concave mirror OPbx and the lower concave mirror OPax have parabolic surfaces.

As illustrated in part (a) of FIG. 3A, when the object OBJx is disposed on L1x adjacent to the lower concave mirror OPax, a floating image IMXa can be displayed on L2x adjacent the upper concave mirror OPbx.

In this situation, if the viewer 10 is on the right side, the object OBJx can be closer than the floating image IMXa.

Meanwhile, part (b) of FIG. 3A illustrates the floating image IMXa.

Figure 3B:
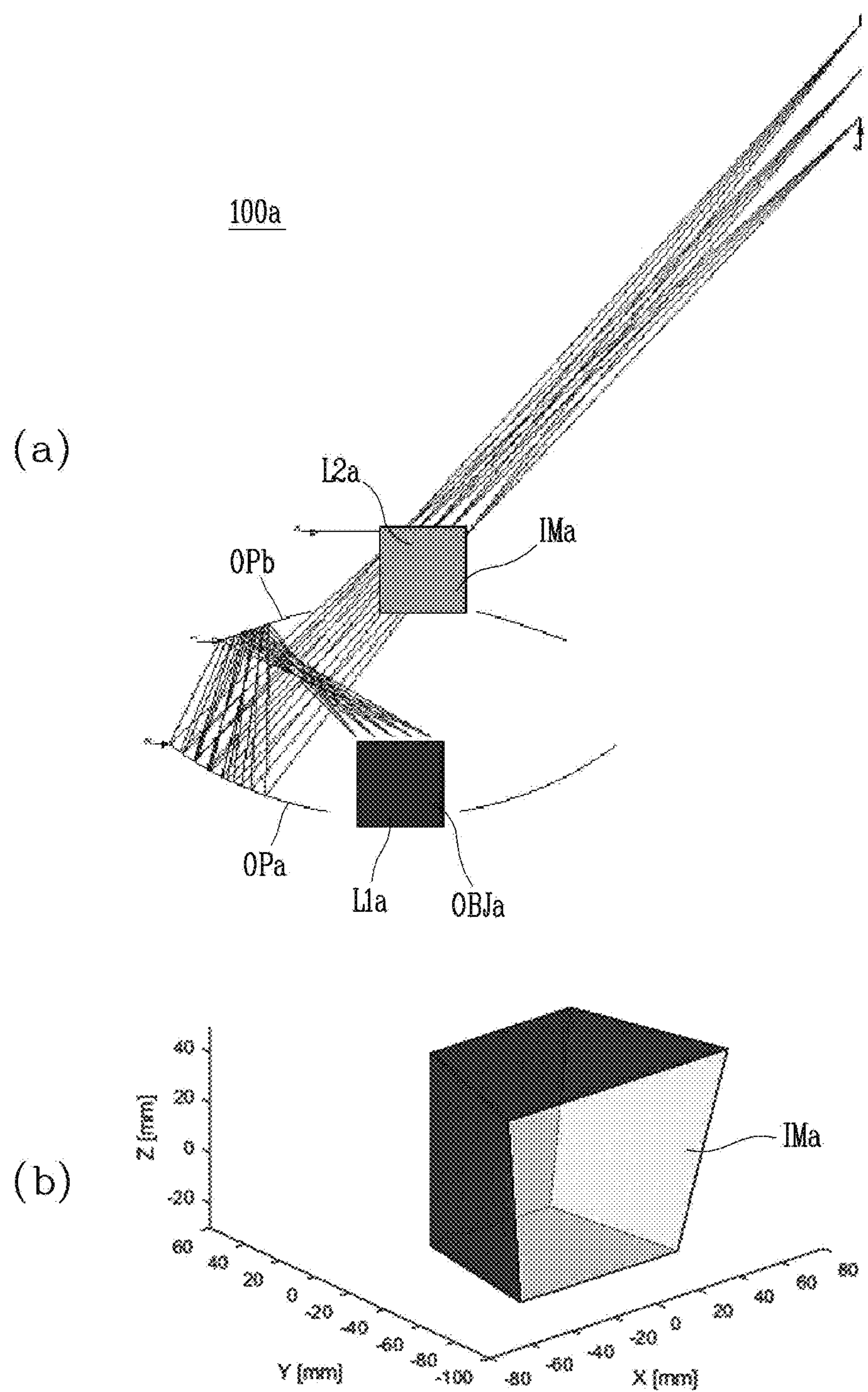
FIG. 3B is a diagram illustrating an example of a floating image by the display device of FIG. 1A according to an embodiment of the present disclosure.

FIG. 3B, including parts (a) and (b), is a diagram illustrating an example of a floating image by the display device of FIG. 1A.

Referring to the drawing, a display device 100a of FIG. 3B includes the first optical mirror OPb and the second optical mirror OPa, and the first optical mirror OPb and the second optical mirror OPa can have freeform curved surfaces, other than parabolic surfaces.

On the other hand, as illustrated in part (a) of FIG. 3B, when the object OBJ is disposed on L1a adjacent to the second optical mirror OPa, a floating image IMa is displayed on L2a adjacent to the first optical mirror OPb.

In this situation, if the viewer 10 is on the right side, the floating image IMa can be closer than the object OBJ. This can allow the floating image IMa to have a larger size than that of FIG. 3A.

Meanwhile, part (b) of FIG. 3B illustrates the floating image IMa.

Comparing the floating image IMa of part (b) of FIG. 3B with the floating image IMXa of part (b) of FIG. 3A, it can be seen that the floating image IMa of part (b) of FIG. 3B has a larger size.

Meanwhile, as illustrated in FIG. 3B, when such freeform optical mirror is used, the display device 100 can be realized to have a smaller size than the display device 100x of FIG. 3A.

Although the display device 100x of FIG. 3A and the display device 100 of FIG. 3B have the same height, a diameter of the lower concave mirror OPax of the display device 100x of FIG. 3A is smaller than a diameter of the second optical mirror OPa of the display device 100 of FIG. 3B.

For example, the diameter of the lower concave mirror OPax of the display device 100x of FIG. 3A can be 560 mm, and the diameter of the second optical mirror OPa of the display device 100 of FIG. 3B can be 480 mm.

Figure 4A:
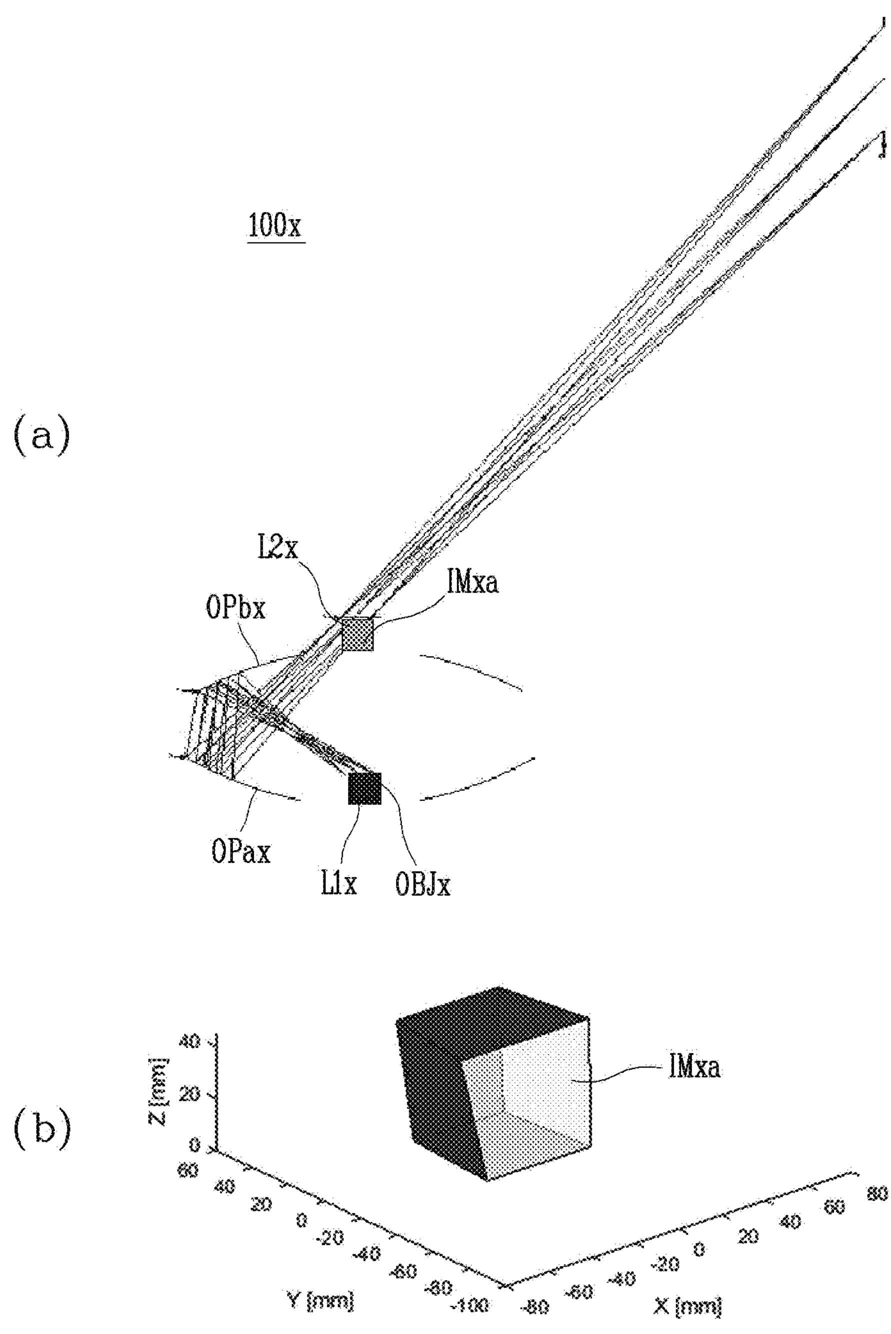
FIG. 4A is a diagram illustrating another example of a floating image by the display device of FIG. 1A according to an embodiment of the present disclosure.

FIG. 4A is a diagram illustrating another example of a floating image by the display device of FIG. 1A.

Referring to the drawing, the display device 100x of FIG. 4A is similar to the display device 100x of FIG. 3A, except for that the size thereof is smaller than that of the display device 100x of FIG. 3A.

For example, the diameter of the lower concave mirror OPax of the display device 100x of FIG. 4A can be 370 mm.

Figure 4B:
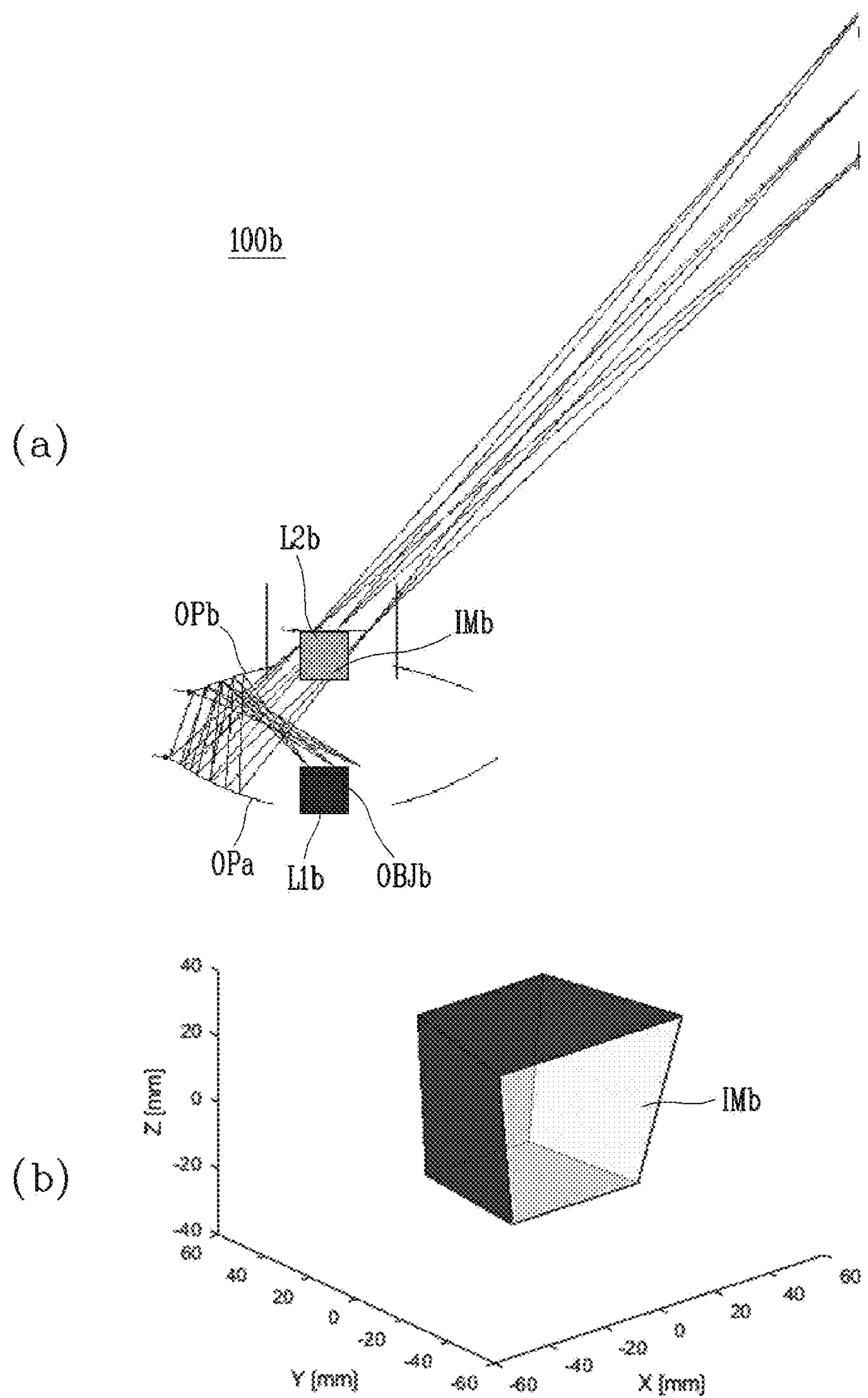
FIG. 4B is a diagram illustrating another example of a floating image by the display device of FIG. 1A according to an embodiment of the present disclosure.

FIG. 4B is a diagram illustrating another example of a floating image by the display device of FIG. 1A.

Referring to the drawing, a display device 100b of FIG. 4B is similar to the display device 100a of FIG. 3B, except for that a size thereof is smaller than that of the display device 100b of FIG. 4A.

For example, a diameter of the second optical mirror OPa of the display device 100b of FIG. 4B can be 350 mm.

On the other hand, as illustrated in part (a) of FIG. 4B, when the object OBJ is disposed on L1b adjacent to the second optical mirror OPa, a floating image IMb can be displayed on L2b adjacent to the first optical mirror OPb.

Comparing the floating image IMb of part (b) of FIG. 4B with the floating image IMXa of part (b) of FIG. 4A, it can be seen that the floating image IMb of part (b) of FIG. 4B has a larger size.

On the other hand, as illustrated in FIG. 4B, when such freeform optical mirror is used, the display device 100b can be realized to have a smaller size than the display device 100x of FIG. 4A.

Although the display device 100x of FIG. 4A and the display device 100b of FIG. 4B have the same height, a diameter of the lower concave mirror OPax of the display device 100x of FIG. 4A is smaller than a diameter of the second optical mirror OPa of the display device 100b of FIG. 4B.

Figure 5A:
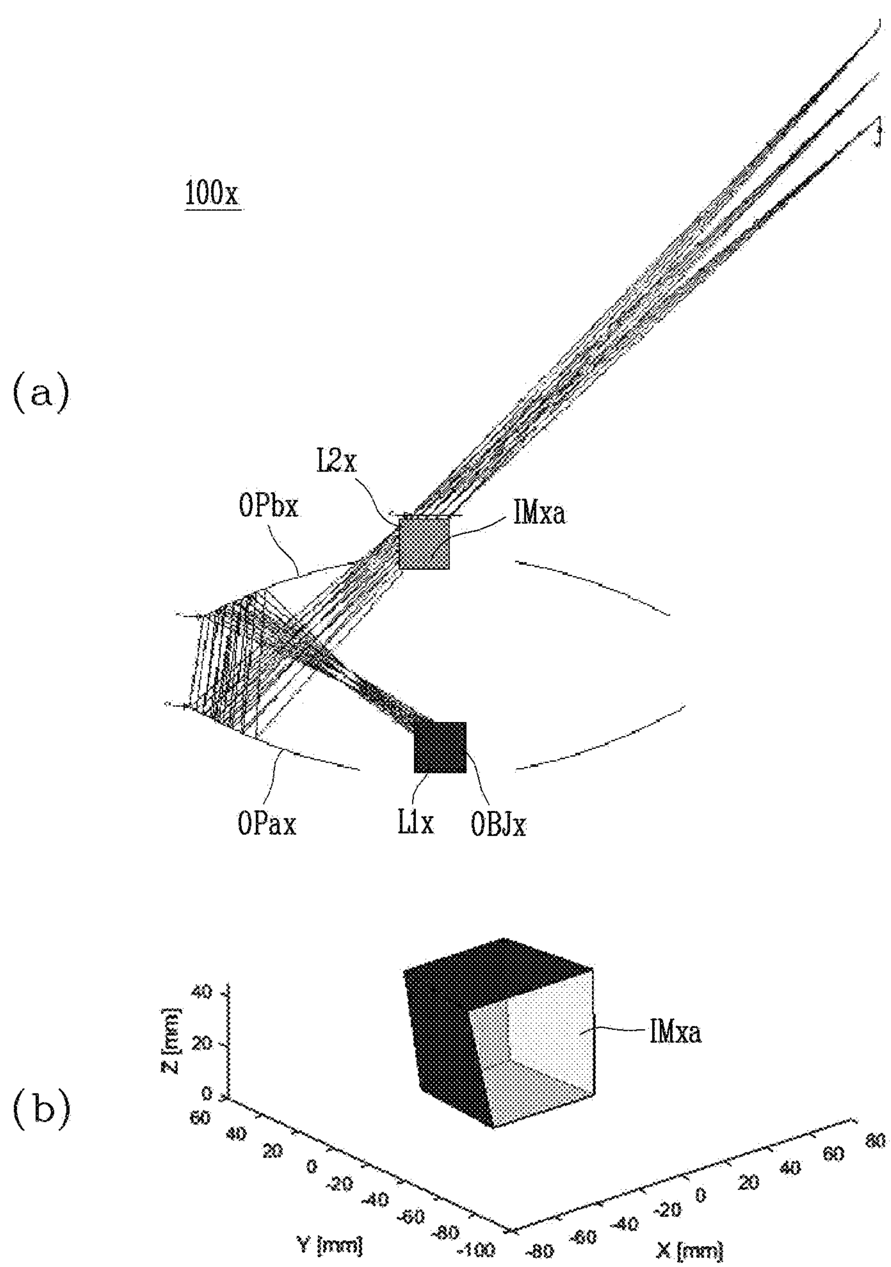
FIG. 5A is a diagram illustrating still another example of a floating image by the display device of FIG. 1A according to an embodiment of the present disclosure.

FIG. 5A is a diagram illustrating still another example of a floating image by the display device of FIG. 1A.

Referring to the drawing, a display device 100x of FIG. 5A is similar to the display device 100x of FIG. 3A, except for that a size thereof is smaller than that of the display device 100x of FIG. 3A.

For example, a diameter of the lower concave mirror OPax of the display device 100x of FIG. 5A can be 400 mm.

Figure 5B:
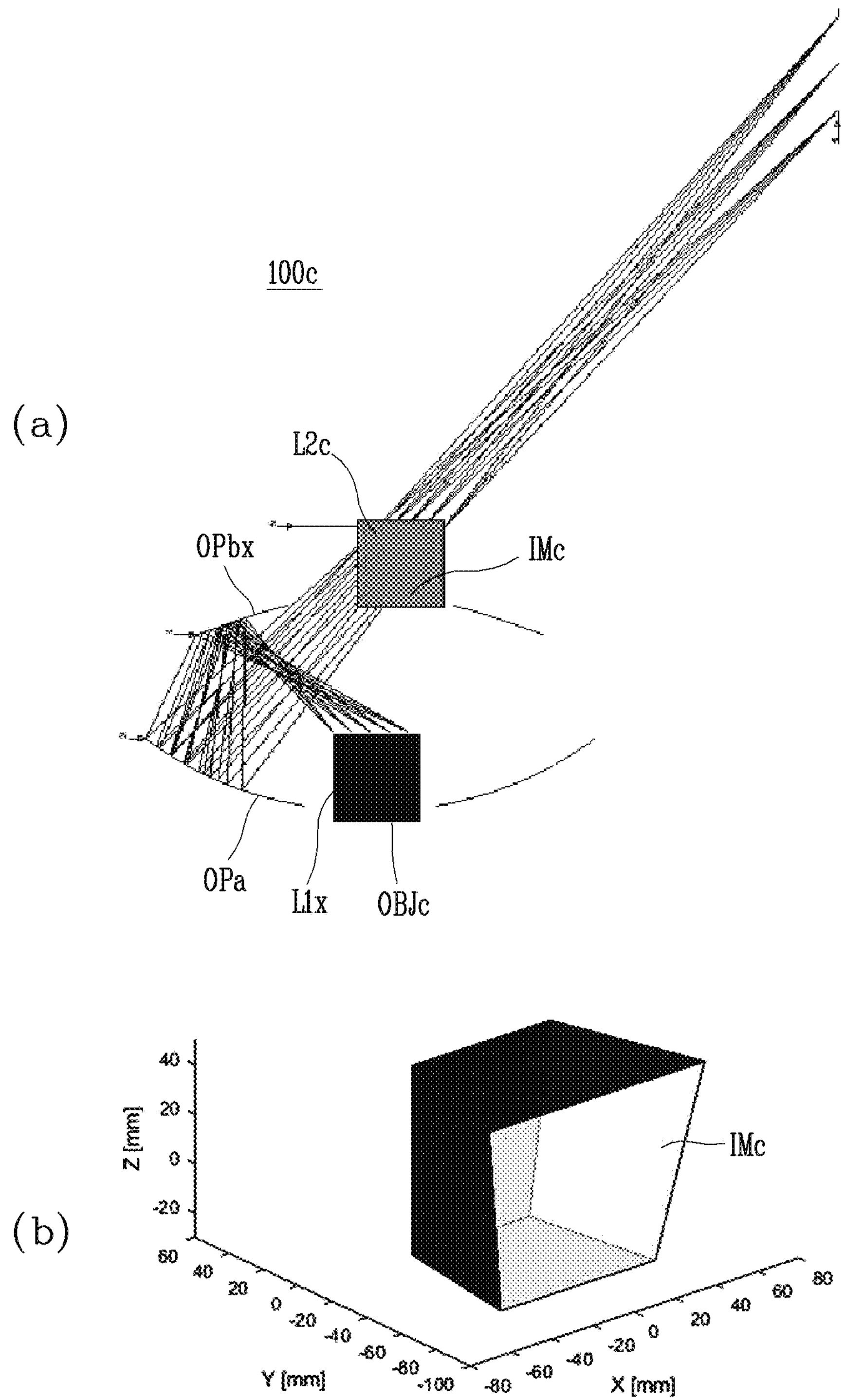
FIG. 5B is a diagram illustrating still another example of a floating image by the display device of FIG. 1A according to an embodiment of the present disclosure.

FIG. 5B is a diagram illustrating still another example of a floating image by the display device of FIG. 1A.

Referring to the drawing, a display device 100c of FIG. 5B is similar to the display device 100a of FIG. 3B, except for that a size thereof is smaller than that of the display device 100c of FIG. 5A.

For example, a diameter of the second optical mirror OPa of the display device 100c of FIG. 5B can be 380 mm.

On the other hand, as illustrated in part (a) of FIG. 5B, when the object OBJ is disposed on L1c adjacent to the second optical mirror OPa, a floating image IMc can be displayed on L2*c* adjacent to the first optical mirror OPbx.

Comparing the floating image IMc of part (b) of FIG. 5B with the floating image IMXa of part (b) of FIG. 5A, it can be seen that the floating image IMc of part (b) of FIG. 5B has a larger size.

On the other hand, as illustrated in FIG. 5B, when such freeform optical mirror is used, the display device 100*c* can be realized to have a smaller size than the display device 100*x* of FIG. 5A.

Although the display device 100*x* of FIG. 5A and the display device 100*c* of FIG. 5B have the same height, a diameter of the lower concave mirror OPax of the display device 100*x* of FIG. 5A is smaller than a diameter of the second optical mirror OPa of the display device 100*c* of FIG. 5B.

Comparing FIGS. 5A and 5B, the size of the object OBJx is limited due to the size limitation of the display device 100*x* of FIG. 5A, but the display device 100*c* of FIG. 5B can display a floating image using the object OBJ having the larger size than that in FIG. 5A.

Figure 6A:
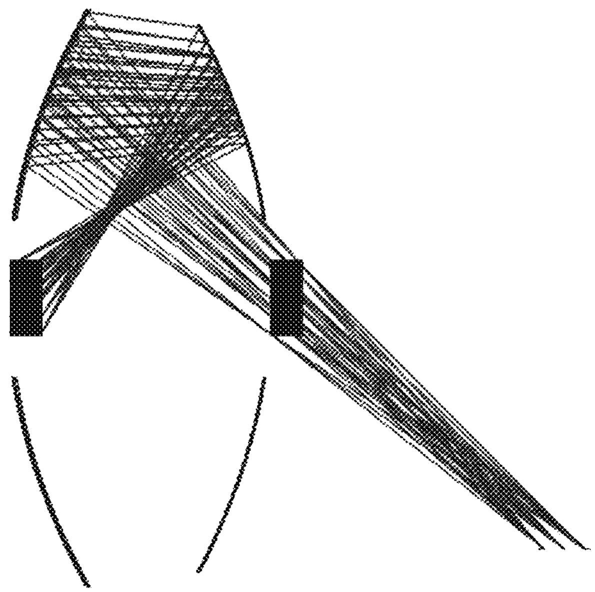
FIGS. 6A and 6B are diagrams illustrating various examples of a display device according to embodiments of the present disclosure.
Figure 6B:
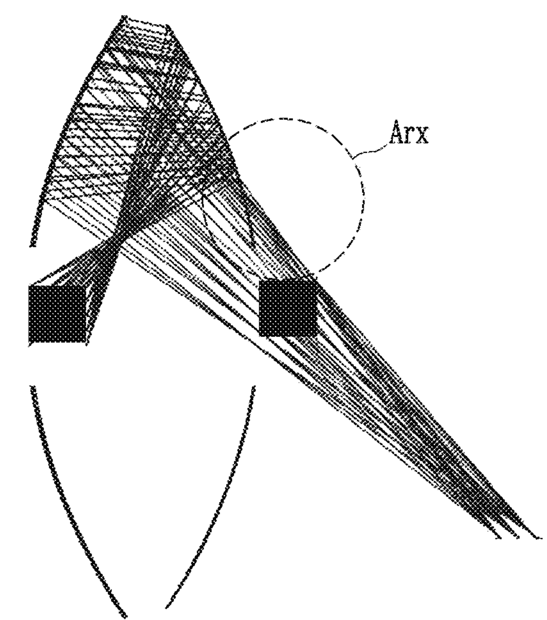

FIGS. 6A and 6B are diagrams illustrating various examples of a display device in relation to the present disclosure.

Referring to the drawings, a display device 100*xa* of FIG. 6A includes two concave mirrors each having a parabolic surface, and a diameter of a lower concave mirror can be about 1370 mm or less.

A display device 100*xb* of FIG. 6B includes two concave mirrors each having a parabolic surface, and a diameter of a lower concave mirror can be about 1600 mm or less.

Referring to the drawings, the display device 100*xb* of FIG. 6B is increased in size, compared to FIG. 6A, and light output to an Arx region near an upper concave mirror is disadvantageously blocked.

Figure 6C:
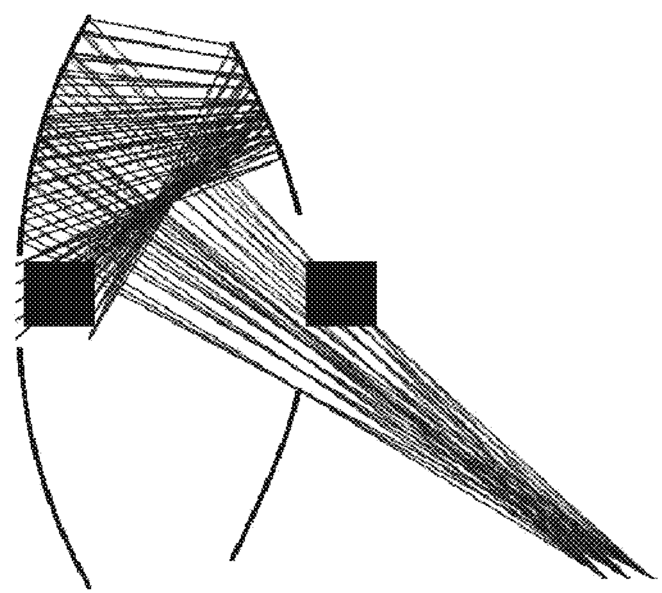
FIG. 6C is a diagram referred to explain a display device according to an embodiment of the present disclosure.

FIG. 6C is a diagram referred for explaining a display device in accordance with an embodiment of the present disclosure.

Referring to the drawing, the display device 100*xc* of FIG. 6C includes a first optical mirror OPb and a second optical mirror OPa each having a freeform curved surface (e.g., a non-symmetrical optical surface) rather than a parabolic surface.

In this situation, a diameter of the second optical mirror OPa can be about 1230 mm or less.

Compared with the display devices 100*xa* and 100*xb* of FIGS. 6A and 6B, since the diameter can be significantly reduced, the size of the display device 100 can be reduced.

FIGS. 7A to 15D are diagrams referred for explanation of the display device of FIG. 1A.

Figure 7A:
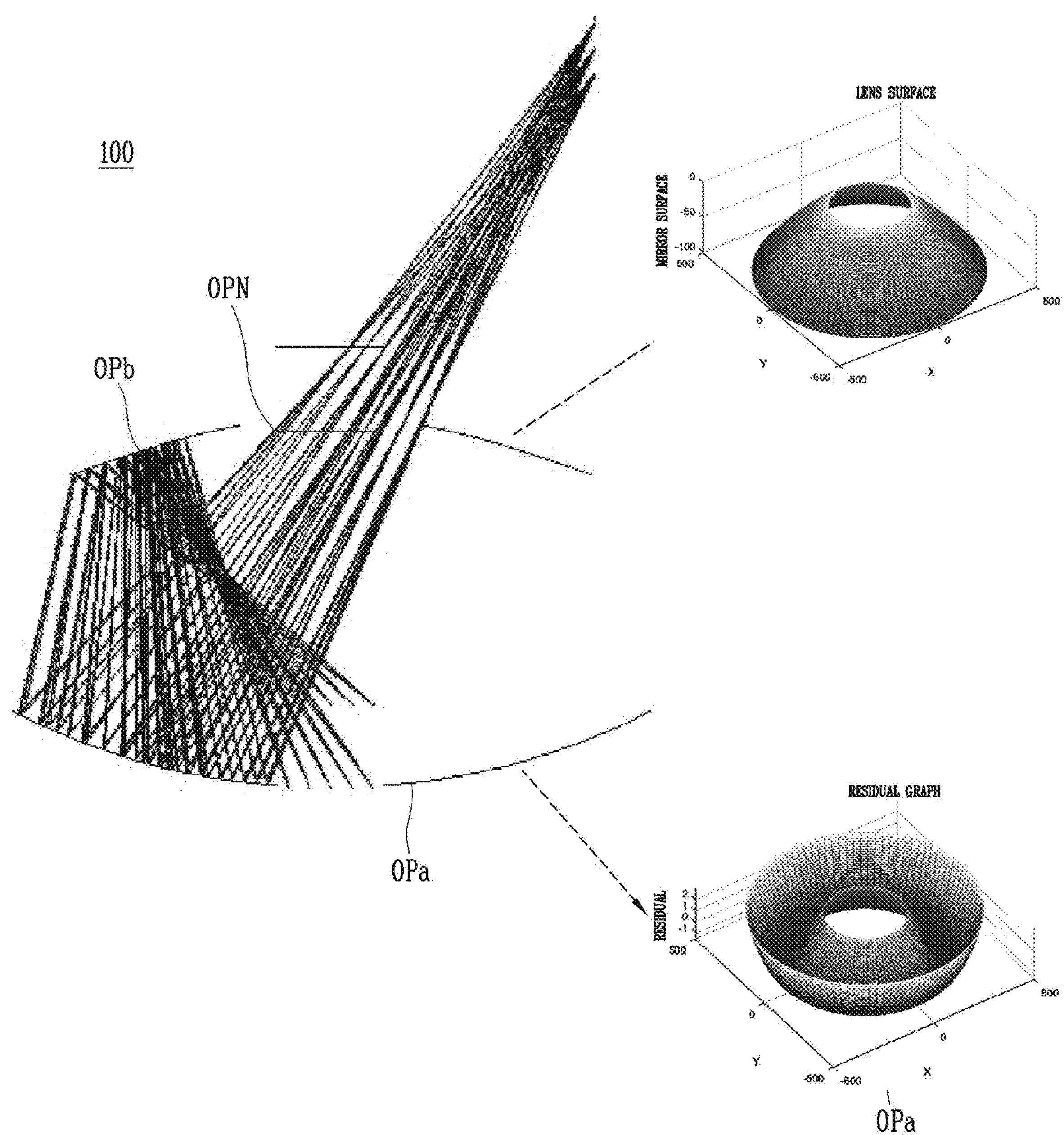
FIGS. 7A to 15D are diagrams referred for explanation of FIG. 1A according to embodiments of the present disclosure.

First, FIG. 7A is a diagram illustrating in detail the curved surface of the first optical mirror OPb and the curved surface of the second optical mirror OPa of the display device 100 of FIG. 1A.

The curved surface of the first optical mirror OPb and the curved surface of the second optical mirror OPa can be freeform curved surfaces rather than the parabolic surfaces.

For example, the curved surface of each of the first optical mirror OPb and the second optical mirror OPa can be formed as a freeform curved surface, such as a Zernike polynomial surface or an xy polynomial surface.

Figure 7B:
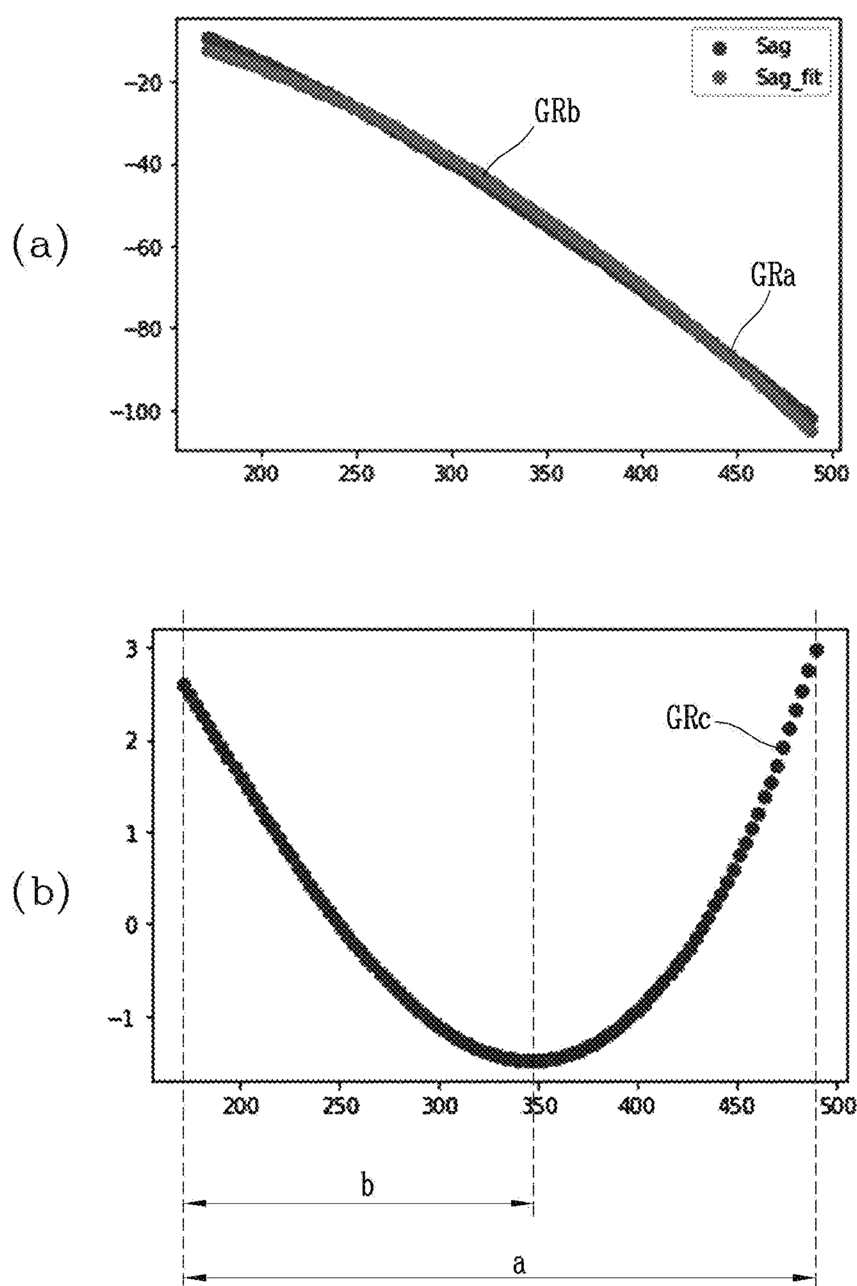

FIG. 7B is a diagram for explaining a residual GRc that is a difference between a curved surface GRb and a parabolic surface GRa of the first optical mirror OPb.

First, part (a) of FIG. 7B illustrates the curved surface GRb and the parabolic surface GRa of the first optical mirror OPb.

In this situation, the viewer 10 or the opening OPN can be located in a left direction of a horizontal axis of part (a) of FIG. 7B.

Part (b) of FIG. 7B is a diagram illustrating the residual GRc that is the difference between the curved surface GRb and the parabolic surface GRa of the first optical mirror OPb.

In the drawing, the viewer 10 or the opening OPN can be located in a left direction of a horizontal axis of part (b) of FIG. 7B.

In addition, both ends of the horizontal axis of part (b) of FIG. 7B can correspond to both ends of the first optical mirror OPb.

Referring to part (b) of FIG. 7B, the residual GRc, which is the difference between the curved surface GRb and the parabolic GRa of the first optical mirror OPb, is asymmetrically formed at both ends of the first optical mirror OPb.

On the other hand, the residual GRc, which is the difference between the curved surface GRb and the parabolic surface GRa of the first optical mirror OPb, is increased from a center of the residual GRc which has a lowest level toward the both ends of the first optical mirror OPb. Here, it is preferable that the residual GRc at a first end of the both ends is larger than the residual GRc at a second end.

At this time, the first end of the first optical mirror OPb corresponds to a left end of part (b) of FIG. 7B, and the second end of the first optical mirror OPb corresponds to a right end of part (b) of FIG. 7B.

Accordingly, the viewing angle when displaying the floating image IM can be improved and the size of the display device 100 can be reduced.

Meanwhile, it is preferable that the residual GRc at the second end, which is far from the opening OPN, is larger than the residual GRc at the first end, which is close to the opening OPN, of the both ends of the first optical mirror OPb.

In this situation, the first end close to the opening OPN corresponds to the left end of part (b) of FIG. 7B, and the second end farther from the opening OPN corresponds to the right end of part (b) of FIG. 7B.

Accordingly, the viewing angle when displaying the floating image IM can be improved and the size of the display device 100 can be reduced.

On the other hand, when a ratio of a distance b between the center of the residual with the lowest level and the first end of the first optical mirror OPb to a distance a between the first and second ends of the first optical mirror OPb is less than 0.5, a portion between the center of the first optical mirror OPb and the second end becomes too concave to be similar to a parabolic shape. This narrows a usable area of the second optical mirror OPa of outgoing light on an upper surface of the three-dimensional object OBJ, thereby causing a reduction of an image.

On the other hand, when the ratio of the distance b between the center of the residual with the lowest level and the first end of the first optical mirror OPb to the distance a between the first and second ends of the first optical mirror OPb exceeds 0.65, a portion between the opening OPN and the center of the first optical mirror OPb becomes too concave to be similar to a parabolic shape. This narrows a usable area of the second optical mirror OPa of outgoing light on an upper surface of the three-dimensional object OBJ, thereby causing a reduction of an image.

Therefore, in order to prevent the reduction of the image of the three-dimensional object OBJ, etc., a ratio of a first distance b, which is the distance from the center of the residual GRc with the lowest level, which is the difference between the curved surface GRb and the parabolic surface GRa of the first optical mirror OPb, to the first end of the first optical mirror OPb with respect to the distance a between the first and second ends of the first optical mirror OPb is preferably in the range of 0.5 to 0.65 (e.g., 0.575). Accordingly, the viewing angle when displaying the floating image IM can be improved and the size of the display device 100 can be reduced. In this way, a desirable balance can be obtained between improving the viewing angle and reducing the size of the display device 100.

Meanwhile, the curved surface GRb of the first optical mirror OPb can be flat or more flat when compared to the parabolic surface GRa. Accordingly, the viewing angle when displaying the floating image IM can be improved and the size of the display device 100 can be reduced.

In FIGS. 7A and 7B, the curved surface of the first optical mirror OPb has been described, and this can be directly applied to the curved surface of the second optical mirror OPa.

The second optical mirror OPa has a curved surface, and a second residual, which is a difference between the curved surface and a second parabolic surface GRa of the second optical mirror OPa, is asymmetrical at both ends of the second optical mirror OPa. Accordingly, the viewing angle when displaying the floating image IM can be improved and the size of the display device 100 can be reduced.

The second residual GRc, which is the difference between the curved surface GRb and the second parabolic surface GRa of the second optical mirror OPb, is increased from a center of the residual GRc which has a lowest level toward the both ends of the second optical mirror OPb. Here, it is preferable that the residual GRc at a third end of the both ends is larger than that at a fourth end. Accordingly, the viewing angle when displaying the floating image IM can be improved and the size of the display device 100 can be reduced.

It is preferable that the residual GRc at the fourth end, which is far from the opening OPN, is larger than the residual GRc at the third end, which is close to the opening OPN, of the both ends of the second optical mirror OPb. Accordingly, the viewing angle when displaying the floating image IM can be improved and the size of the display device 100 can be reduced.

On the other hand, when a ratio of a first distance b between the center of the residual with the lowest level and the third end of the second optical mirror OPa to a distance a between the third and fourth ends of the second optical mirror OPa is less than 0.5, a portion between the center of the second optical mirror OPa and the fourth end becomes too concave to be similar to a parabolic shape. This narrows a usable area of the first optical mirror OPb of outgoing light on an upper surface of the three-dimensional object OBJ, thereby causing a reduction of an image.

On the other hand, when the ratio of a distance b between the center of the residual with the lowest level and the third end of the second optical mirror OPa to the distance a between the third and fourth ends of the second optical mirror OPa exceeds 0.65, a portion between the opening OPN and the center of the second optical mirror OPa becomes too concave to be similar to a parabolic shape. This narrows a usable area of the first optical mirror OPb of outgoing light on an upper surface of the three-dimensional object OBJ, thereby causing a reduction of an image.

Therefore, in order to prevent the reduction of the image of the three-dimensional object OBJ, etc., a ratio of a second distance b, which is the distance from the center of the residual GRc with the lowest level, which is the difference between the curved surface and the second parabolic surface GRa of the second optical mirror OPa, to the third end of the second optical mirror OPa with respect to the distance a between the third and fourth ends of the second optical mirror OPa is preferably in the range of 0.5 to 0.65 (e.g., 0.575). Accordingly, the viewing angle when displaying the floating image IM can be improved and the size of the display device 100 can be reduced.

Meanwhile, the curved surface of the second optical mirror OPa can be concave compared to the parabolic surface GRa. Accordingly, the viewing angle when displaying the floating image IM can be improved and the size of the display device 100 can be reduced.

Figure 8A:
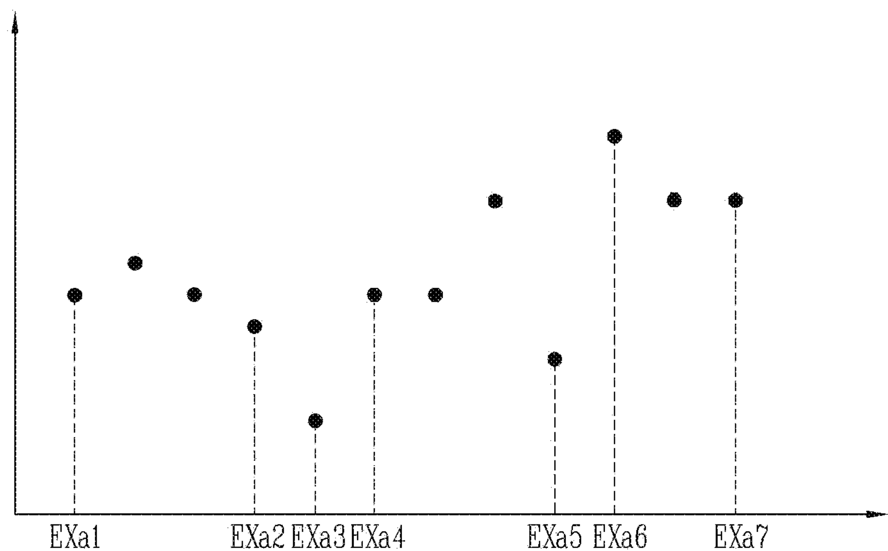

FIG. 8A is a diagram illustrating various examples of the first optical mirrors OPb in which the ratio of the first distance b to the distance a is 0.5 to 0.65.

Referring to the drawing, the ratio of the first distance b to the distance a in Example 1 (Exa1) is 0.57, the ratio of the first distance b to the distance a in Example 2 (Exa2) is 0.56, the ratio of the first distance b to the distance a in Example 3 (Exa3) is 0.53, the ratio of the first distance b to the distance a in Example 4 (Exa4) is 0.57, the ratio of the first distance b to the distance a in Example 5 (Exa5) is 0.55, and the ratio of the first distance b to the distance a in Example 6 (Exa6) is 0.62, and the ratio of the first distance b to the distance a in Implementation 7 (Exa7) can be 0.60.

Accordingly, based on the curved surface of the first optical mirror OPb, the viewing angle when displaying the floating image IM can be improved and the size of the display device 100 can be reduced.

Figure 8B:
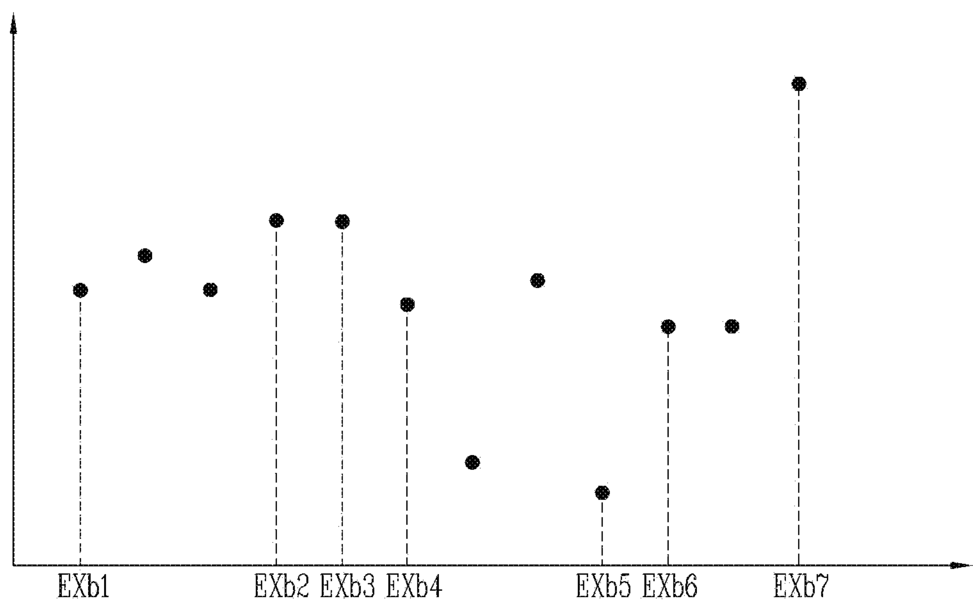

Next, FIG. 8B is a diagram illustrating various examples of the second optical mirror OPb in which the ratio of the first distance b to the distance a is 0.5 to 0.65.

Referring to the drawing, the ratio of the first distance b to the distance a in Example 1 (Exb1) is 0.58, the ratio of the first distance b to the distance a in Example 2 (Exb2) is 0.60, the ratio of the first distance b to the distance a in Example 3 (Exb3) is 0.60, the ratio of the first distance b to the distance a in Example 4 (Exb4) is 0.58, the ratio of the first distance b to the distance a in Example 5 (Exb5) is 0.52, and the ratio of the first distance b to the distance a in Example 6 (Exb6) is 0.57, and the ratio of the first distance b to the distance a in Example 7 (Exb7) can be 0.64.

Based on the curved surface of the second optical mirror OPa, the viewing angle when displaying the floating image IM can be improved and the size of the display device 100 can be reduced.

On the other hand, when an absolute value of a ratio of a curvature of the first optical mirror OPb to a curvature of the second optical mirror OPa is less than 0.75, the size of the floating image becomes too small, and light coming from a bottom surface of the three-dimensional object OBJ is partially cut by the first optical mirror located in a direction of the viewer 10, making it difficult to implement a floating image.

On the other hand, when the absolute value of the ratio of the curvature of the first optical mirror OPb to the curvature of the second optical mirror OPa exceeds 1.25, light coming from an upper surface of the three-dimensional object OBJ is partially cut by the first optical mirror OPb located in a direction opposite to the direction of the viewer 10, making it difficult to implement a floating image.

Accordingly, the absolute value of the ratio of the curvature of the first optical mirror OPb to the curvature of the second optical mirror OPa is preferably in the range of 0.75 to 1.25 (e.g., 1.0). Accordingly, the viewing angle when displaying the floating image IM can be improved and the size of the display device 100 can be reduced.

Figure 8C:
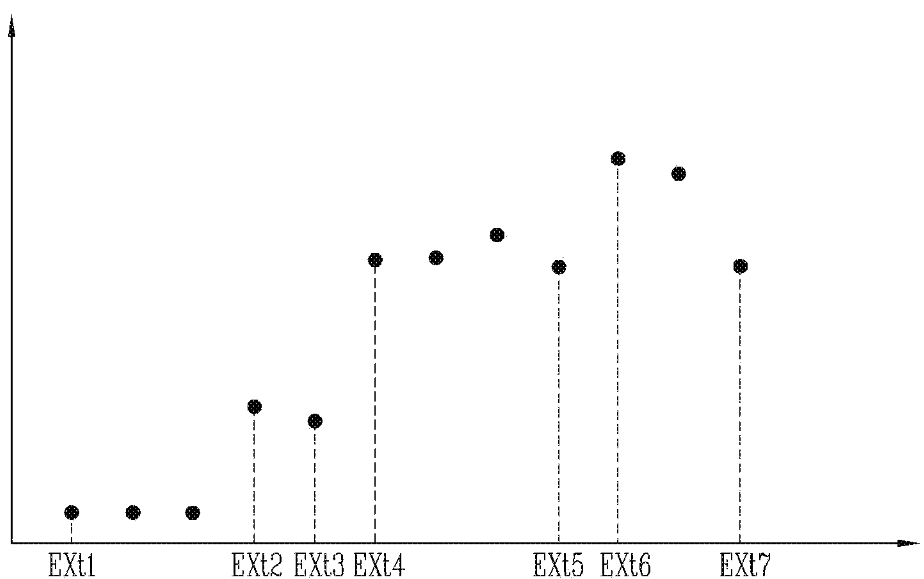

FIG. 8C is a diagram illustrating various examples of the absolute value of the ratio of the curvature of the first optical mirror OPb to the curvature of the second optical mirror OPa.

Referring to the drawing, the ratio of the curvature of the first optical mirror OPb to the curvature of the second optical mirror OPa in Example 1 (Ext1) is −1.26, the ratio of the curvature of the first optical mirror OPb to the curvature of the second optical mirror OPa in Example 2 (Ext2) is −1.10, the ratio of the curvature of the first optical mirror OPb to the curvature of the second optical mirror OPa in Example 3 (Ext3) is −1.12, the ratio of the curvature of the first optical mirror OPb to the curvature of the second optical mirror OPa in Example 4 (Ext4) is −0.89, the ratio of the curvature of the first optical mirror OPb to the curvature of the second optical mirror OPa in Example 5 (Ext5) is −0.90, the ratio of the curvature of the first optical mirror OPb to the curvature of the second optical mirror OPa in Example 6 (Ext6) is −0.74, and the ratio of the curvature of the first optical mirror OPb to the curvature of the second optical mirror OPa in Example 7 (Ext7) can be −0.90.

Accordingly, the viewing angle when displaying the floating image IM can be improved and the size of the display device 100 can be reduced.

Figure 9A:
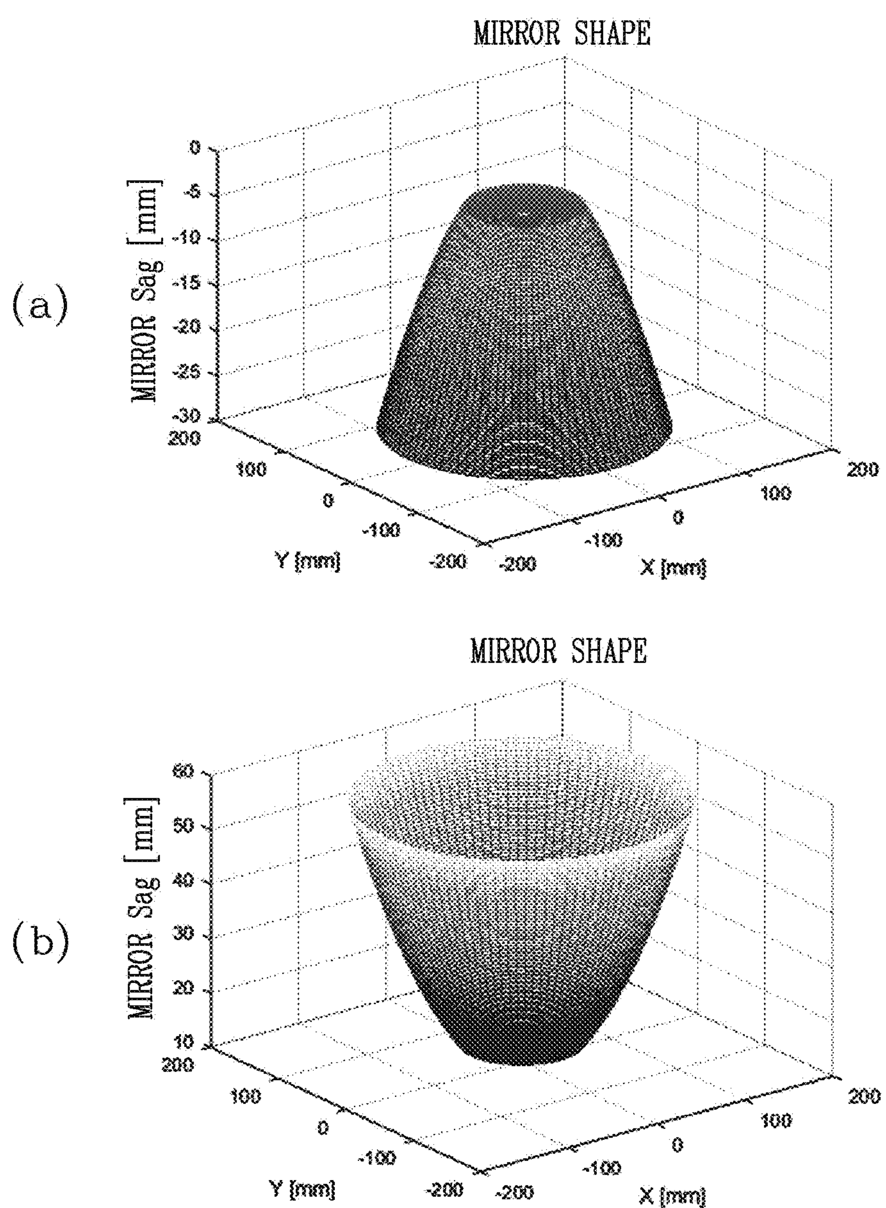

Part (a) of FIG. 9A illustrates the first optical mirror OPb corresponding to Example 1 (EXa1) of FIG. 8A, and part (b) of FIG. 9A illustrates the second optical mirror OPa corresponding to Example 1 (EXb1) of FIG. 8B.

Figure 9B:
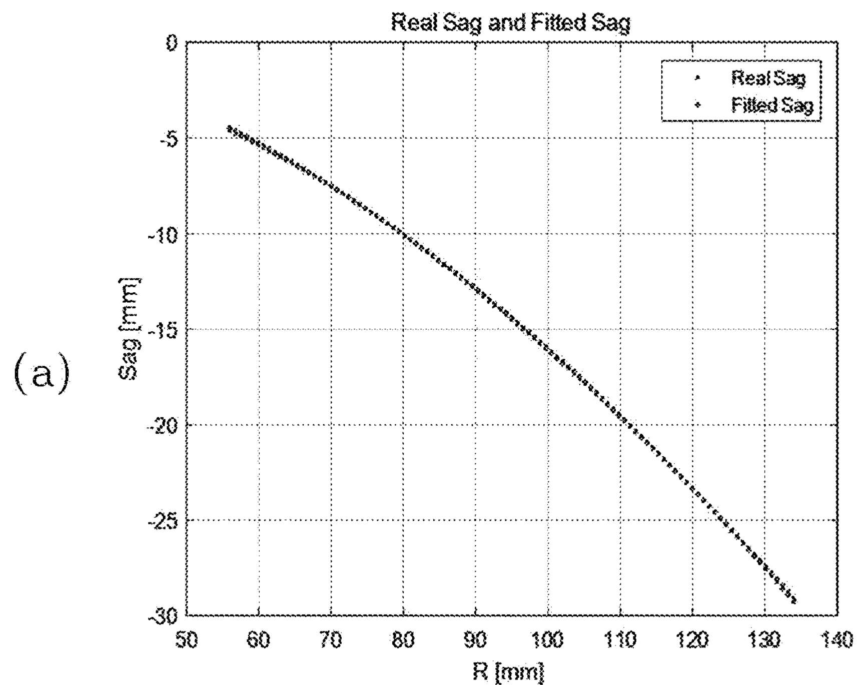
Figure 9B:
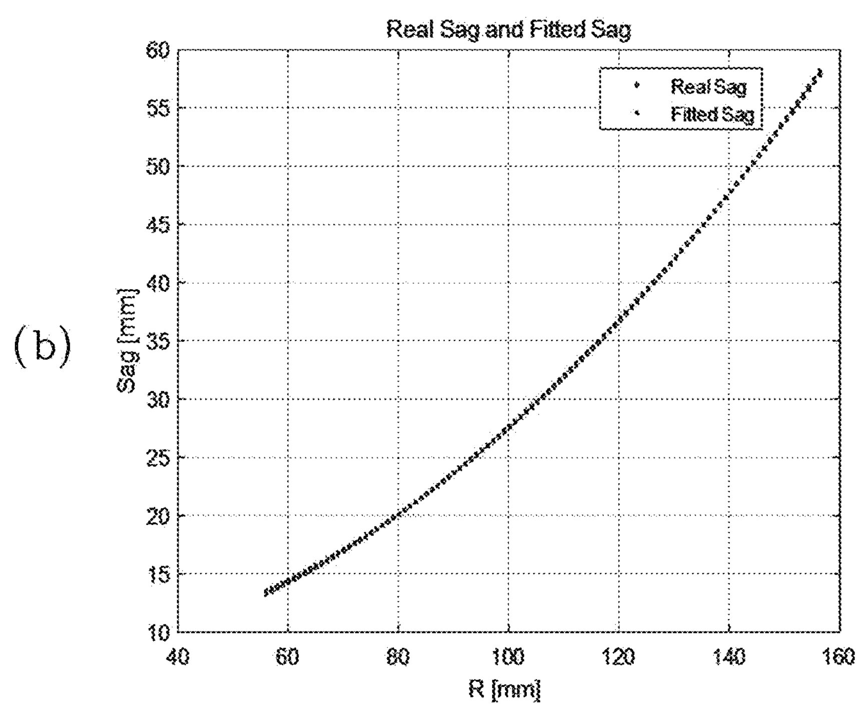

Part (a) of FIG. 9B illustrates the curved surface of the first optical mirror OPb corresponding to Example 1 (EXa1) of FIG. 8A, and part (b) of FIG. 9B illustrates the curved surface of the second optical mirror OPa corresponding to Example 1 (EXb1) of FIG. 8B.

Figure 9C:
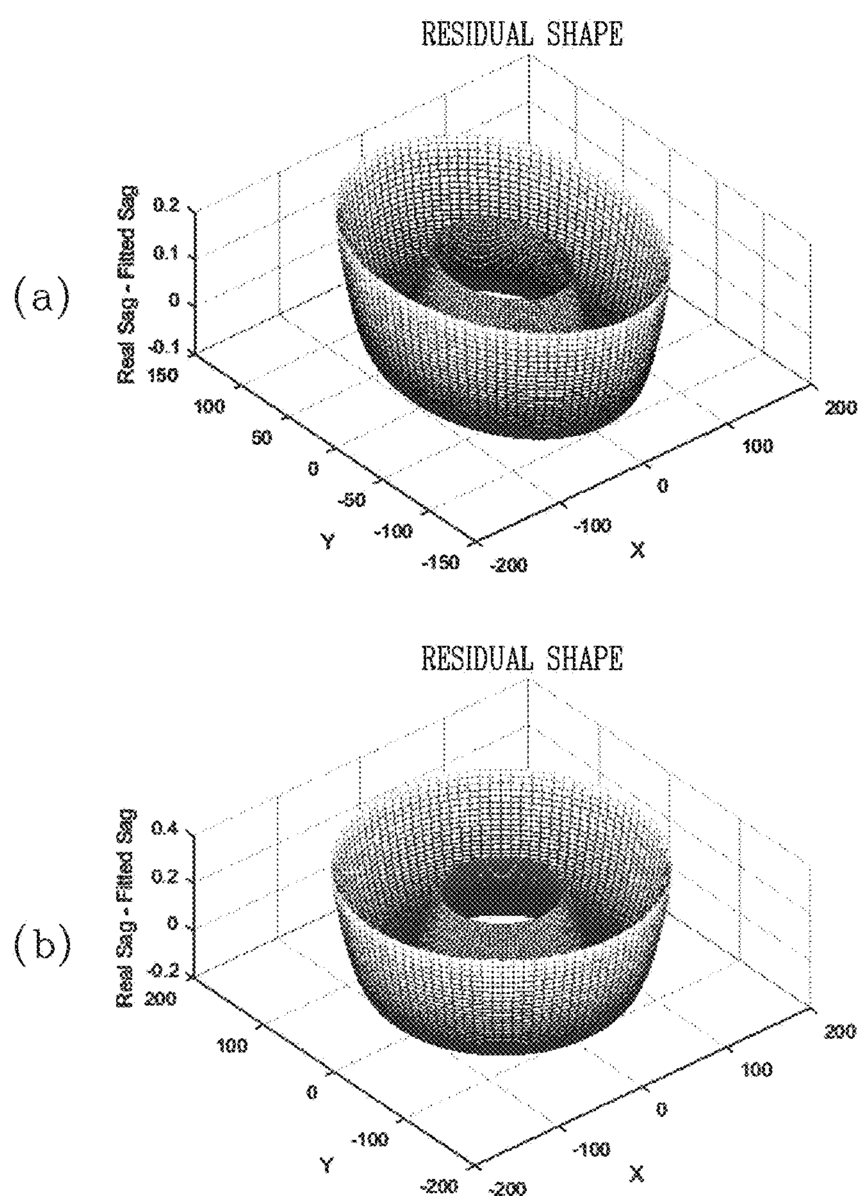

Part (a) of FIG. 9C illustrates a residual shape of the first optical mirror OPb corresponding to Example 1 (EXa1) of FIG. 8A, and part (b) of FIG. 9C illustrates a residual shape of the second optical mirror OPa corresponding to Example 1 (EXb1) of FIG. 8B.

Figure 9D:
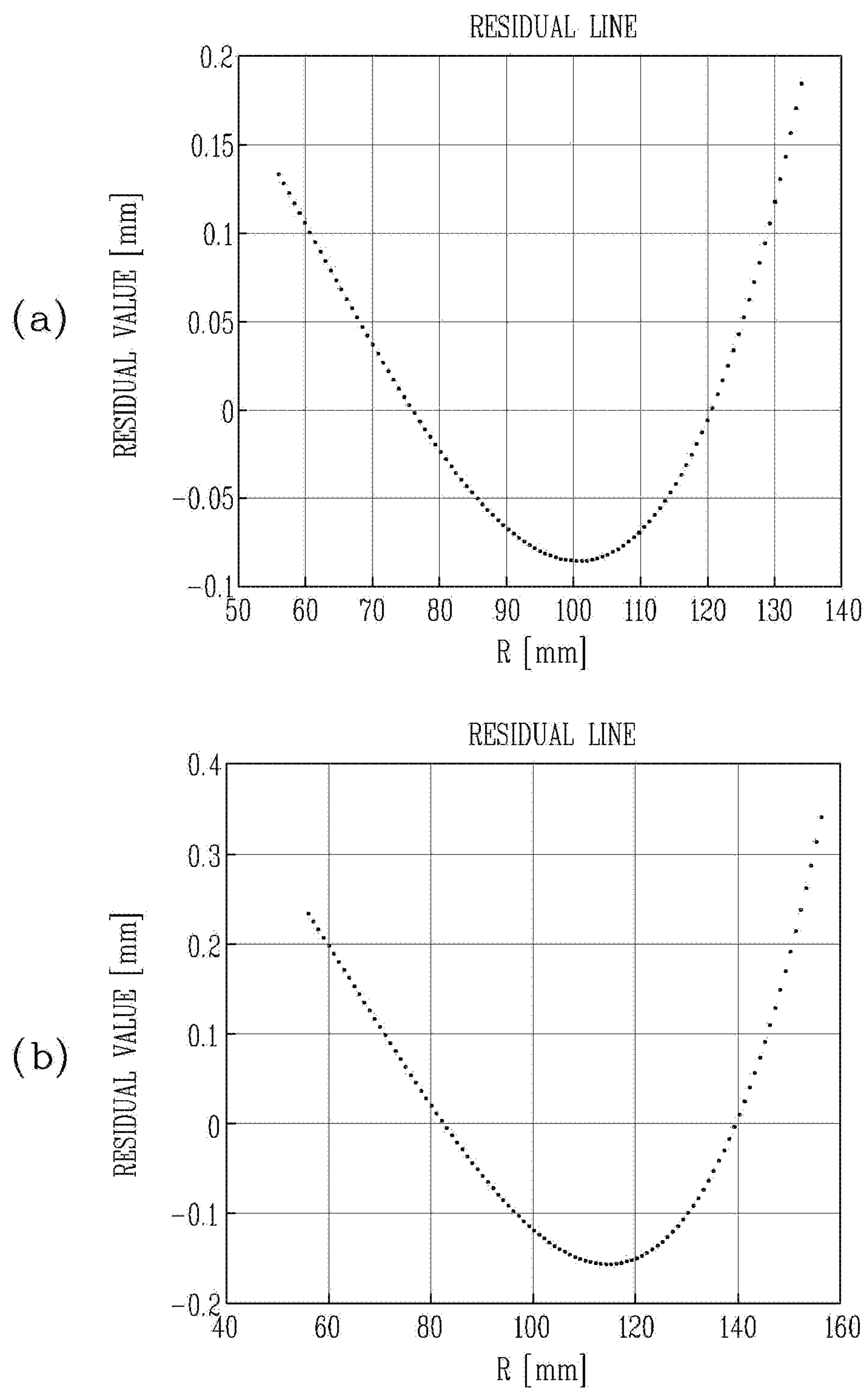

Part (a) of FIG. 9D illustrates a residual graph of the first optical mirror OPb corresponding to Example 1 (EXa1) of FIG. 8A, and part (b) of FIG. 9D illustrates a residual graph of the second optical mirror OPa corresponding to Example 1 (EXb1) of FIG. 8B.

Referring to of FIG. 9D, the residual GRc, which is the difference between the curved surface GRb and the parabolic surface GRa of the first optical mirror OPb, is asymmetrically formed at both ends of the first optical mirror OPb.

In addition, a second residual, which is the difference between the curved surface and the second parabolic surface of the second optical mirror OPa, is asymmetrically formed at both ends of the second optical mirror OPa. This can improve the viewing angle when displaying the floating image IM. This can also reduce the size of the display device 100.

Figure 10A:
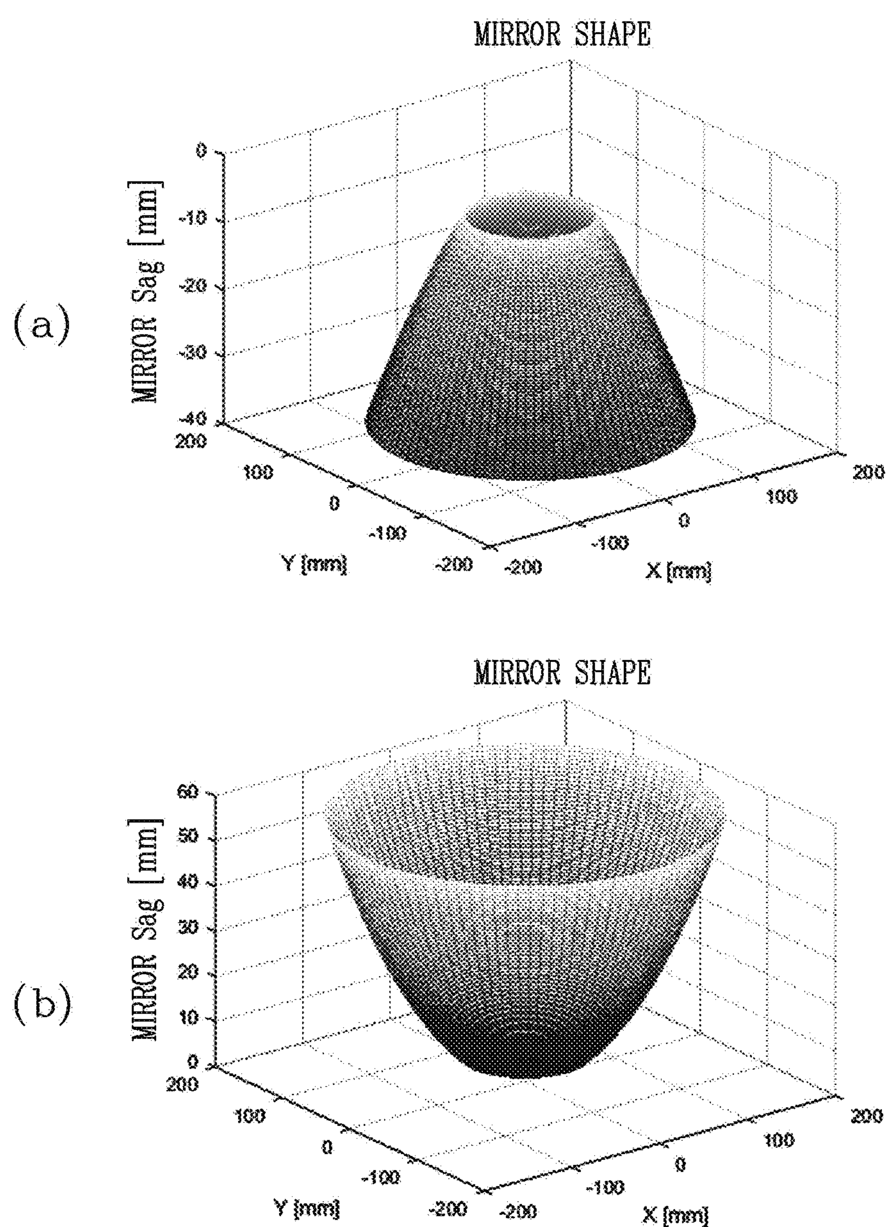

Part (a) of FIG. 10A illustrates the first optical mirror OPb corresponding to Example 2 (EXa2) of FIG. 8A, and part (b) of FIG. 10A illustrates the second optical mirror OPa corresponding to Example 2 (EXb2) of FIG. 8B.

Figure 10B:
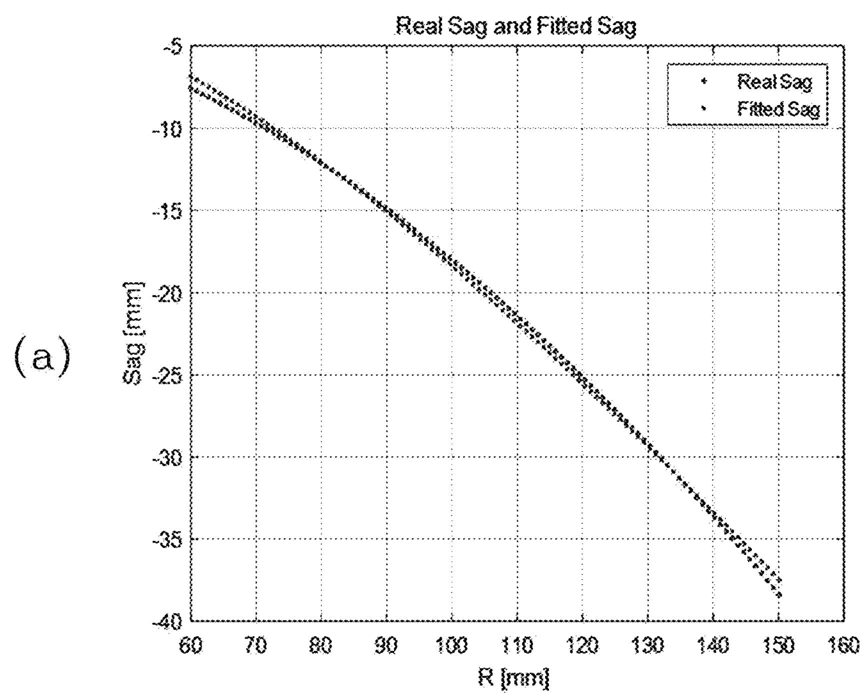
Figure 10B:
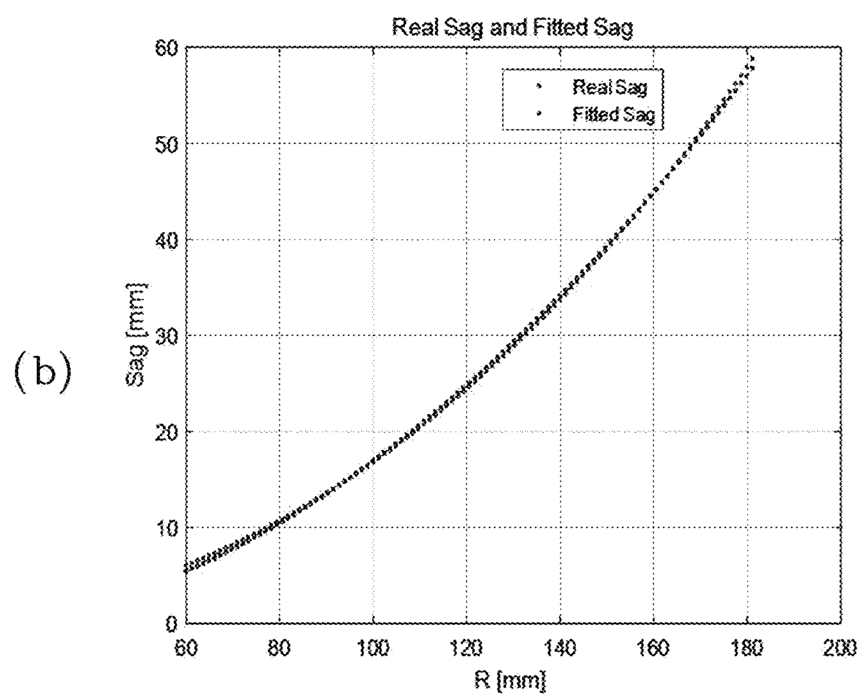

Part (a) of FIG. 10B illustrates the curved surface of the first optical mirror OPb corresponding to Example 2 (EXa2) of FIG. 8A, and part (b) of FIG. 10B illustrates the curved surface of the second optical mirror OPa corresponding to Example 2 (EXb2) of FIG. 8B.

Figure 10C:
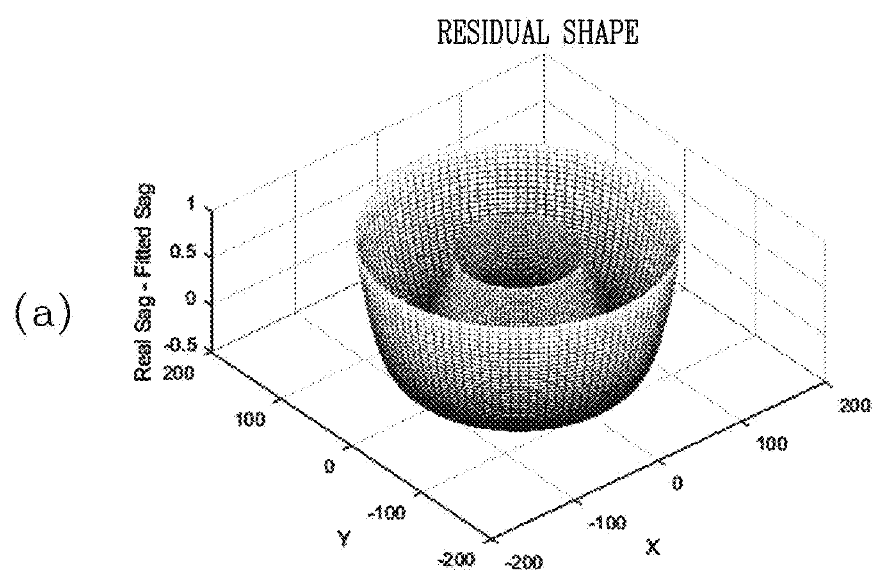
Figure 10C:
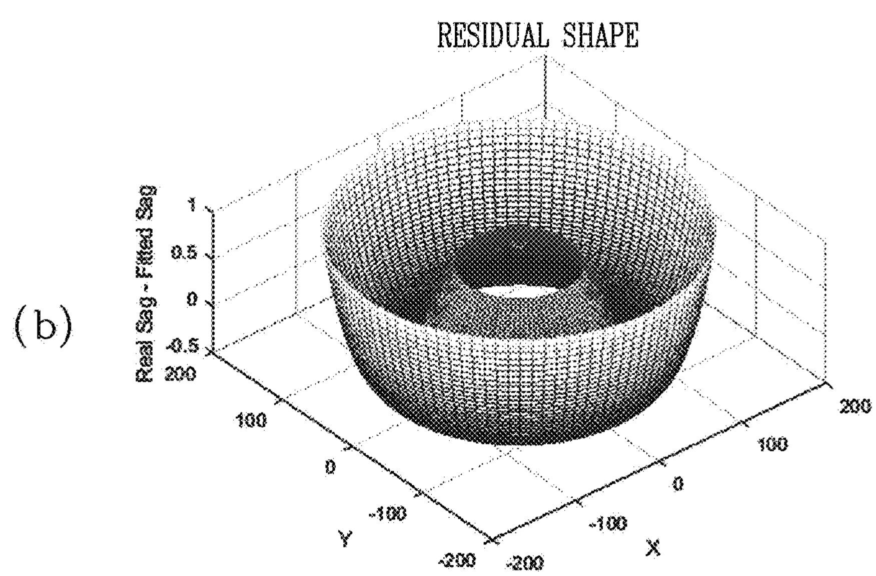

Part (a) of FIG. 10C illustrates a residual shape of the first optical mirror OPb corresponding to Example 2 (EXa2) of FIG. 8A, and part (b) of FIG. 10C illustrates a residual shape of the second optical mirror OPa corresponding to Example 2 (EXb2) of FIG. 8B.

Figure 10D:
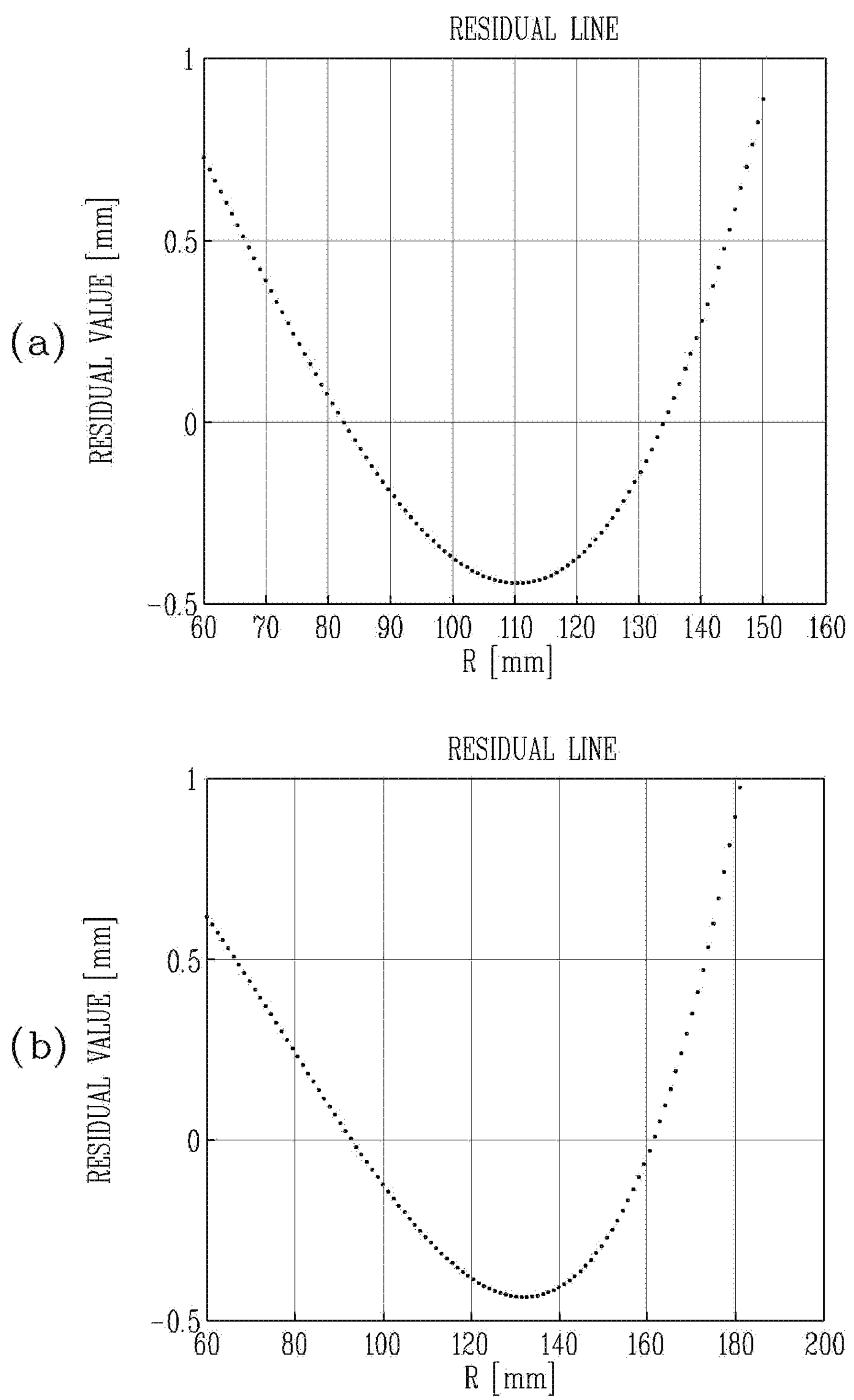

Part (a) of FIG. 10D illustrates a residual graph of the first optical mirror OPb corresponding to Example 2 (EXa2) of FIG. 8A, and part (b) of FIG. 10D illustrates a residual graph of the second optical mirror OPa corresponding to Example 2 (EXb2) of FIG. 8B.

Referring to of FIG. 10D, the residual GRc, which is the difference between the curved surface GRb and the parabolic surface GRa of the first optical mirror OPb, is asymmetrically formed at both ends of the first optical mirror OPb.

Figure 11A:
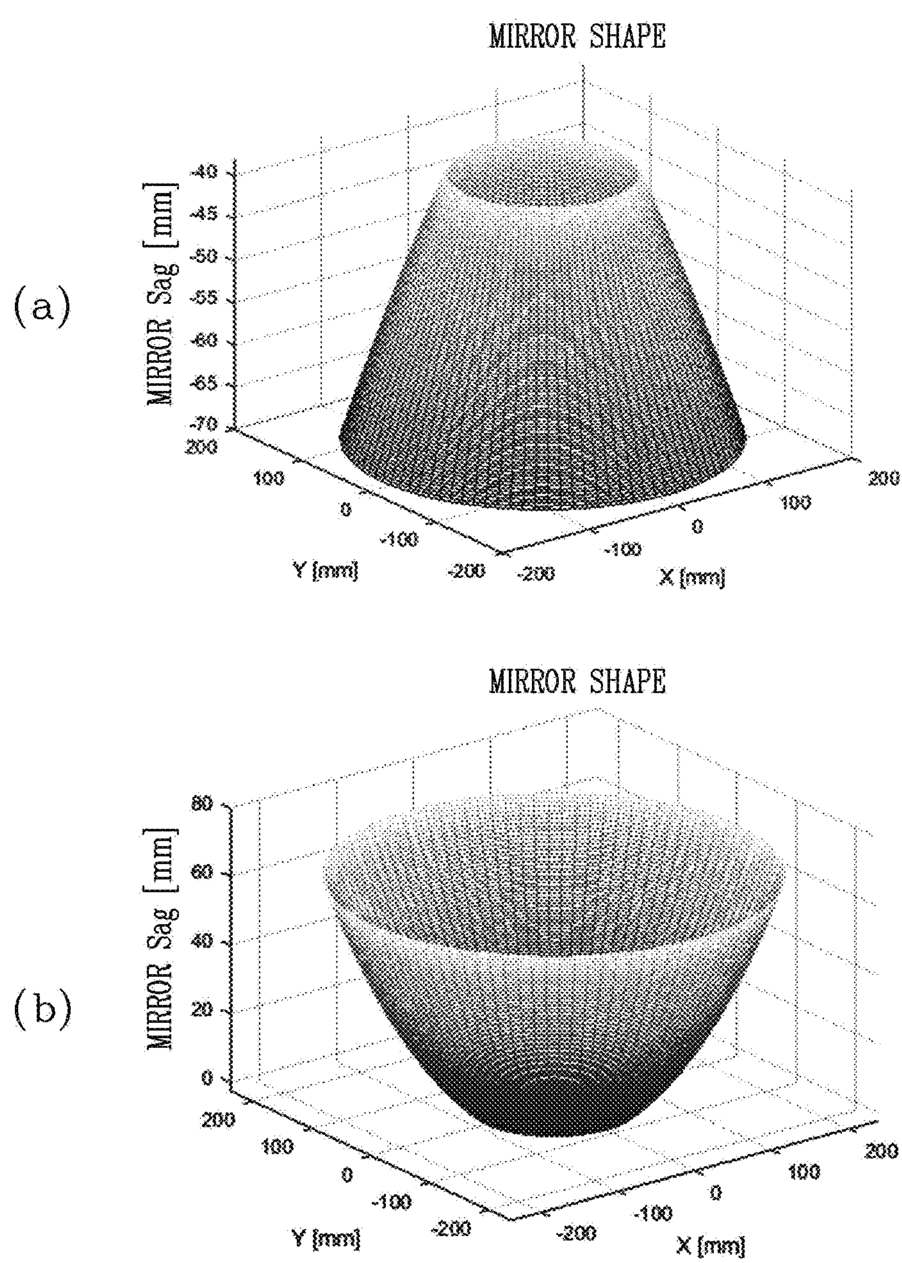

Part (a) of FIG. 11A illustrates the first optical mirror OPb corresponding to Example 3 (EXa3) of FIG. 8A, and part (b) of FIG. 11A illustrates the second optical mirror OPa corresponding to Example 3 (EXb3) of FIG. 8B.

Figure 11B:
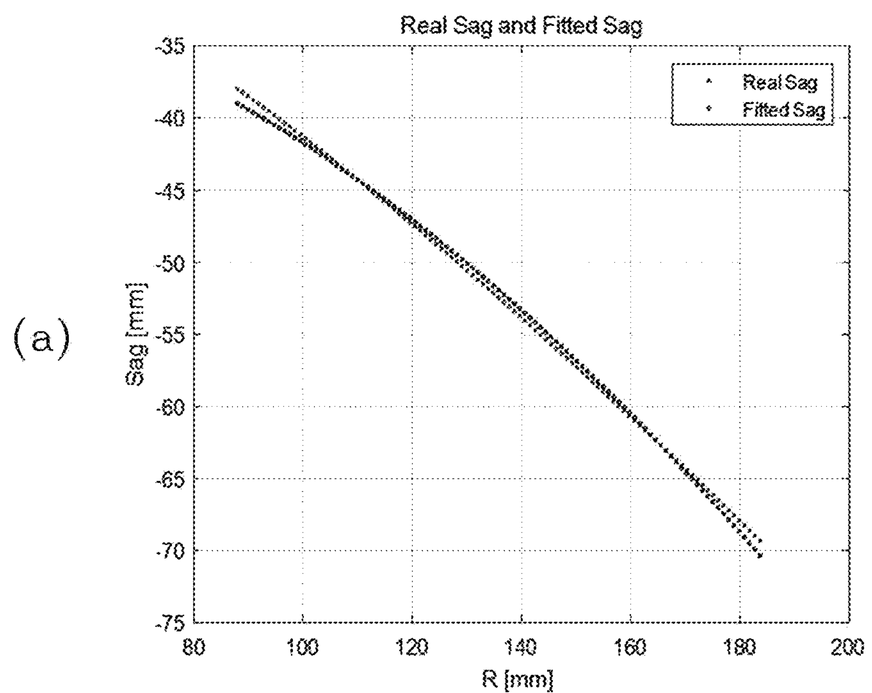
Figure 11B:
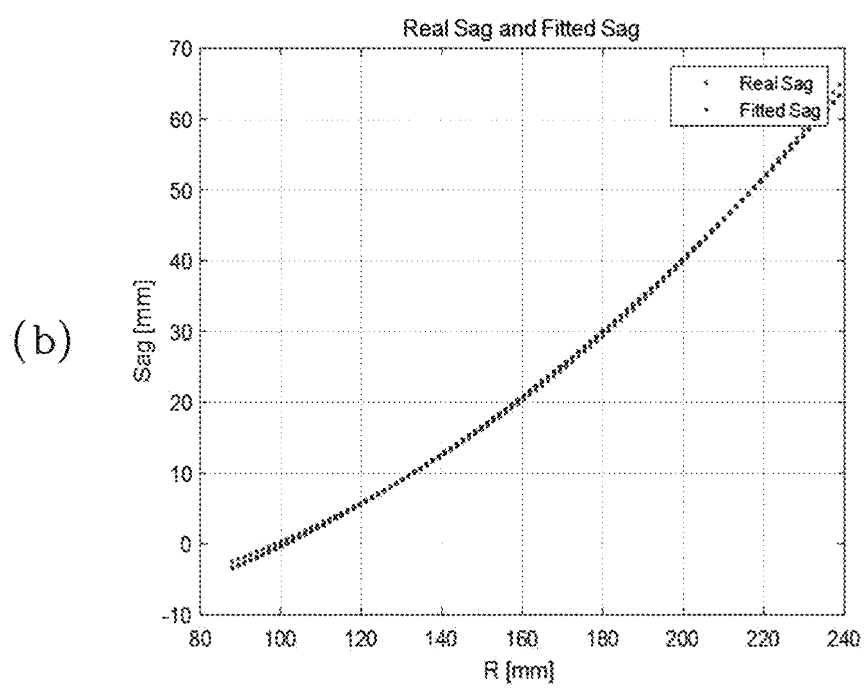

Part (a) of FIG. 11B illustrates the curved surface of the first optical mirror OPb corresponding to Example 3 (EXa3) of FIG. 8A, and part (b) of FIG. 11B illustrates the curved surface of the second optical mirror OPa corresponding to Example 3 (EXb3) of FIG. 8B.

Figure 11C:
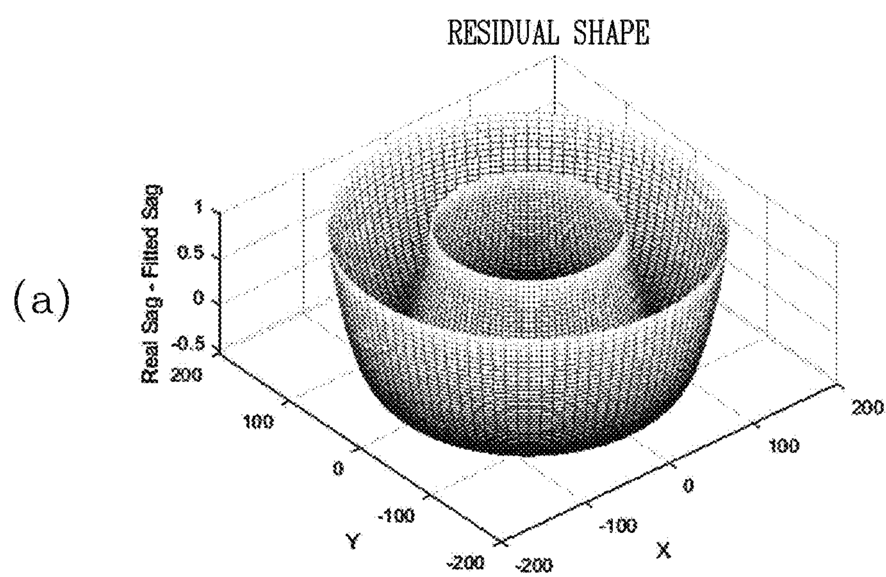
Figure 11C:
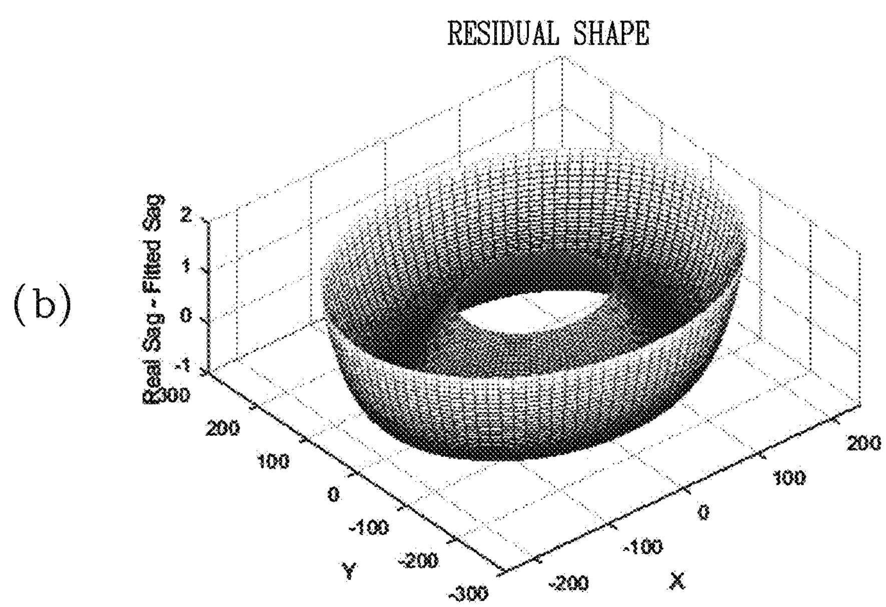

Part (a) of FIG. 11C illustrates a residual shape of the first optical mirror OPb corresponding to Example 3 (EXa3) of FIG. 8A, and part (b) of FIG. 11C illustrates a residual shape of the second optical mirror OPa corresponding to Example 3 (EXb3) of FIG. 8B.

Figure 11D:
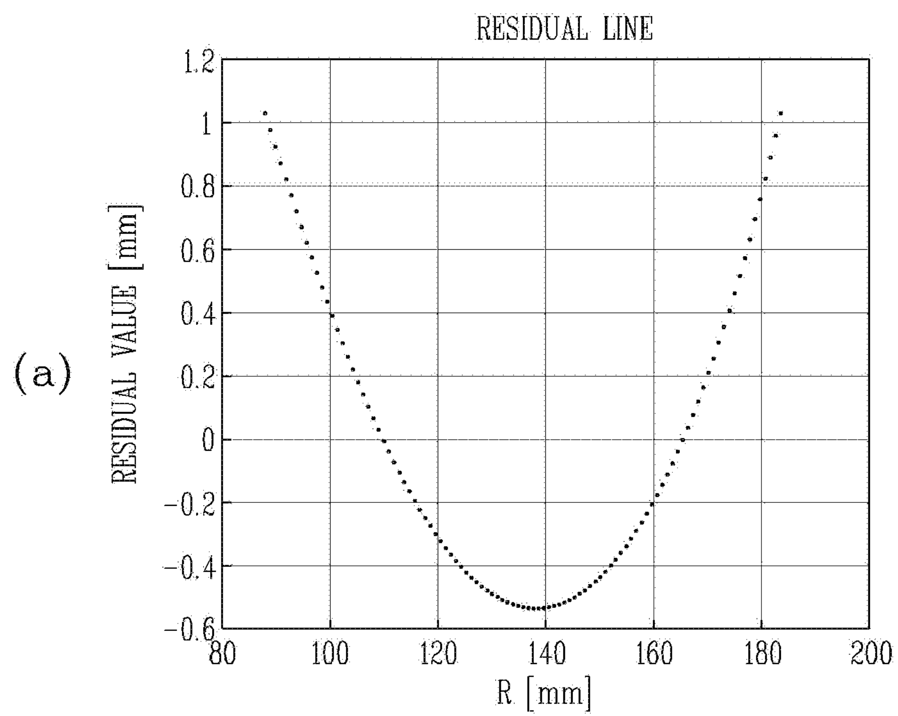
Figure 11D:
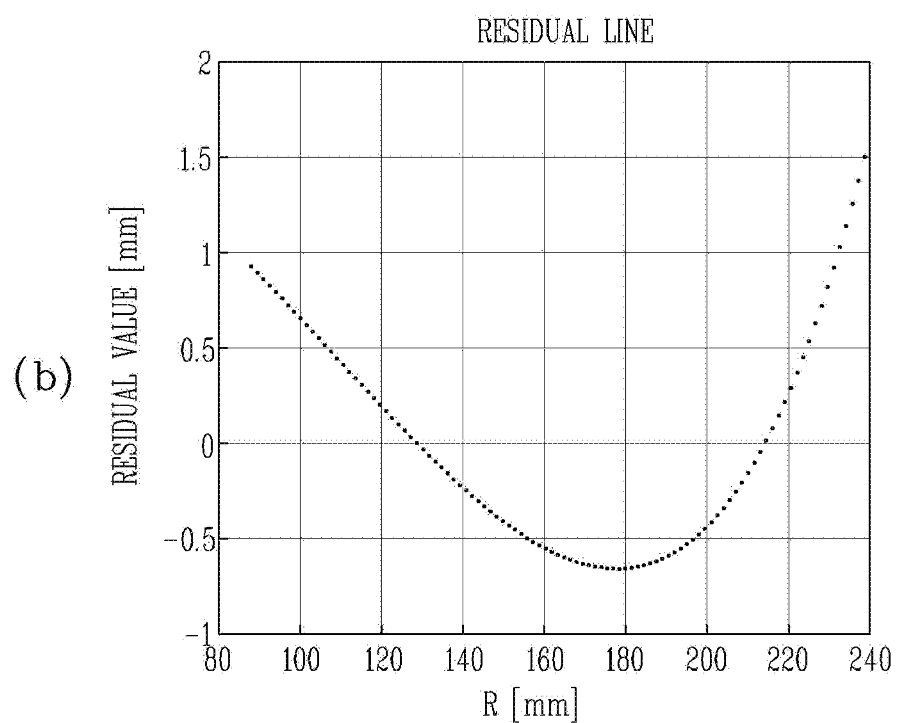

Part (a) of FIG. 11D illustrates a residual graph of the first optical mirror OPb corresponding to Example 3 (EXa3) of FIG. 8A. and part (b) of FIG. 11D illustrates a residual graph of the second optical mirror OPa corresponding to Example 3 (EXb3) of FIG. 8B.

Referring to of FIG. 11D, the residual GRc, which is the difference between the curved surface GRb and the parabolic surface GRa of the first optical mirror OPb, is asymmetrically formed at both ends of the first optical mirror OPb.

Figure 12A:
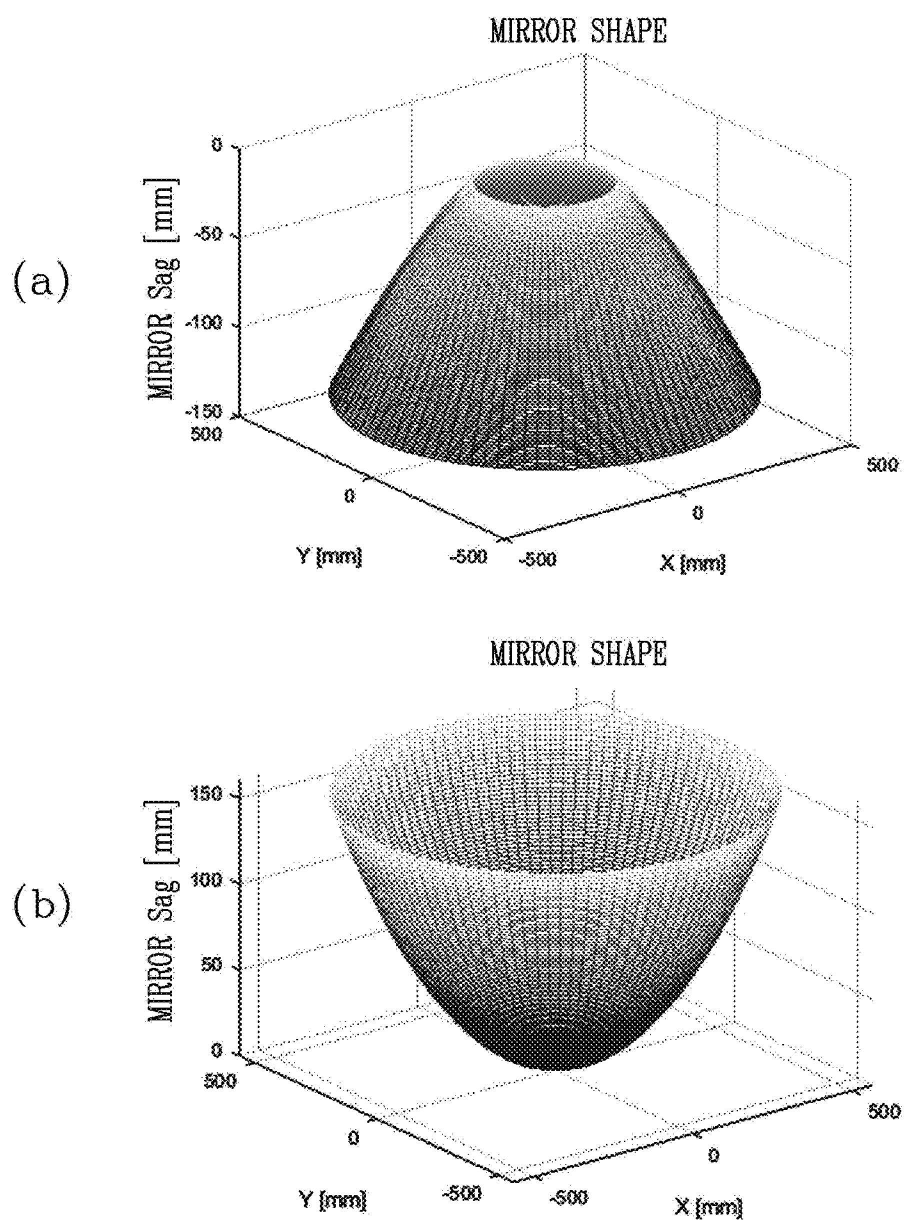

Part (a) of FIG. 12A illustrates the first optical mirror OPb corresponding to Example 4 (EXa4) of FIG. 8A, and part (b) of FIG. 12A illustrates the second optical mirror OPa corresponding to Example 4 (EXb4) of FIG. 8B.

Figure 12B:
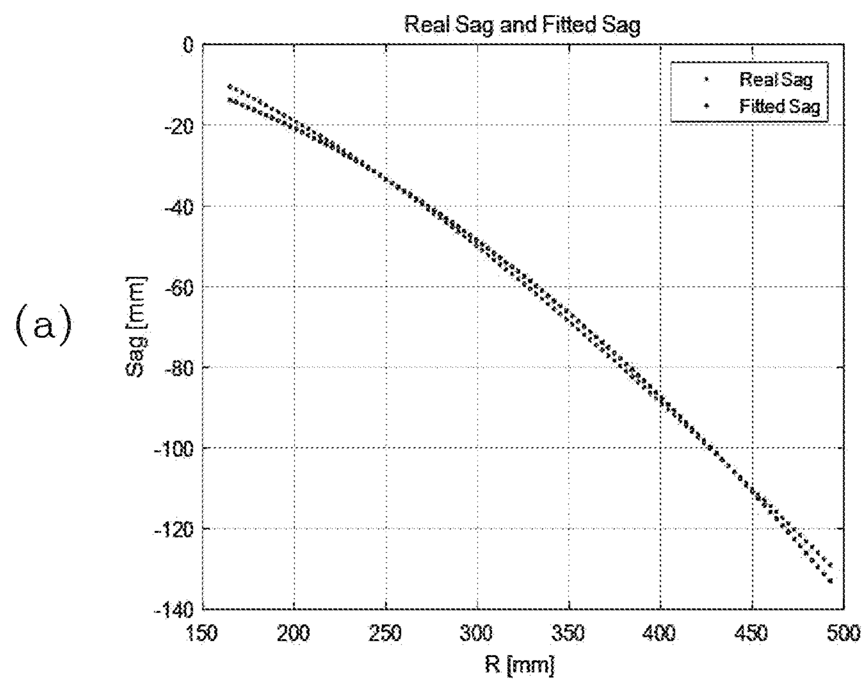
Figure 12B:
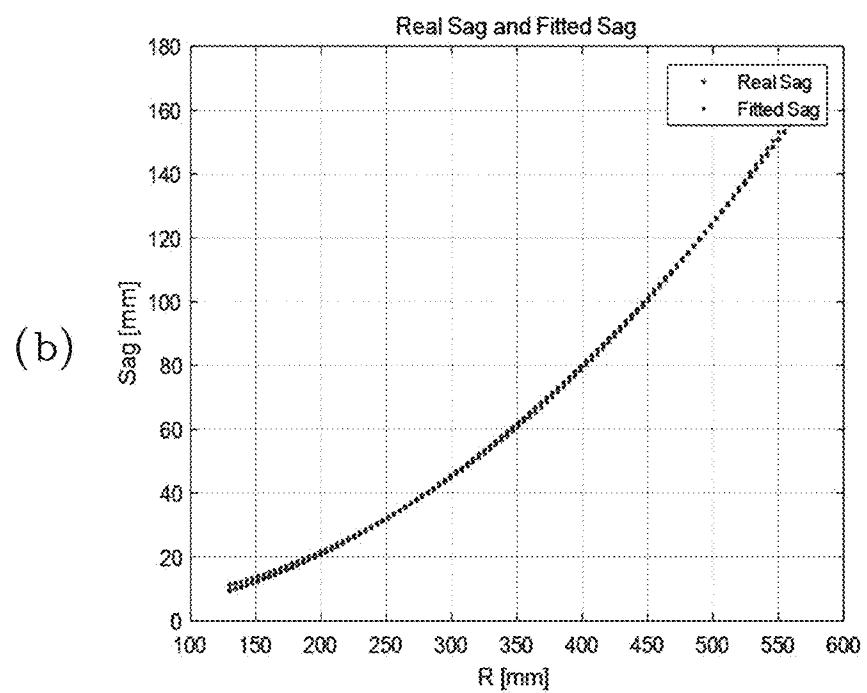

Part (a) of FIG. 12B illustrates the curved surface of the first optical mirror OPb corresponding to Example 4 (EXa4) of FIG. 8A, and part (b) of FIG. 12B illustrates the curved surface of the second optical mirror OPa corresponding to Example 4 (EXb4) of FIG. 8B.

Figure 12C:
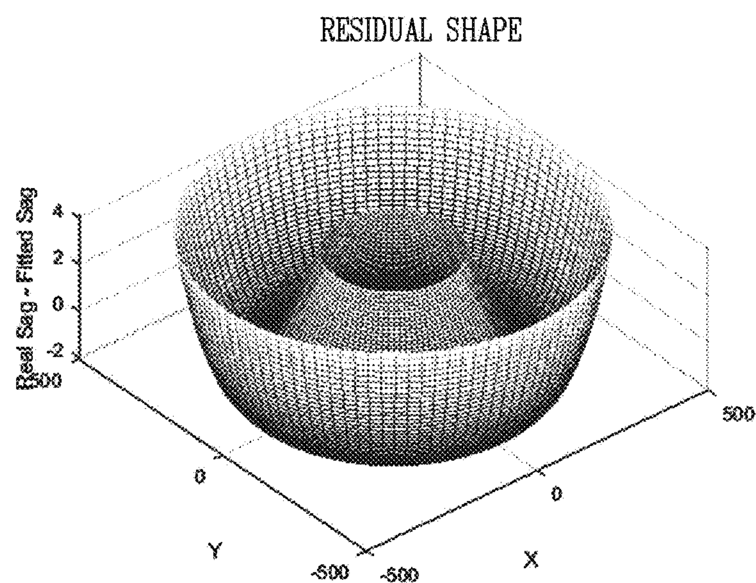
Figure 12C:
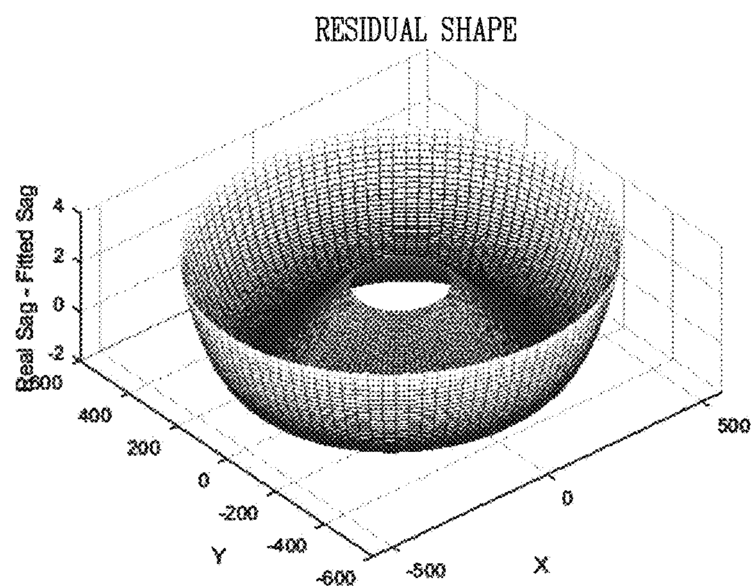

Part (a) of FIG. 12C illustrates a residual shape of the first optical mirror OPb corresponding to Example 4 (EXa4) of FIG. 8A, and part (b) of FIG. 12C illustrates a residual shape of the second optical mirror OPa corresponding to Example 4 (EXb4) of FIG. 8B.

Figure 12D:
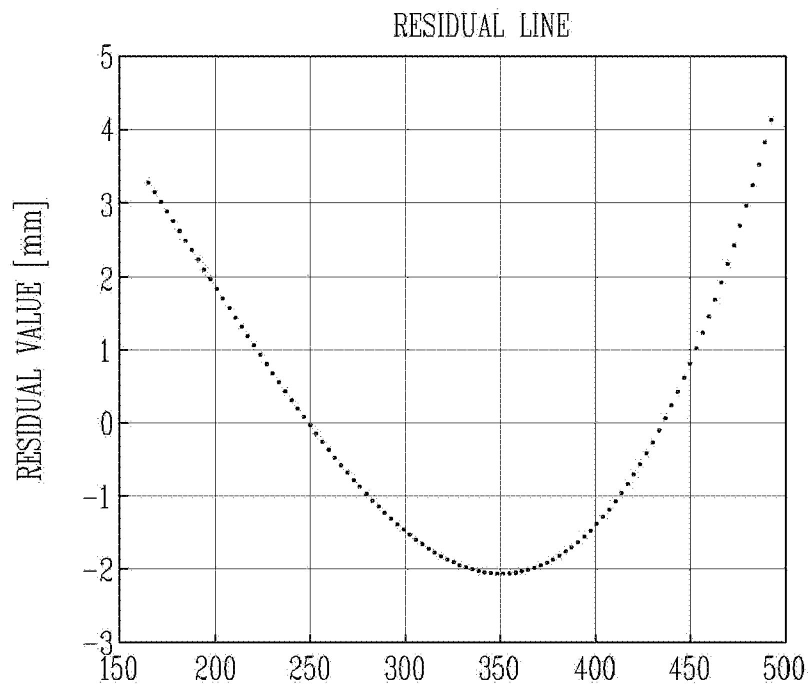
Figure 12D:
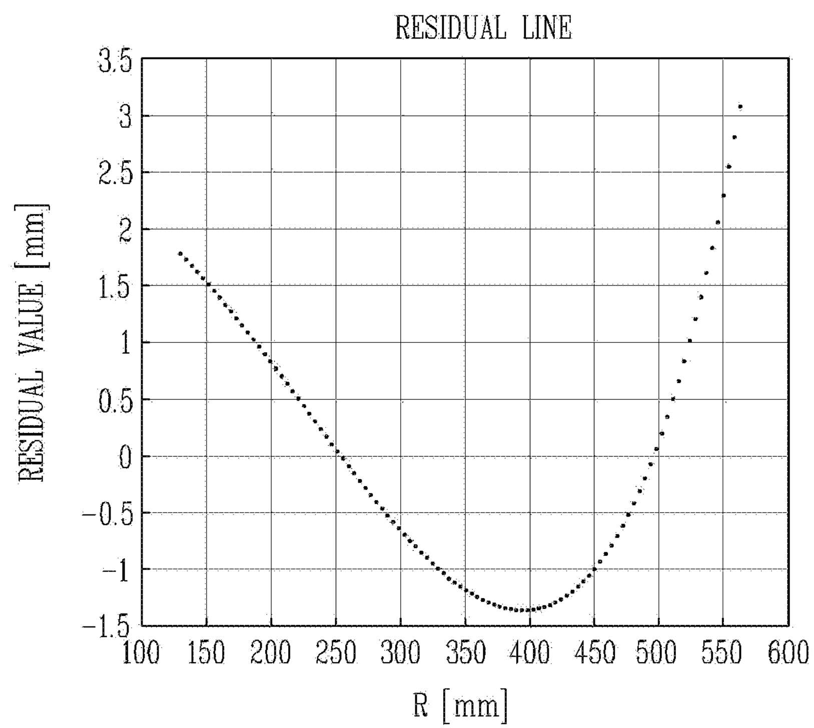

Part (a) of FIG. 12D illustrates a residual graph of the first optical mirror OPb corresponding to Example 4 (EXa4) of FIG. 8A, and part (b) of FIG. 12D illustrates a residual graph of the second optical mirror OPa corresponding to Example 4 (EXb4) of FIG. 8B.

Referring to FIG. 12D, the residual GRc that is the difference between the curved surface GRb and the parabolic surface GRa of the first optical mirror OPb is asymmetrically formed at both ends of the first optical mirror OPb.

Figure 13A:
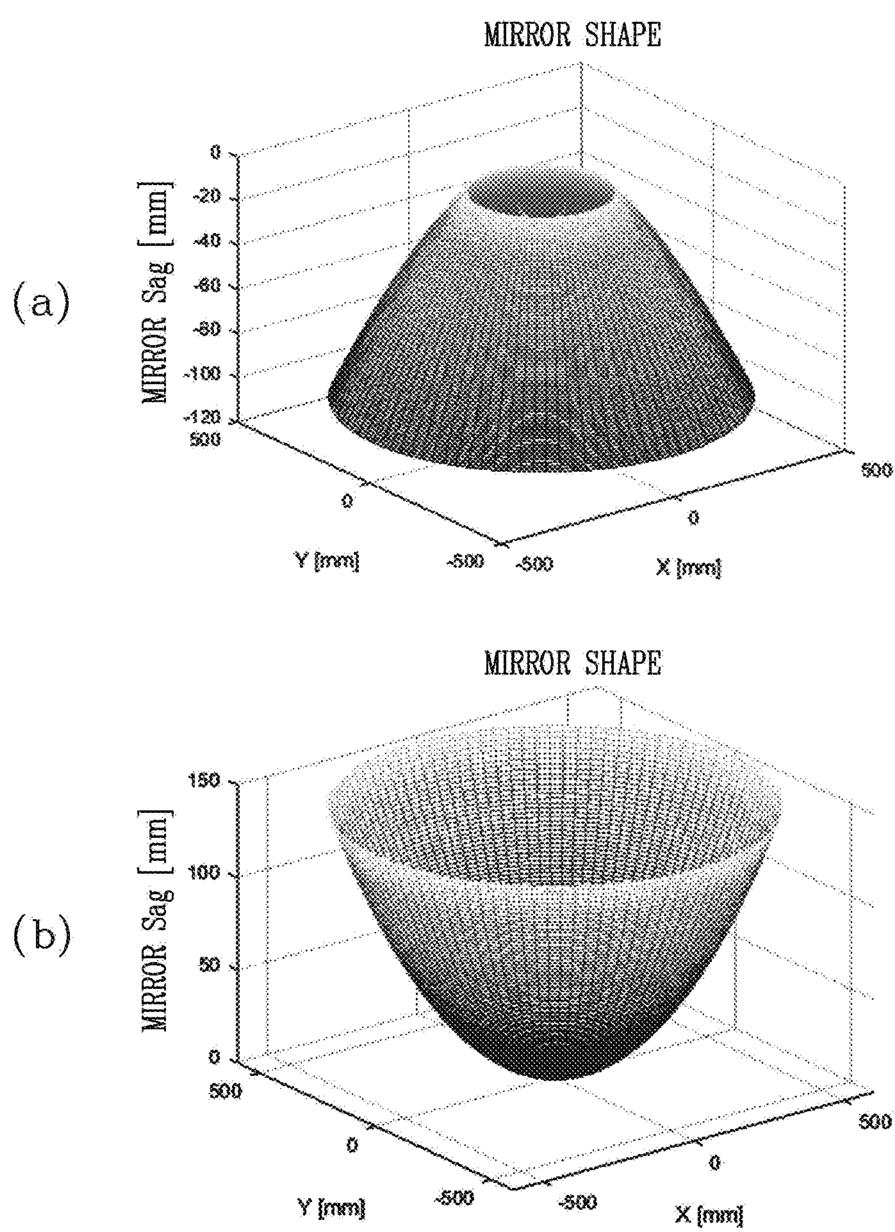

Part (a) of FIG. 13A illustrates the first optical mirror OPb corresponding to Example 5 (EXa5) of FIG. 8A, and part (b) of FIG. 13A illustrates the second optical mirror OPa corresponding to Example 5 (EXb5) of FIG. 8B.

Figure 13B:
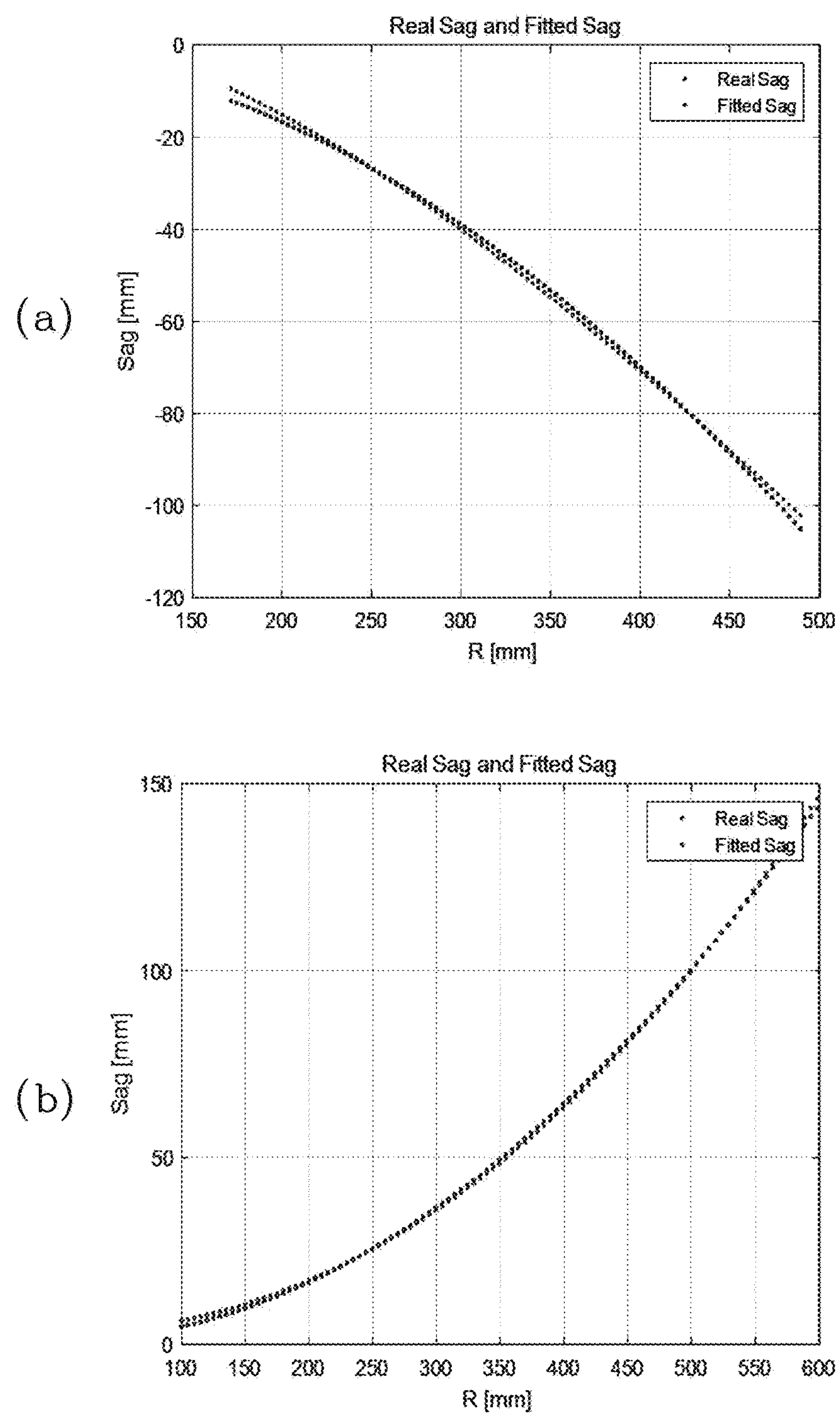

Part (a) of FIG. 13B illustrates the curved surface of the first optical mirror OPb corresponding to Example 5 (EXa5) of FIG. 8A, and part (b) of FIG. 13B illustrates the curved surface of the second optical mirror OPa corresponding to Example 5 (EXb5) of FIG. 8B.

Figure 13C:
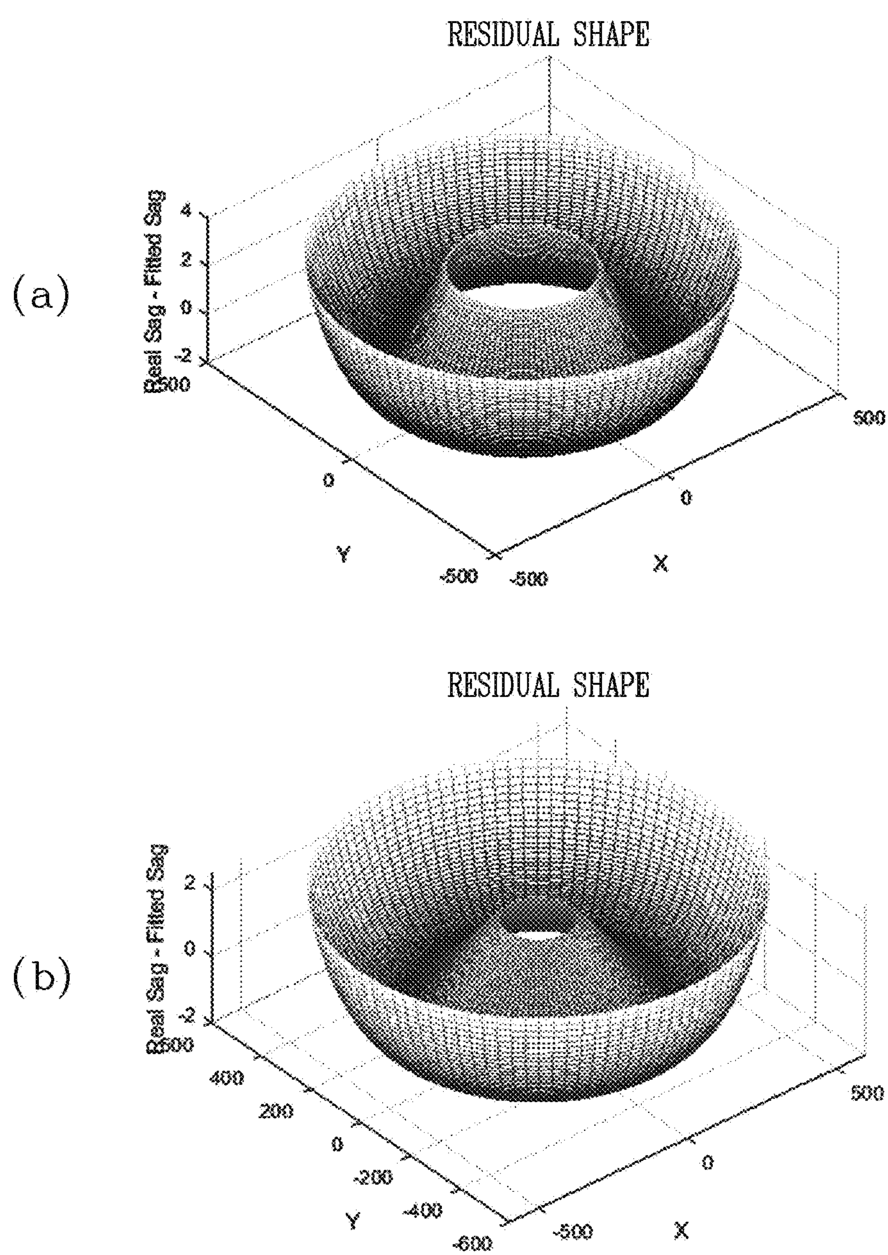

Part (a) of FIG. 13C illustrates a residual shape of the first optical mirror OPb corresponding to Example 5 (EXa5) of FIG. 8A, and part (b) of FIG. 13C illustrates a residual shape of the second optical mirror OPa corresponding to Example 5 (EXb5) of FIG. 8B.

Figure 13D:
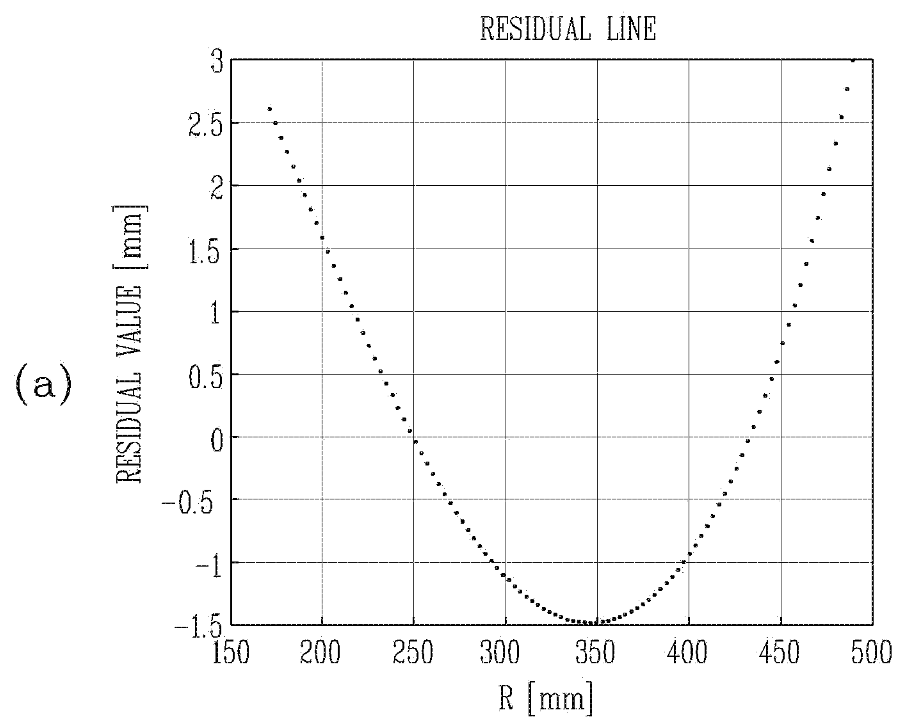
Figure 13D:
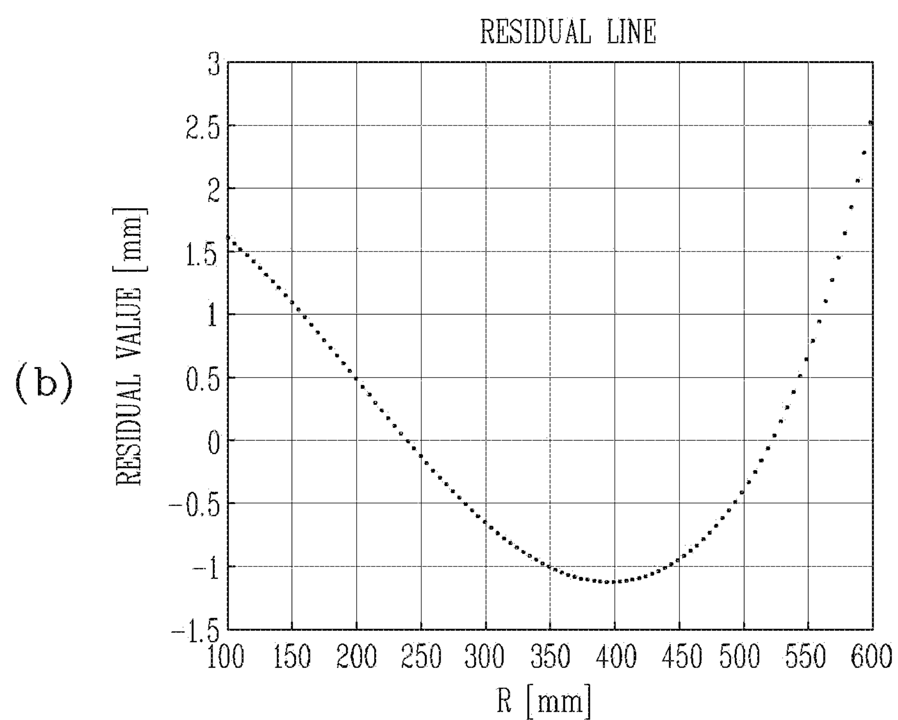

Part (a) of FIG. 13D illustrates a residual graph of the first optical mirror OPb corresponding to Example 5 (EXa5) of FIG. 8A, and part (b) of FIG. 13D illustrates a residual graph of the second optical mirror OPa corresponding to Example 5 (EXb5) of FIG. 8B.

Referring to FIG. 13D, the residual GRc that is the difference between the curved surface GRb and the parabolic surface GRa of the first optical mirror OPb is asymmetrically formed at both ends of the first optical mirror OPb.

Figure 14A:
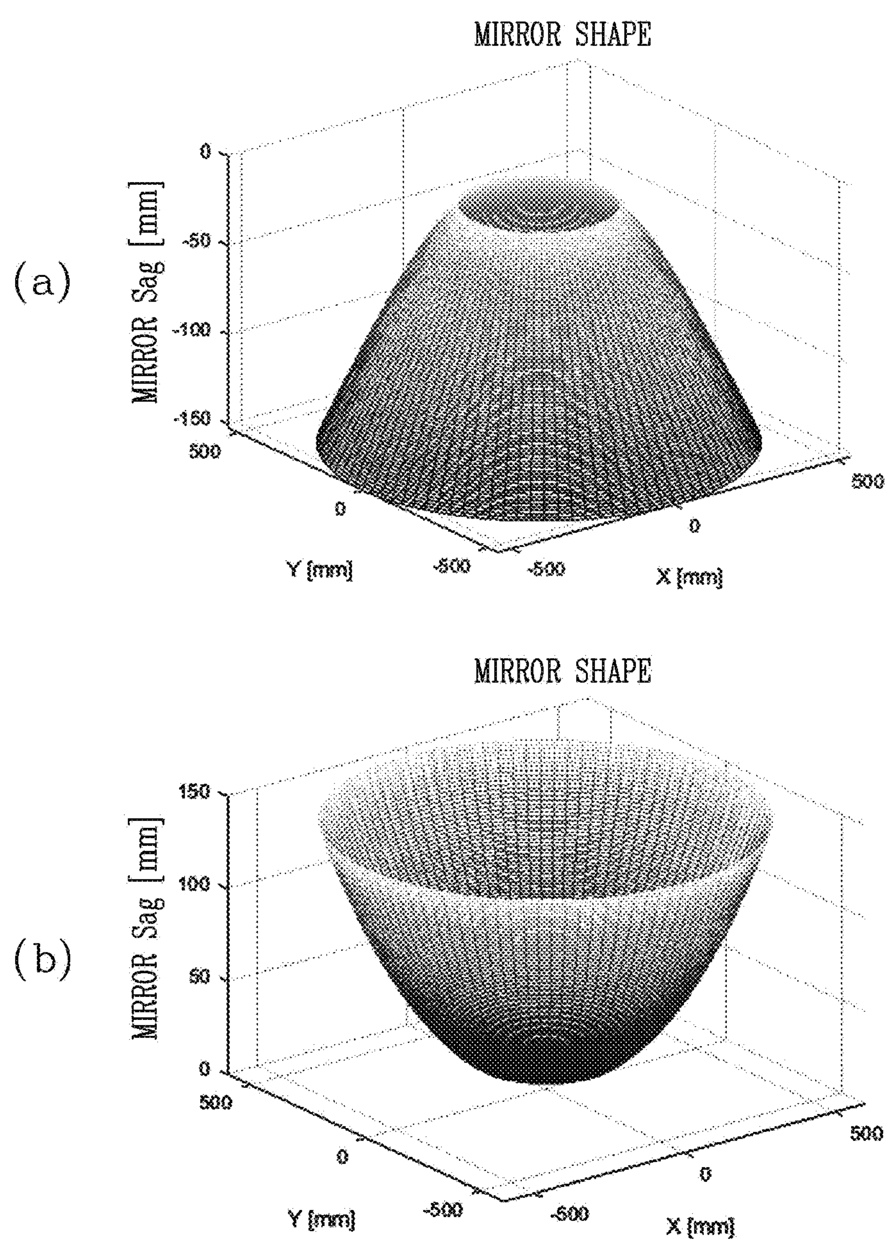

Part (a) of FIG. 14A illustrates the first optical mirror OPb corresponding to Example 6 (EXa6) of FIG. 8A, and part (b) of FIG. 14A illustrates the second optical mirror OPa corresponding to Example 6 (EXb6) of FIG. 8B.

Figure 14B:
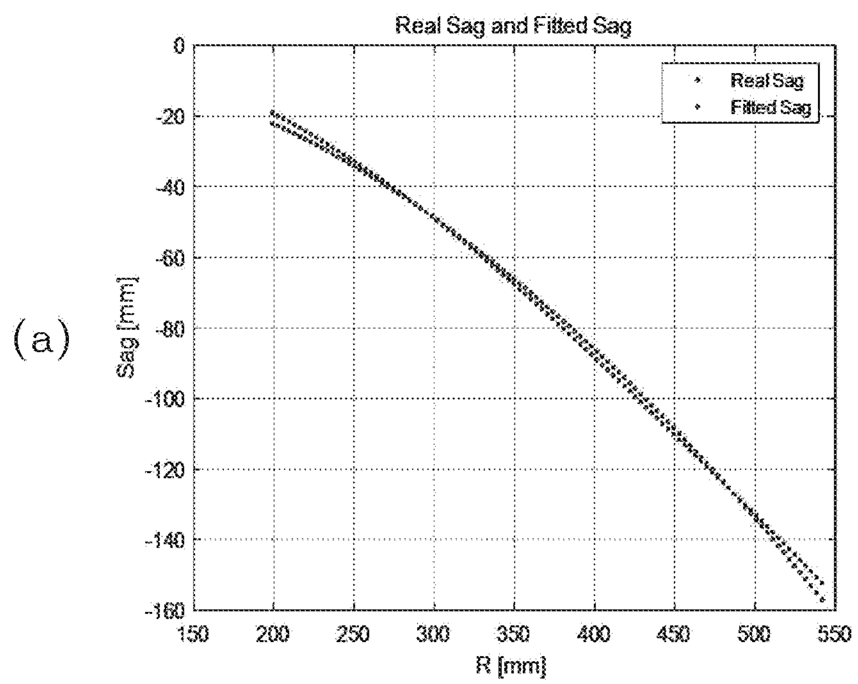
Figure 14B:
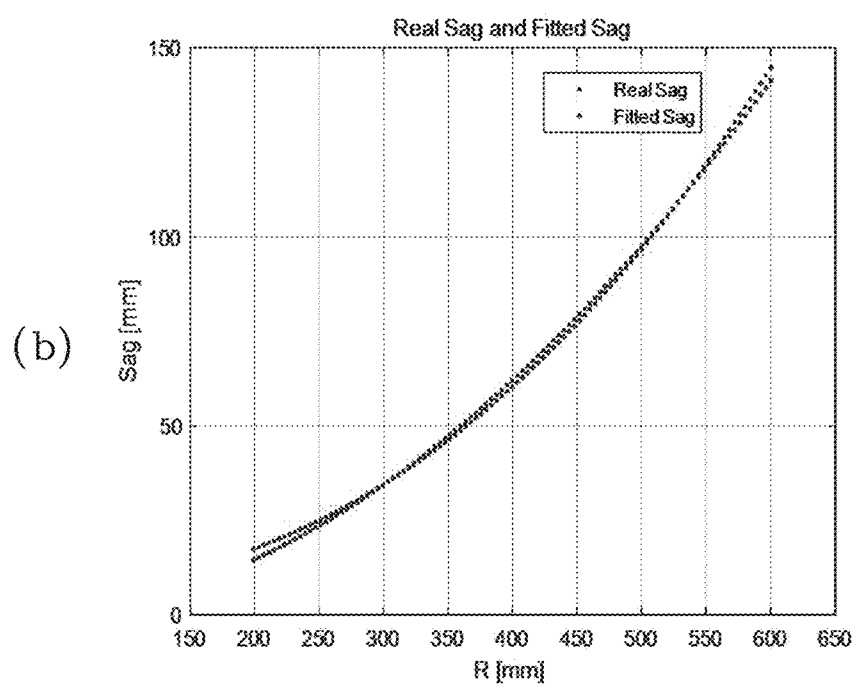

Part (a) of FIG. 14B illustrates the curved surface of the first optical mirror OPb corresponding to Example 6 (EXa6) of FIG. 8A, and part (b) of FIG. 14B illustrates the curved surface of the second optical mirror OPa corresponding to Example 6 (EXb6) of FIG. 8B.

Figure 14C:
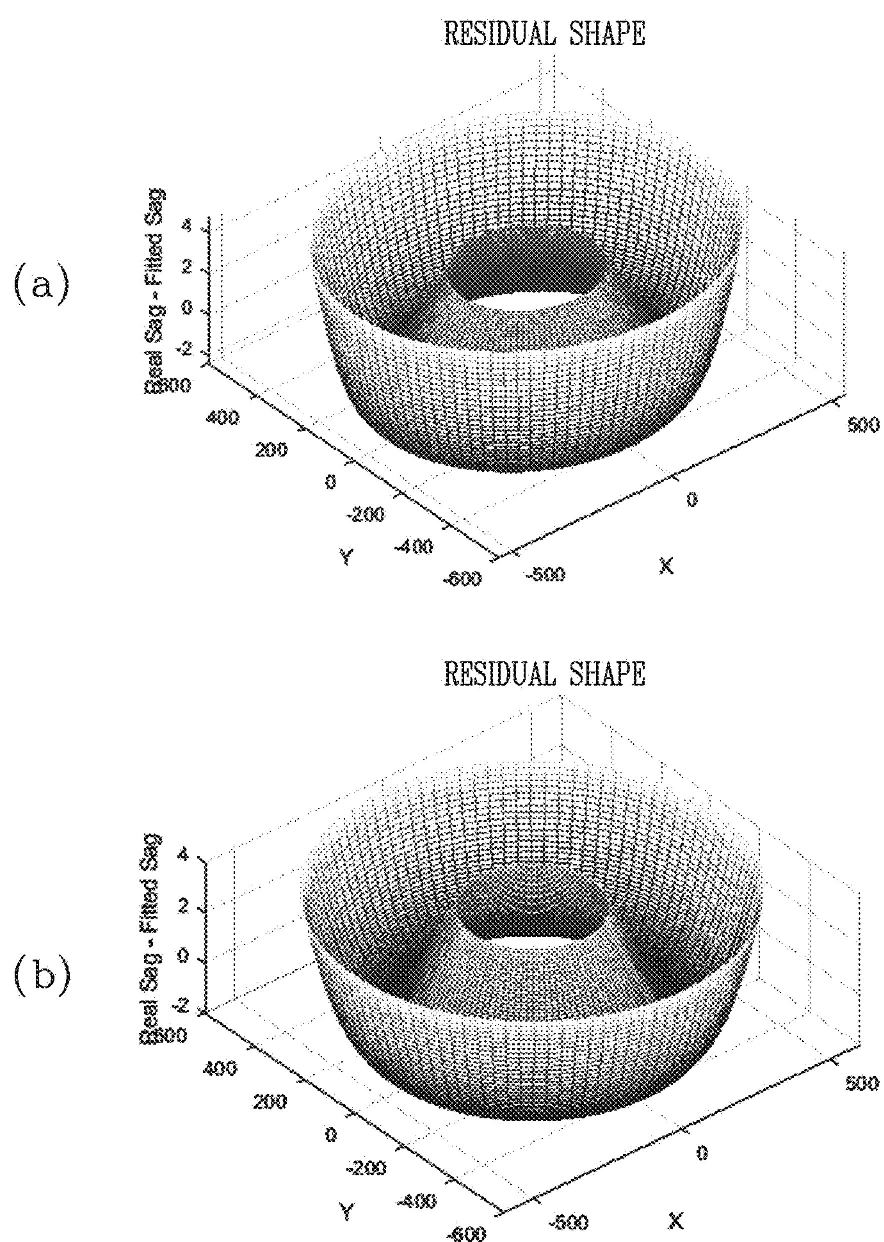

Part (a) of FIG. 14C illustrates a residual shape of the first optical mirror OPb corresponding to Example 6 (EXa6) of FIG. 8A, and part (b) of FIG. 14C illustrates a residual shape of the second optical mirror OPa corresponding to Example 6 (EXb6) of FIG. 8B.

Figure 14D:
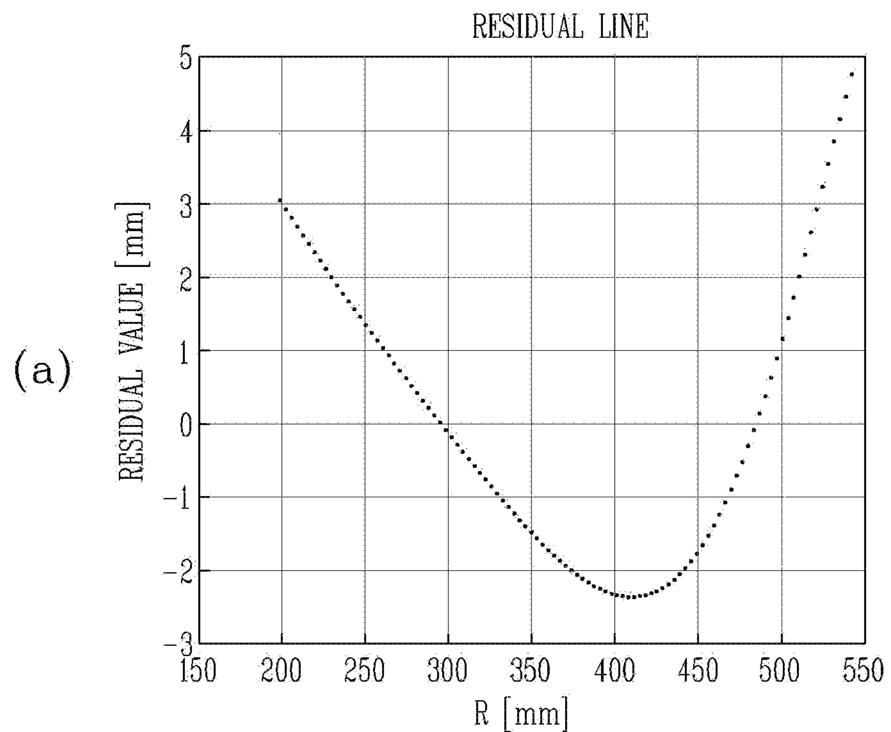
Figure 14D:
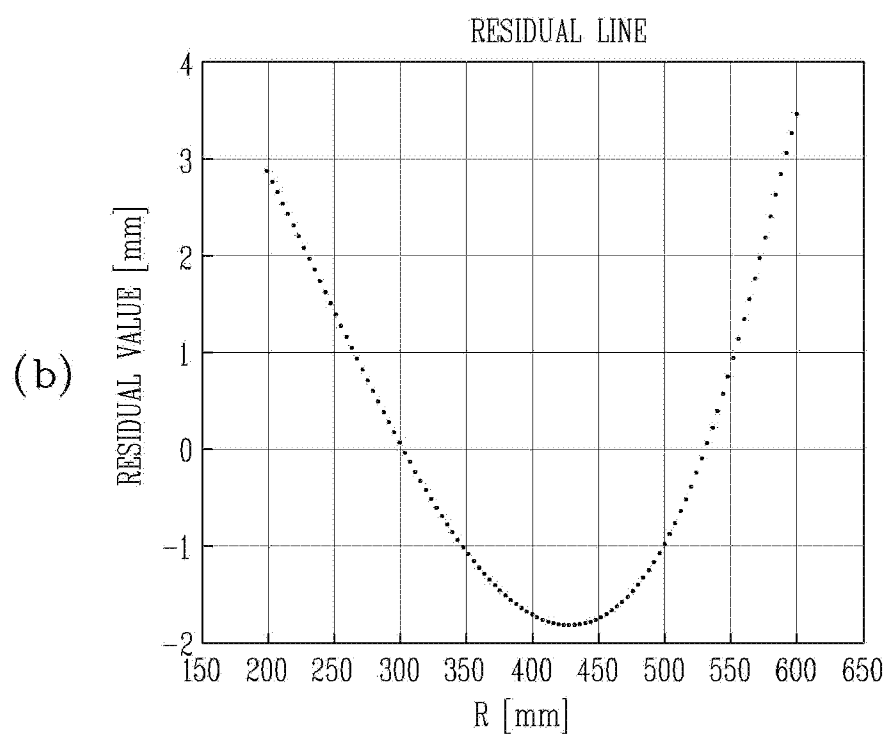

Part (a) of FIG. 14D illustrates a residual graph of the first optical mirror OPb corresponding to Example 6 (EXa6) of FIG. 8A, and part (b) of FIG. 14D illustrates a residual graph of the second optical mirror OPa corresponding to Example 6 (EXb6) of FIG. 8B.

Referring to FIG. 14D, the residual GRc that is the difference between the curved surface GRb and the parabolic surface GRa of the first optical mirror OPb is asymmetrically formed at both ends of the first optical mirror OPb.

Figure 15A:
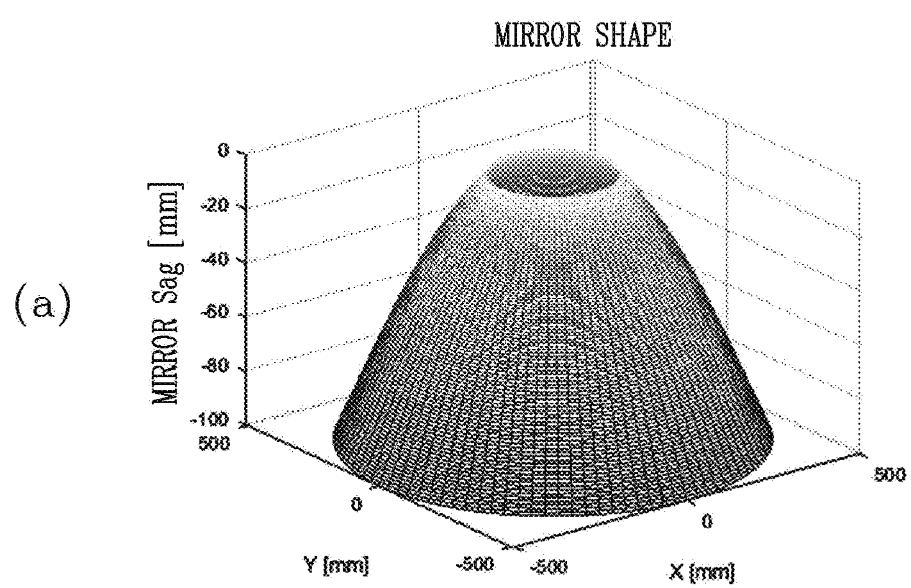
Figure 15A:
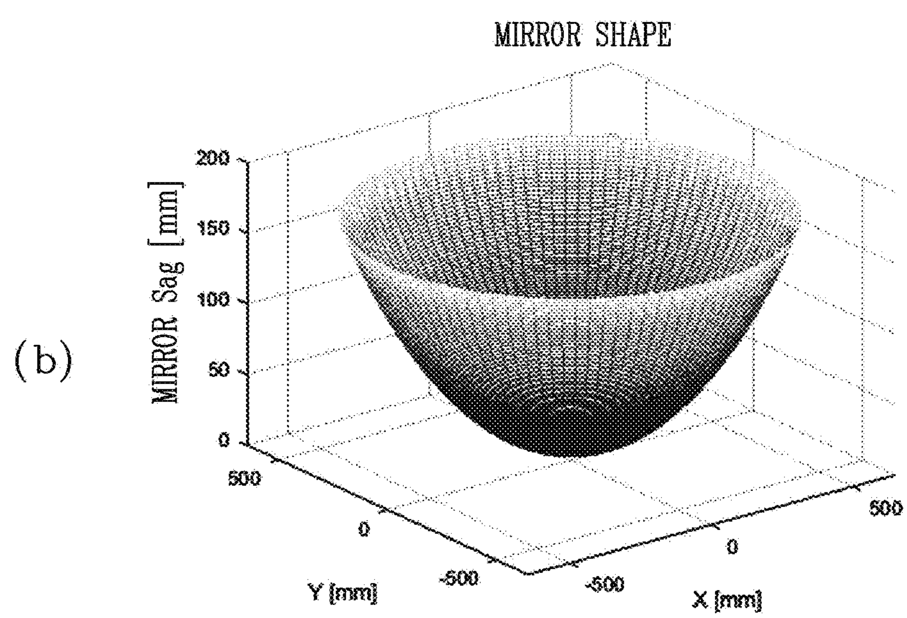

Part (a) of FIG. 15A illustrates the first optical mirror OPb corresponding to Example 7 (EXa7) of FIG. 8A, and part (b) of FIG. 15A illustrates the second optical mirror OPa corresponding to Example 7 (EXb7) of FIG. 8B.

Figure 15B:
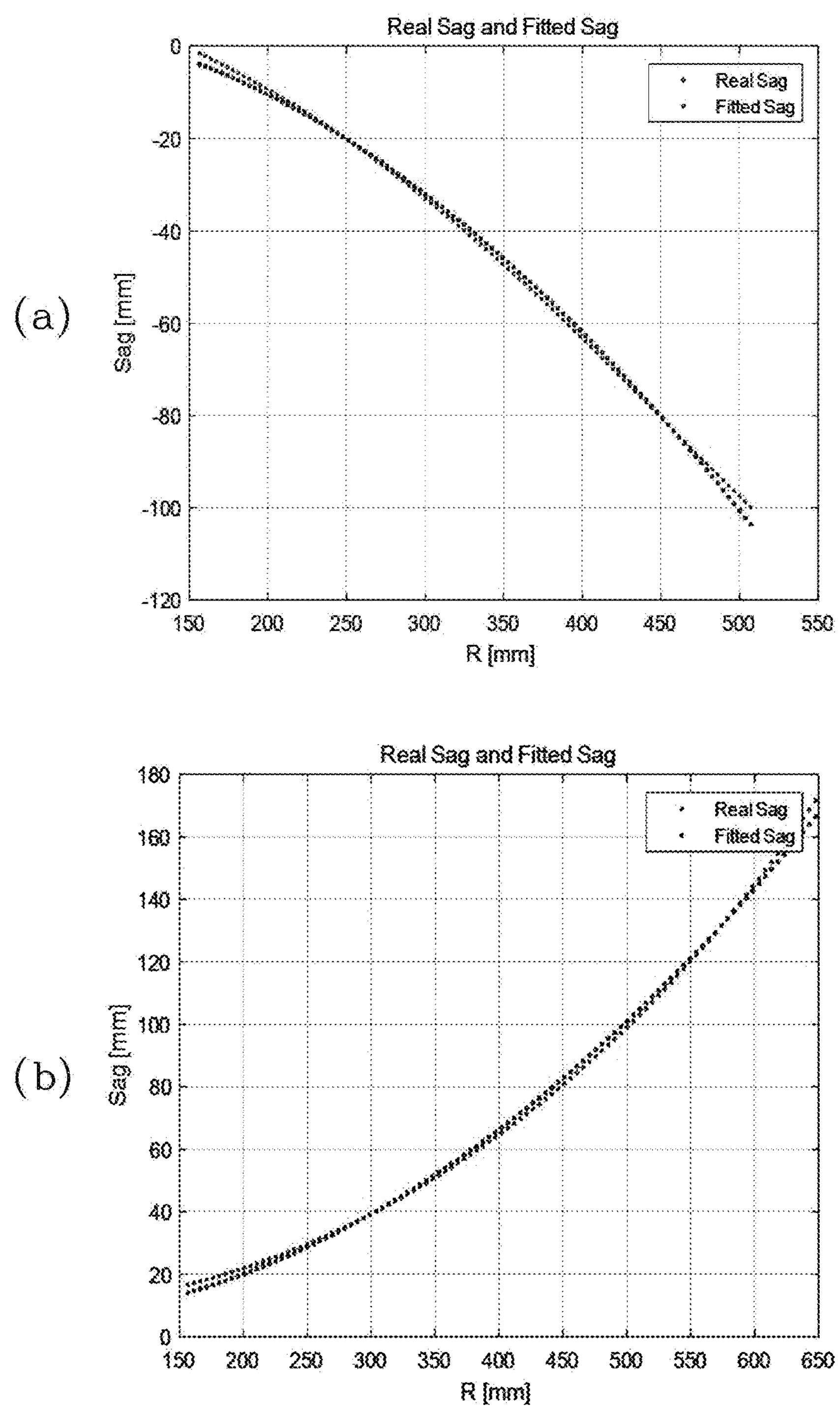

Part (a) of FIG. 15B illustrates the curved surface of the first optical mirror OPb corresponding to Example 7 (EXa7) of FIG. 8A, and part (b) of FIG. 15B illustrates the curved surface of the second optical mirror OPa corresponding to Example 7 (EXb7) of FIG. 8B.

Figure 15C:
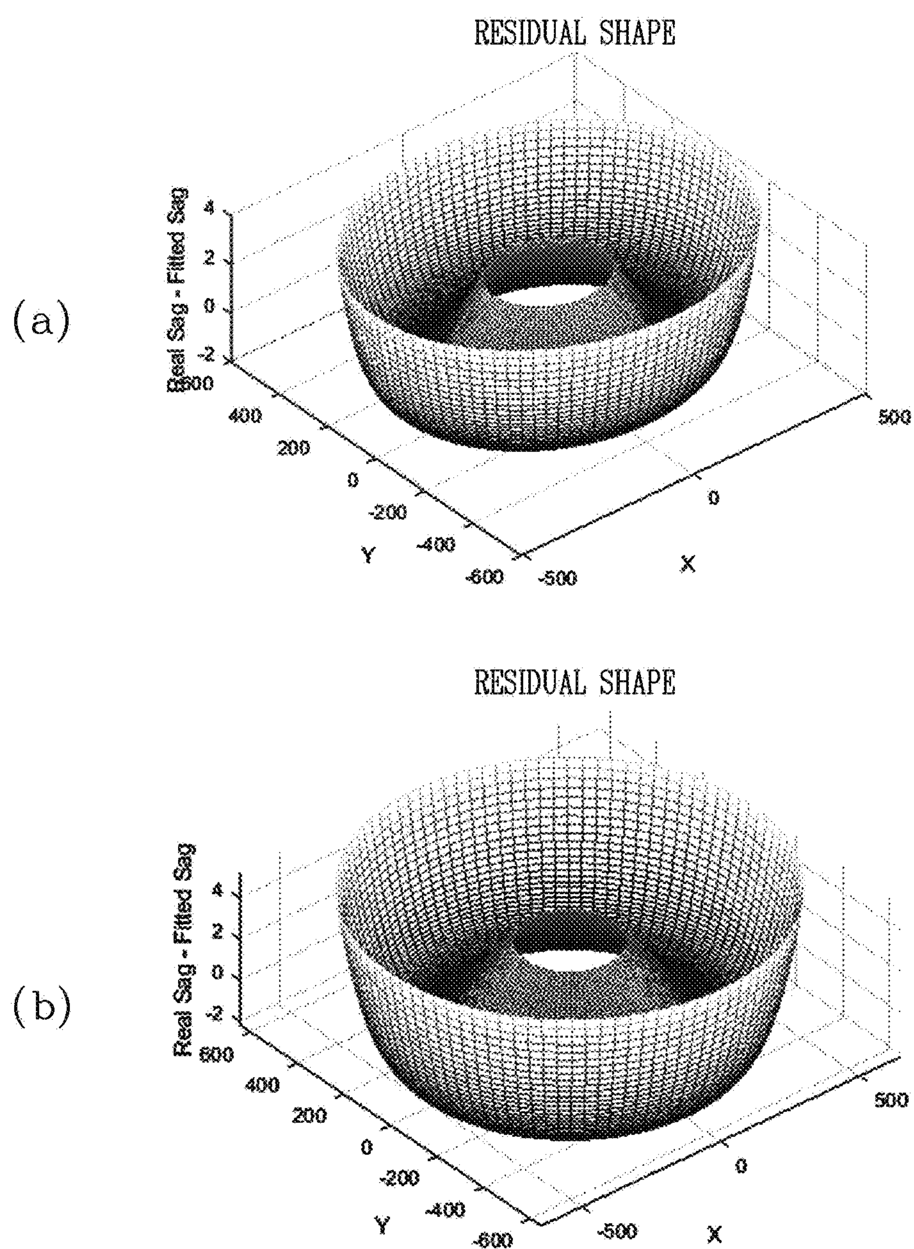

Part (a) of FIG. 15C illustrates a residual shape of the first optical mirror OPb corresponding to Example 7 (EXa7) of FIG. 8A, and part (b) of FIG. 15C illustrates a residual shape of the second optical mirror OPa corresponding to Example 7 (EXb7) of FIG. 8B.

Figure 15D:
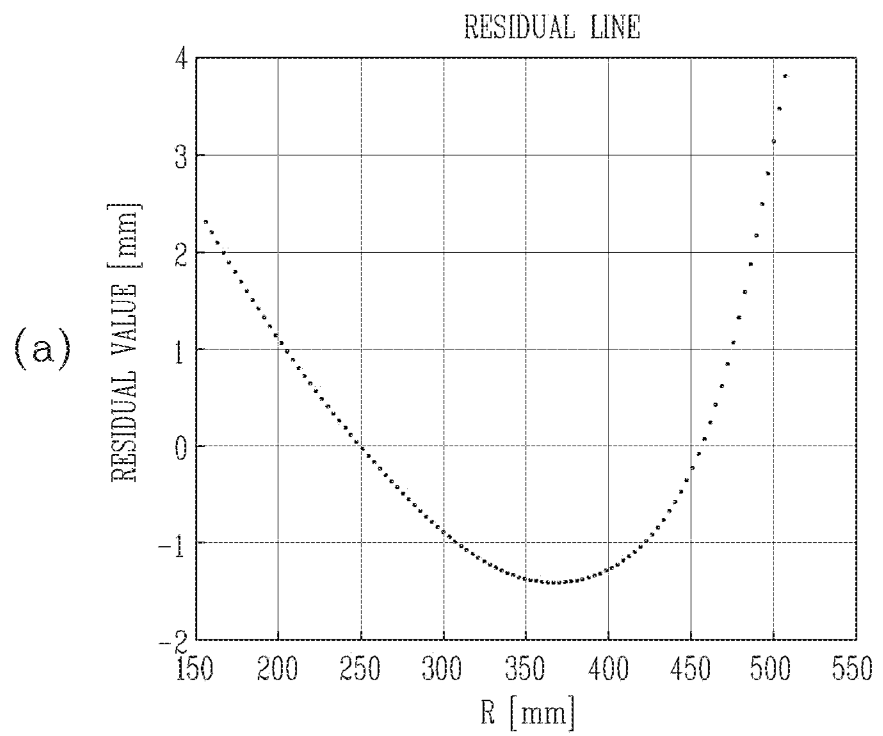
Figure 15D:
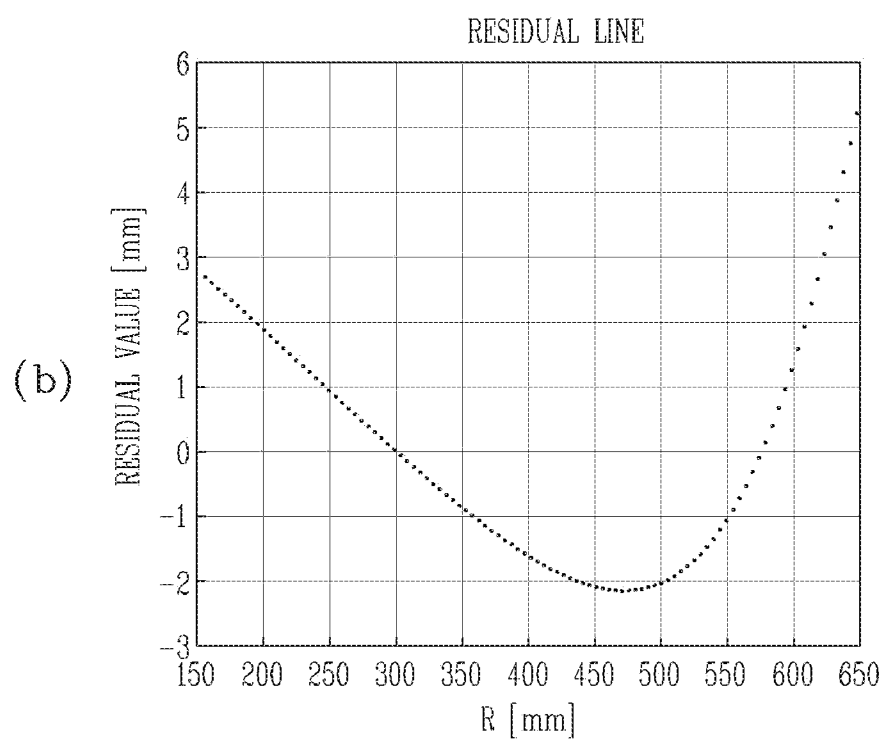

Part (a) of FIG. 15D illustrates a residual graph of the first optical mirror OPb corresponding to Example 7 (EXa7) of FIG. 8A, and part (b) of FIG. 15D illustrates a residual graph of the second optical mirror OPa corresponding to Example 7 (EXb7) of FIG. 8B.

Referring to FIG. 15D, the residual GRc that is the difference between the curved surface GRb and the parabolic surface GRa of the first optical mirror OPb is asymmetrically formed at both ends of the first optical mirror OPb.

Figure 16:
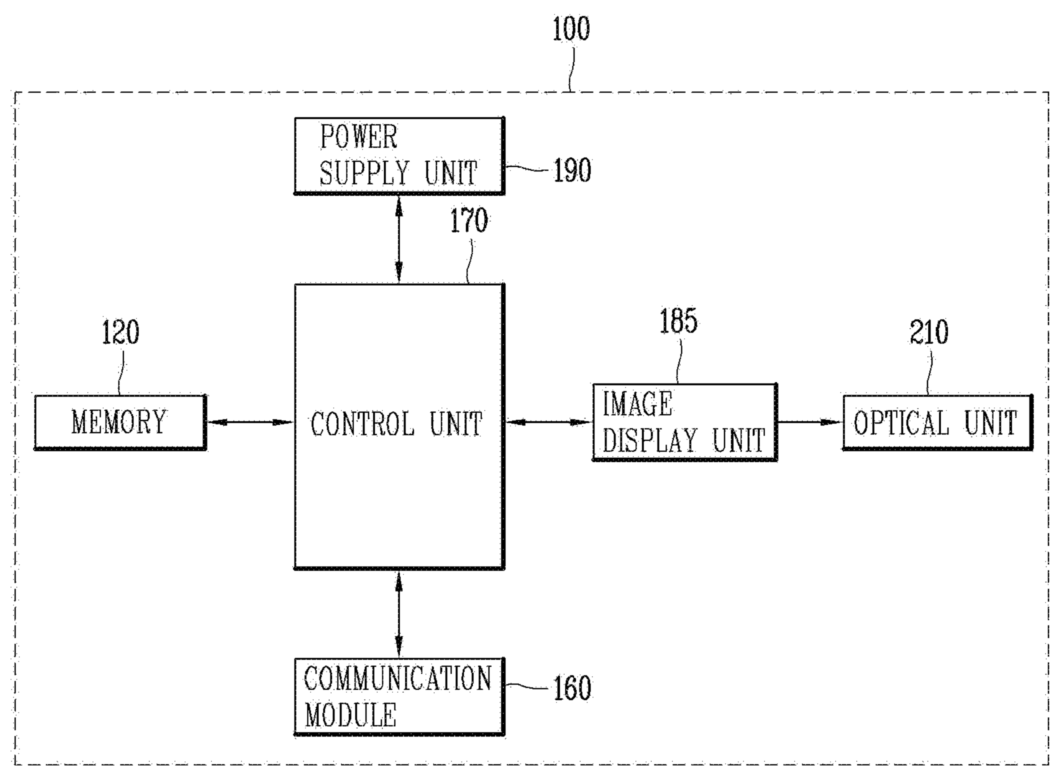
FIG. 16 is a block diagram illustrating an internal structure of the display device of FIG. 1A according to an embodiment of the present disclosure.

FIG. 16 is a block diagram illustrating an internal structure of the display device of FIG. 1A.

Referring to the drawing, the display device 100 according to the implementation can include a memory 120, a control unit 170 (e.g., a controller or a processor), a communication module 160 (e.g., communication interface or a transceiver), an image display unit 185, an optical unit 210, and a power supply unit 190, and the like.

Meanwhile, the optical unit 210 can include the first optical mirror OPb and the second optical mirror OPa.

Meanwhile, the image display unit 185 can include various display panels, such as LCD, OLED, and LED, and can display a predetermined image through the display panel.

The optical unit 210 can perform imaging for projecting an image in the air for the predetermined image displayed on the image display unit 185.

The memory 120 can store a program for processing and control of the control unit 170, and can perform a function for temporarily storing input or output data (e.g., still images, moving images, etc.).

The communication module 135 serves as an interface with all external devices or networks connected to the display device 100 by wire or wirelessly. The communication module 135 can receive data or images from such an external device or receive power to transmit to each component inside the display device 100, and transmit data inside the display device 100 to the external device.

In particular, the communication module 135 can receive a radio signal from an adjacent mobile terminal. The wireless signal can include various types of data such as a voice call signal, a video call signal, text data, image data, and the like.

To this end, the communication module 135 can include a short-range communication module. Examples of short-range communication technologies can include BLUETOOTH™, Radio Frequency IDentification (RFID), Infrared Data Association (IrDA), Ultra-WideBand (UWB), ZIGBEE, Near Field Communication (NFC) and the like.

The control unit 170 can control an overall operation of the display device 100. Specifically, the control unit 170 can control an operation of each unit in the display device 100.

The control unit 170 can control a video image stored in the memory 120 or a video image received from an external device through the communication module 135 to be output as an output image.

In particular, the control unit 170 can control the image display unit 185 to output a predetermined image. Specifically, R, G, and B signals corresponding to a video image to be displayed can be output to the image display unit 185. Accordingly, the image display unit 185 can display the predetermined image.

The power supply unit 190 can receive external power or internal power and supply power required for operating respective elements and components under the control of the control unit 170.

The power supply unit 190 supplies the corresponding power to all components of the display device 100. In particular, the power supply unit 190 can supply power to the control unit 170 that can be implemented in the form of a system on chip (SOC), the image display unit 185 for displaying an image, and an audio output unit for outputting an audio signal.

Figure 17:
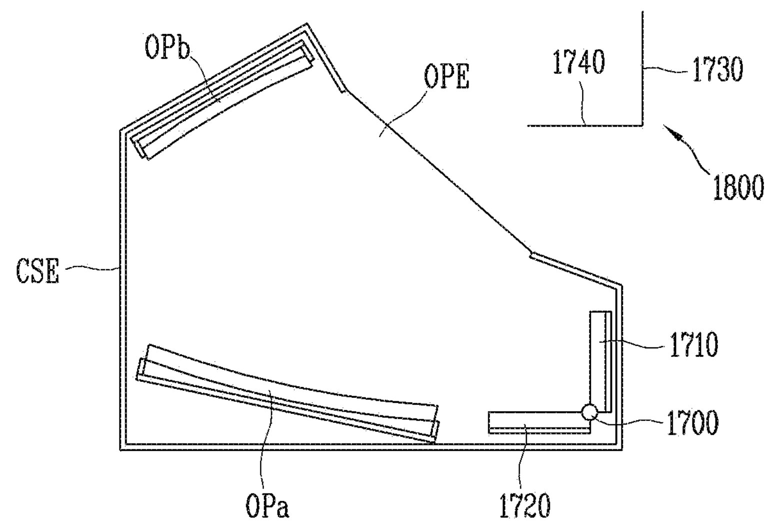
FIGS. 17 and 18 are conceptual views for explaining a floating image when an image display unit for outputting a plurality of surfaces is provided according to an embodiment of the present disclosure.
Figure 18:
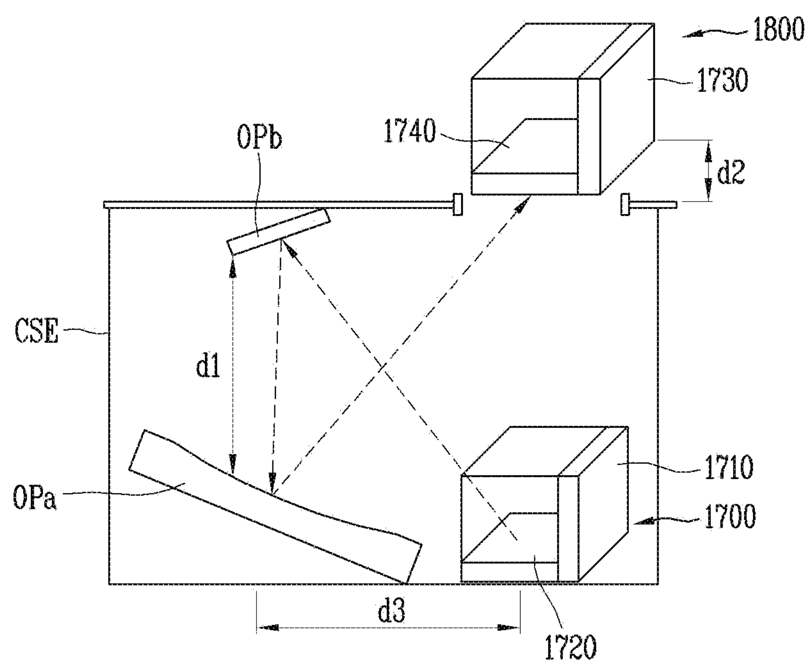

FIGS. 17 and 18 are conceptual views for explaining a floating image when an image display unit having a plurality of surfaces is provided.

Referring to FIG. 17, a display device according to an implementation can include a case CSE having an opening OPN, a first optical mirror OPb disposed on a first side in the case CSE, a second optical mirror OPa disposed on a second side in the case CSE and located under the first optical mirror OPb, and an image display unit 1700 disposed on a third side in the case and having a plurality of surfaces for outputting images. For example, centers of the first optical mirror OPb, second optical mirror OPa and the image display unit 1700 can form a triangle.

The image display unit 1700 can be the image display unit 185 described above.

The image display unit 1700 can be disposed on a position where the aforementioned object OBJ is located.

The image display unit 1700 can include a plurality of surfaces 1710 and 1720, and the plurality of surfaces 1710 and 1720 can refer to output surfaces outputting images independently or dependently. The plurality of surfaces 1710 and 1720 can include two flat surfaces arranged perpendicular to each other.

Images 1730 and 1740 output on the plurality of surfaces can be reflected by the first optical mirror OPb and the second optical mirror OPa and merged (synthesized) with each other to be displayed in a space between the opening OPN and the viewer.

Specifically, as illustrated in FIG. 18, the images 1730 and 1740 output on the plurality of surfaces 1710 and 1720 can be merged in a state of floating at a predetermined height d2 from the opening OPN of the case CSE, thereby generating (producing) a floating image IM (e.g., a hologram).

The plurality of surfaces can include a first display 1710 and a second display 7120.

The first display panel 1730 can display the first image 1730.

The second display 1720 can display the second image 1740.

The first image 1730 and the second image 1740 can be merged into a floating image 1800 in the space floating from the opening OPN by the predetermined height d2.

In this situation, the first image 1730 output on the first display 1710 can be an image in which perspective is reflected, and the second image 1740 output from the second display 1720 can be an image representing a background of the first image 1730.

As described above, the display device of the present disclosure can implement a three-dimensional image on a mirage by using two display surfaces (e.g., a type of hologram). In terms of hardware, a physical sense of depth can be produced by floating a volume, and in terms of software, a psychological depth can be realized by a video production technology in which a sense of perspective is reflected.

Accordingly, the display device of the present disclosure can obtain an effect of preventing resolution or brightness (luminance) from being lowered, compared to a situation of using a general display.

Figure 19:
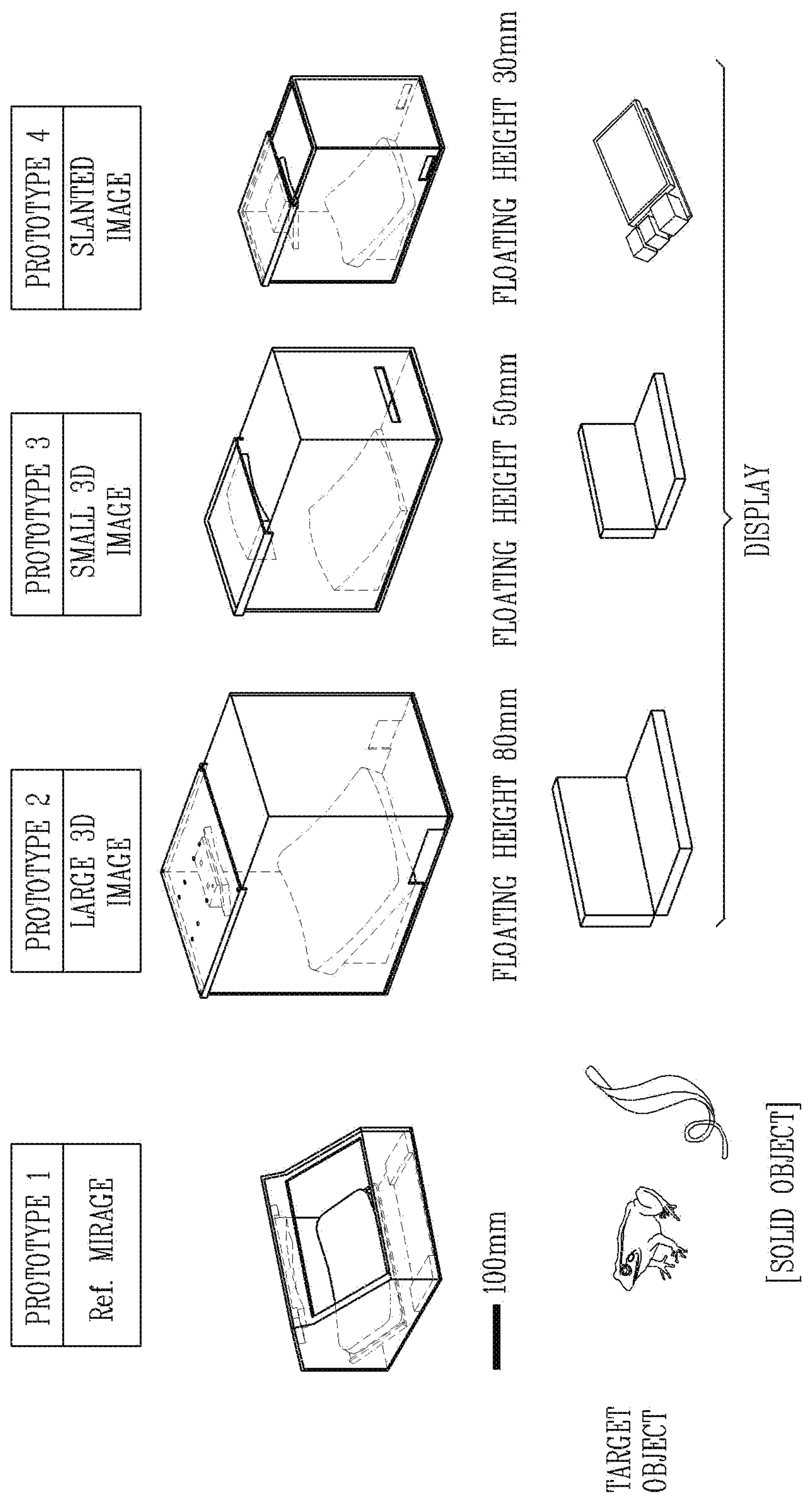
FIG. 19 is a conceptual view for explaining that a size of a case varies depending on type and size of an image display unit according to embodiments of the present disclosure.

FIG. 19 is a conceptual view for explaining that a size of a case varies depending on type and size of an image display unit.

Referring to FIG. 19, the case CSE can be configured such that at least one of size and type thereof varies depending on a type of an image display unit (or object).

As illustrated in FIG. 19, the image display unit can include at least one of a solid object, a multi-display having a plurality of surfaces, and a single display having one surface.

Referring to Prototypes 2 and 3, a size of a case can increase as a size of an image display unit increases.

Also, as in Prototype 2, when the image display unit has a first size, a floating height at which a floating image is displayed can have a first height (e.g., 80 mm). On the other hand, when the image display unit has a second size smaller than the first size, the floating height at which the floating image is displayed can have a second height (e.g., 50 mm) less than the first height.

The floating height can mean a height at which the floating image is output from the opening.

Also, referring to Prototypes 1 and 2, a type of the case can vary depending on a type of the image display unit (whether it is an object or a display).

For example, when the type of the image display unit is a first type (e.g., object), the case can have a first shape, and when the type of the image display unit is a second type (e.g., a multi-display), the case can have a second shape different from the first shape.

Figure 20:
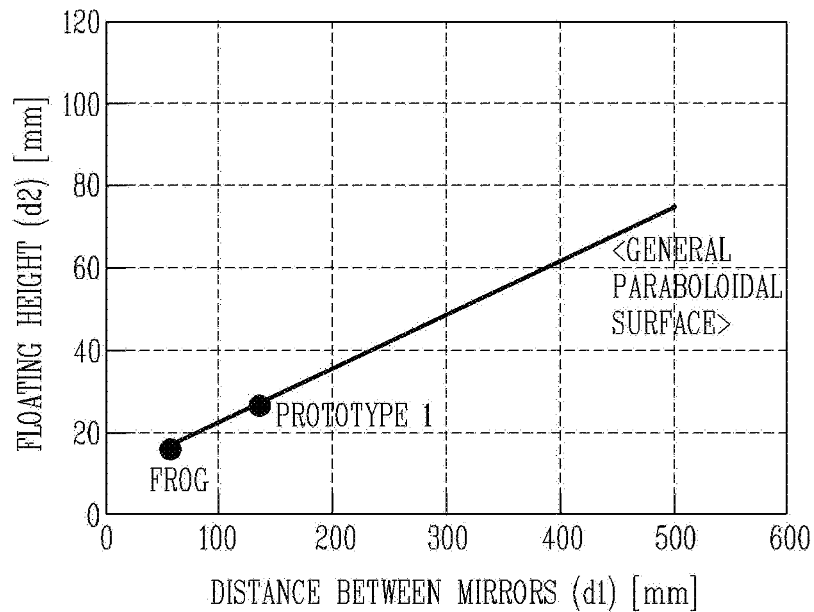
FIGS. 20 and 21 are graphs for explaining relationship of a distance between mirrors, a floating height, and a distance between an object and a mirror according to embodiments of the present disclosure.
Figure 20:
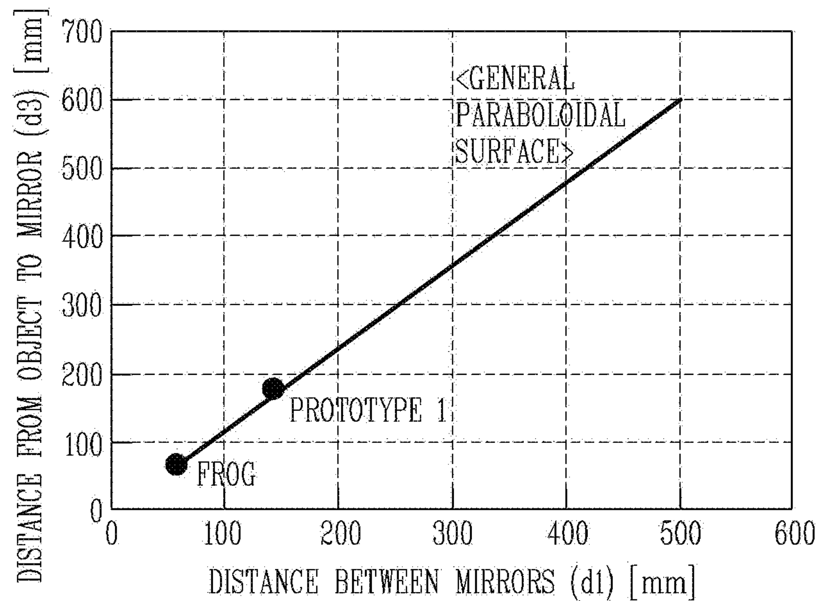
Figure 21:
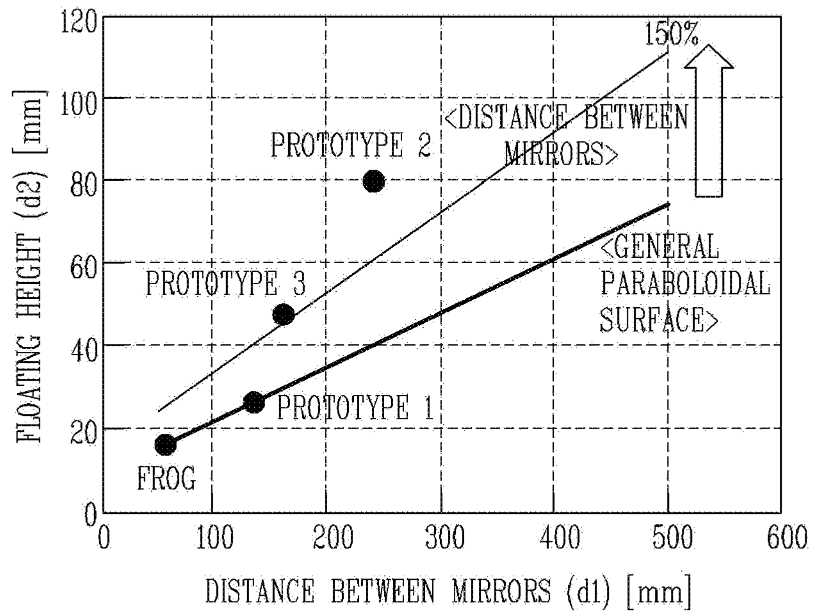
Figure 21:
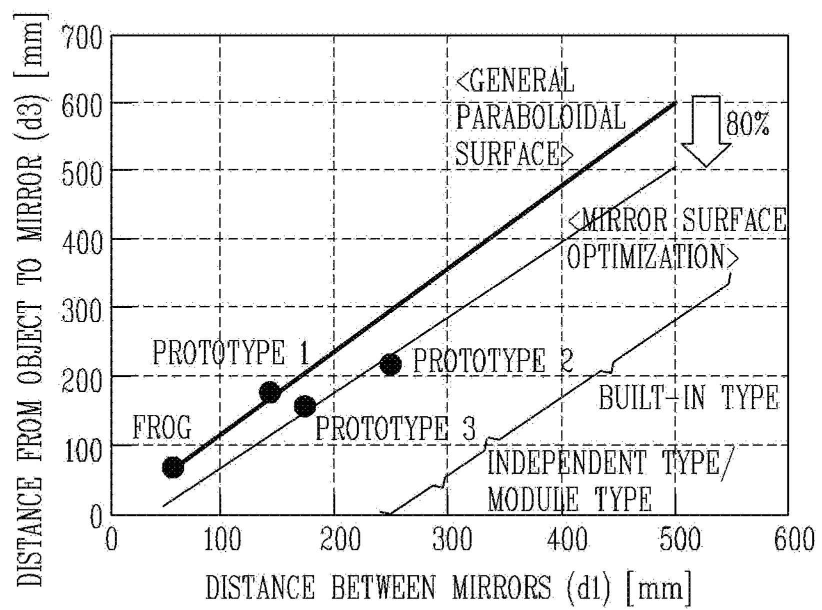

FIGS. 20 and 21 are graphs for explaining relationship of a distance between mirrors, a floating height, and a distance between an object and a mirror.

First, referring to FIG. 18, a distance between the first optical mirror OPb and the second optical mirror OPa is defined as a first distance d1, a height at which a floating image 1800 is output from the opening is defined as a second distance d2, and a distance from an object to a mirror (the second optical mirror OPa) is defined as a third distance d3.

Referring to part (a) of FIG. 20, the height (second distance) d2 from the opening through which images output from the plurality of surfaces are output can increase in proportion to the distance (first distance) d1 between the first optical mirror and the second optical mirror.

Also, referring to part (b) of FIG. 20, the third distance d3 between the second optical mirror and the image display unit for outputting the images output from the plurality of surfaces at the predetermined height from the opening can be proportional to the first distance d1 between the first optical mirror and the second optical mirror.

Meanwhile, referring to part (a) of FIG. 21, the height (second distance) d2 from the opening through which the images output from the plurality of surfaces are output can increase, in response to changes in curvatures of the first optical mirror and the second optical mirror, even if the distance (first distance) d1 between the first optical mirror and the second optical mirror is maintained.

That is, in the display device of the present disclosure, even if the distance d1 between the mirrors is the same, the height d2 from the opening can be increased by optimized curvatures of the mirrors.

Also, referring to part (b) of FIG. 21, the third distance (the distance from the object to the mirror) can be reduced compared to the same first distance the same distance d1 between the mirrors) based on the changes in the curvatures of the first optical mirror and the second optical mirror.

That is, in the display device of the present disclosure, even if the distance d1 between the mirrors is the same, the third distance d3 from the object to the mirror can be reduced by the optimized curvature of the mirror. This can reduce the size of the case (specifically, a horizontal or vertical width corresponding to the distance from the object to the mirror) while maintaining the floating height d2.

FIGS. 22, 23, 24, 25 and 26 are conceptual views illustrating implementations in which a display device according to one implementation is applied to an external device.

The display device of the present disclosure can be provided (or mounted) on at least one of a vehicle and a home appliance.

A type of an image display unit 1700 can be determined based on at least one of a vehicle and a home appliance on which the display device is mounted.

Figure 22:
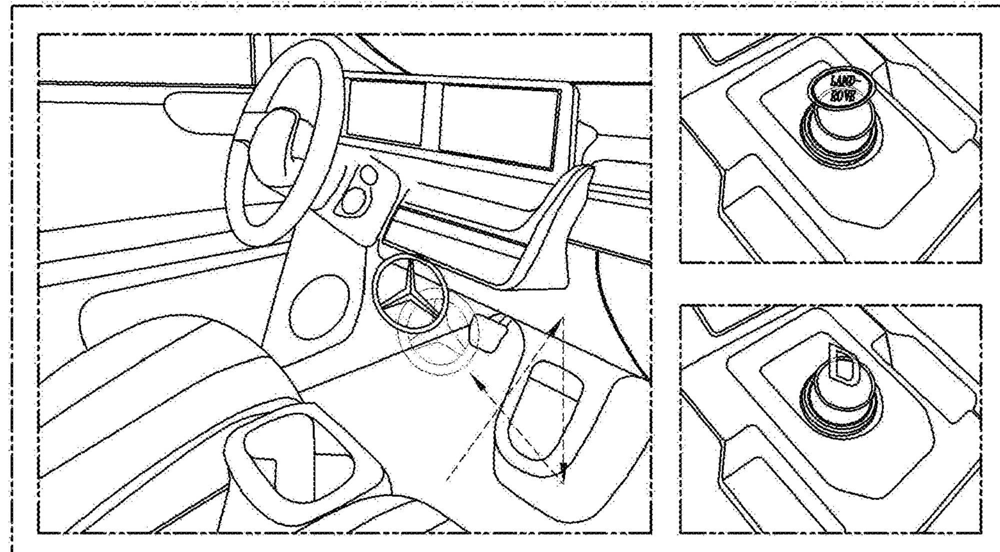
FIGS. 22, 23, 24, 25, and 26 are conceptual views illustrating implementations in which a display device is applied to external devices according to embodiments of the present disclosure.
Figure 22:
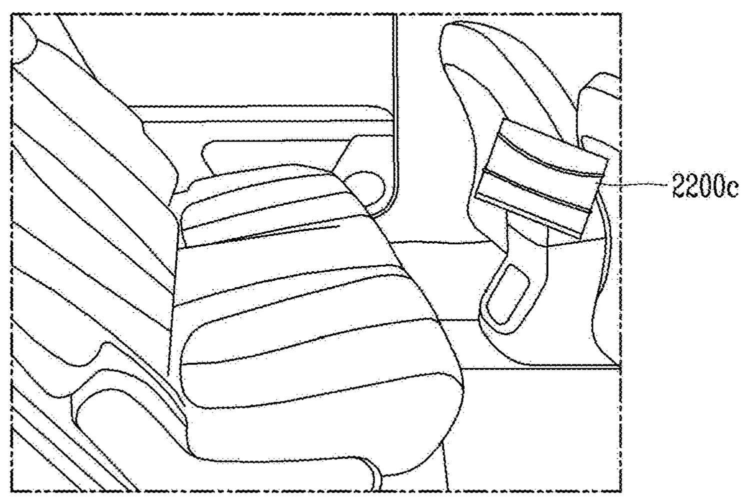
Figure 22:
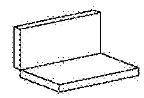

For example, as illustrated in part (a) of FIG. 22, the display device can be disposed (or mounted) on a portion of the vehicle, to output a brand image or logo (or, trademark or emblem) of the vehicle or a media image 2200*c* as a floating image.

As one example, the display device can use an object or a multi-display as an image display unit to output a brand image, and can use the multi-display to output the media image 2200*c*.

Figure 23:
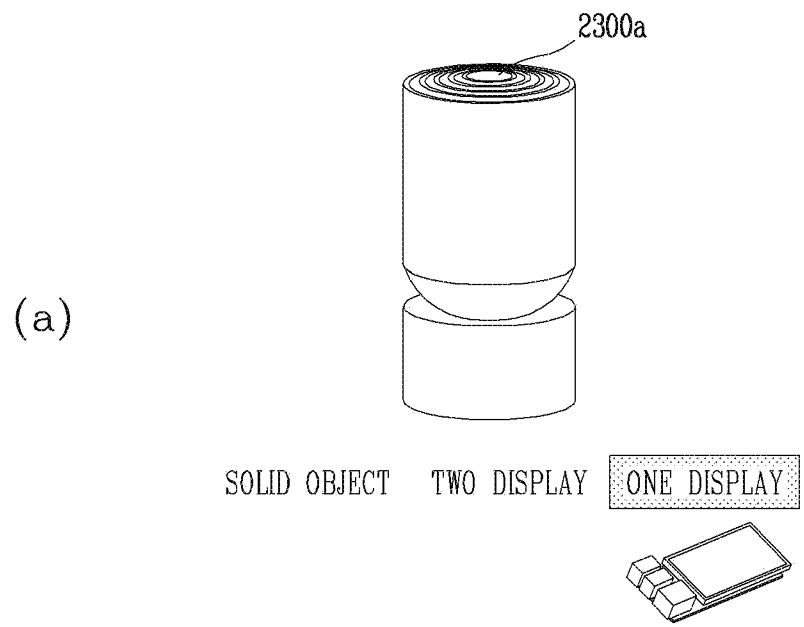
Figure 23:
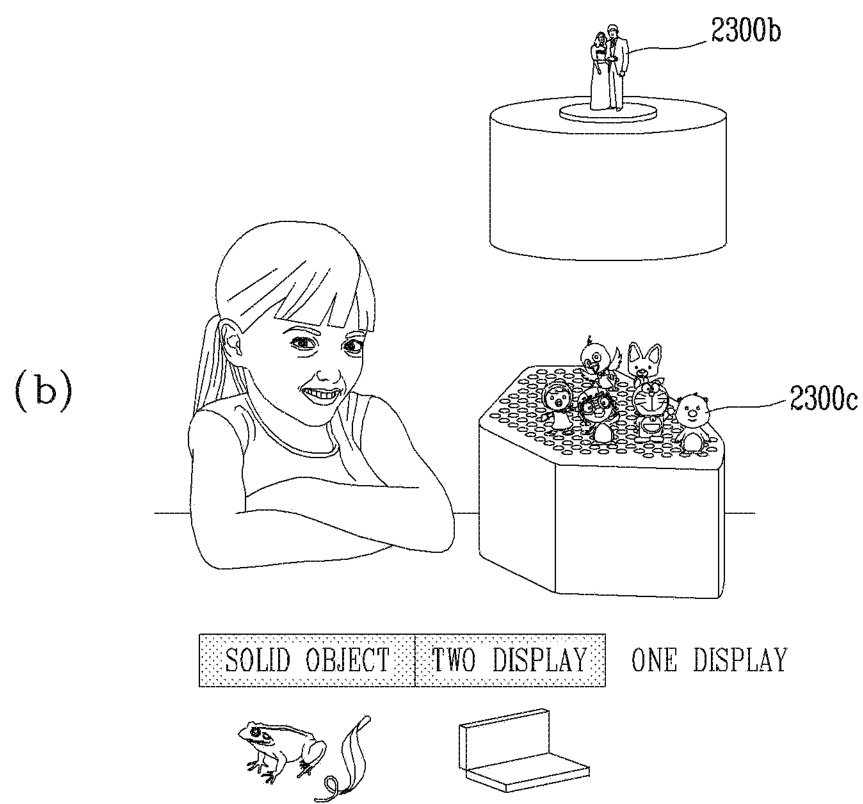

As illustrated in part (a) of FIG. 23, the display device can be disposed on a speaker to output a wave image 2300*a*, which is an image representing an output of sound, as a floating image (e.g., a moving visual equalizer effect or dancing avatar). In this situation, the image display unit can use a single display.

As illustrated in part (b) of FIG. 23, the display device can be disposed on a speaker to output a floating image 2300*b* suitable for a music genre, or output an image 2300*c* as a floating image to give an effect as if a character lives in the speaker (e.g., a dancing character or avatar). In this situation, the image display unit can use an object or a multi-display.

Figure 24:
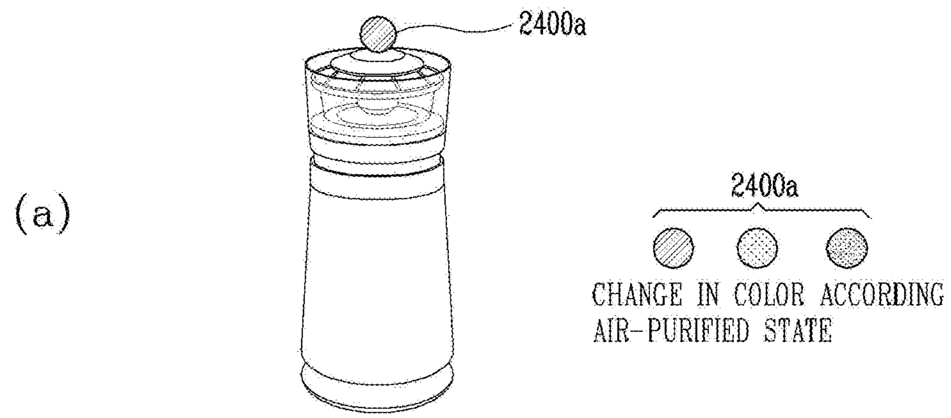
Figure 24:
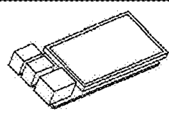
Figure 24:
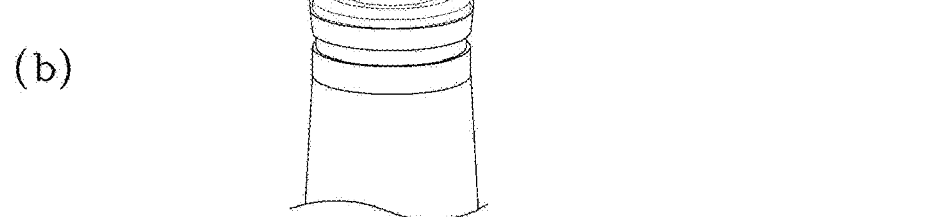
Figure 24:
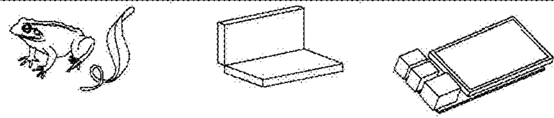
Figure 24:
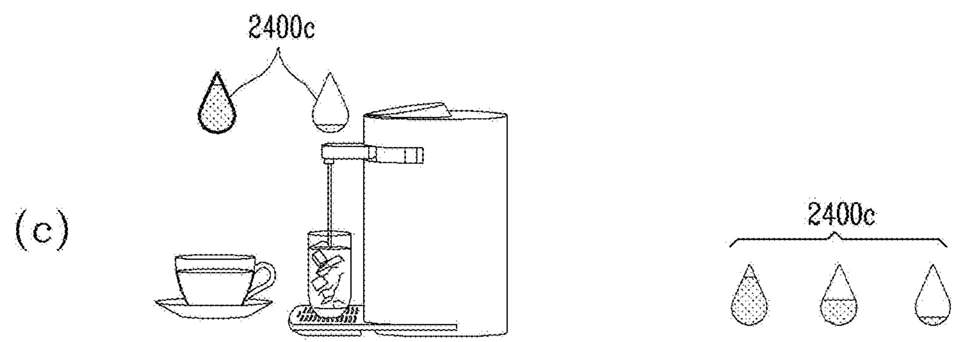

As illustrated in part (a) of FIG. 24, the display device can be disposed on an air purifier, and in this situation, can output an image 2400*a*, which changes in color according to an air purified state, as a floating image (e.g., green, red or blue, etc.). In this situation, the image display unit can use a single display.

As illustrated in part (b) of FIG. 24, the display device can be disposed on a humidifier, and in this situation, can output an animation image 2400*b*, in which a water level rises when the humidifier is filled with water, as a floating image. In this situation, the image display unit can use an object, a multi-display, or a single display.

As illustrated in part (c) of FIG. 24, the display device can be provided on a water purifier, and in this situation, can output an image 2400*c*, which changes in color according to a color of a water droplet, as a floating image. The image 2400*c* can express a capacity of water purification by a change in an image in which a water droplet is getting empty. In this situation, the image display unit can use an object or a single display.

Figure 25:
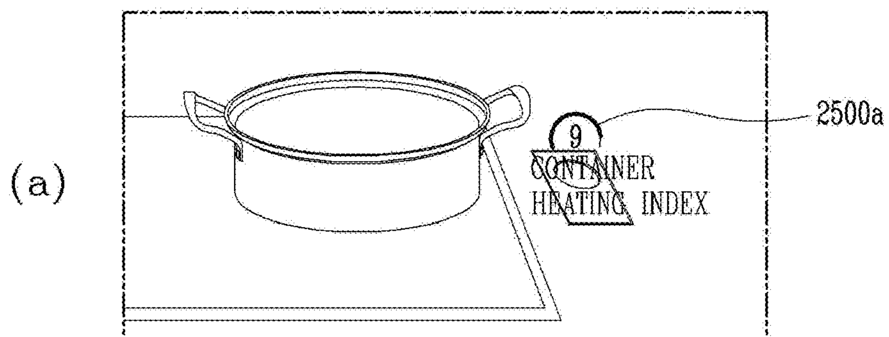
Figure 25:
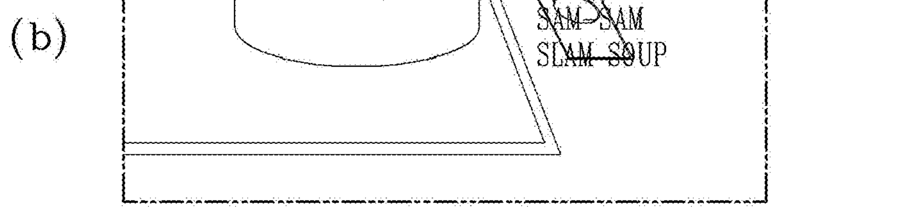
Figure 25:
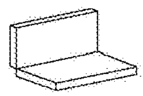
Figure 25:
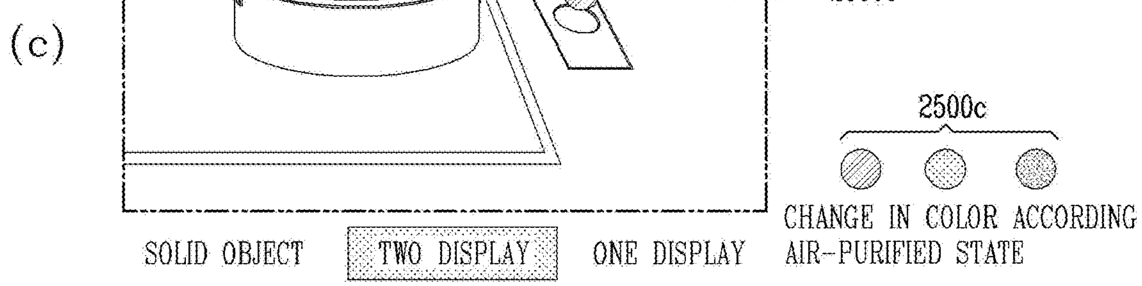

As illustrated in parts (a) to (c) of FIG. 25, the display device can be installed on an induction range or near it. In this situation, the display device can output, as a floating image, an image 2500*a* indicating a container heating index, an image 2500*b* indicating recognized food ingredients (or a meal kit), or an image 2500*c* indicating an air condition around the induction range.

The image 2500*a* indicating the container heating index can be replaced with a guide image for guiding a pot, which has an inappropriate size for a fire ball or heating element of the induction range, when the pot is placed on the fire ball or the heating element of the induction range.

The image 2500*b* indicating the recognized food ingredients can include an image which shows a keyword indicating a cooking order during cooking.

Accordingly, the display device according to the present disclosure can enhance use efficiency of the induction range by providing information appropriate for situations, and help a cooking process by intuitively delivering a recipe step-by-step displayed as a hologram.

Figure 26:
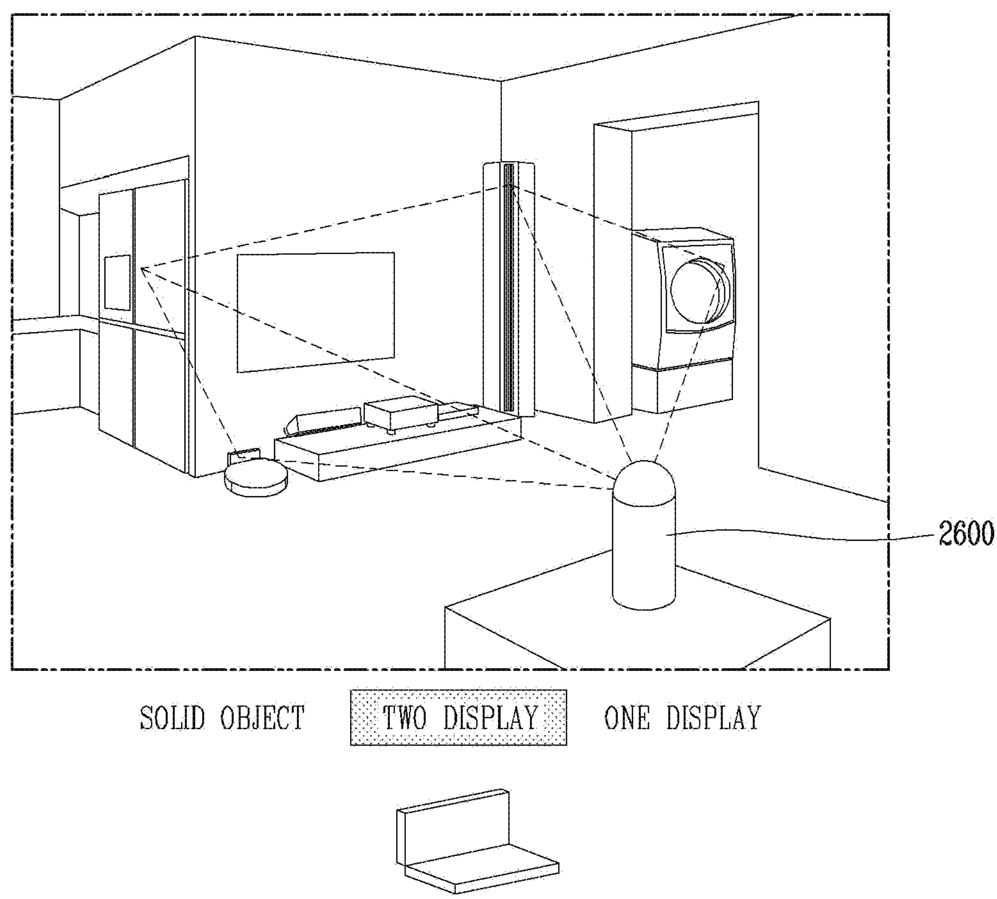

In addition, the display device of the present disclosure can be provided in a hub 2600 of IoT (e.g., a smart speaker device), as illustrated in FIG. 26. In this situation, the display device can output an image of a home appliance that is being operated or a home appliance that is intended to perform communication or control, as a floating image.

In the above, preferred implementations of the present disclosure have been illustrated and described, but the present disclosure is not limited to the specific implementations described above, and it is common in the technical field to which the present disclosure pertains that various modifications can be made without departing from the gist of the present disclosure as appended in the claims, and these modifications should not be understood individually from the technical scope or perspective of the present disclosure.

The invention claimed is:

1. A display device comprising:

a case having an opening;

a first optical mirror disposed on a first side within the case;

a second optical mirror disposed on a second side within the case and located under the first optical mirror; and an image display unit disposed on a third side within the case and having a plurality of surfaces for outputting images, wherein the first optical mirror and the second optical mirror are configured to reflect the images output by the plurality of the surfaces of the image display unit and merge the images together to display a combined image at a space located between the opening and a viewer, wherein a second distance between the second optical mirror and the image display unit is proportional to a first distance between the first optical mirror and the second optical mirror for displaying the combined image at a predetermined height, and wherein the second optical mirror is larger than the first optical mirror.

2. The display device of claim 1, wherein the images are merged into a state of floating at a predetermined height above the opening of the case, to be output as a floating image.

3. The display device of claim 1, wherein the plurality of surfaces of the image display unit include a first display and a second display, wherein the first display is configured to output a first image, wherein the second display is configured to output a second image, and wherein the first image and the second image are merged in a space floating by a predetermined height above the opening to produce a floating image.

4. The display device of claim 3, wherein the first image output to the first display is an image in which perspective or depth is reflected, and wherein the second image output to the second display is an image representing a background of the first image.

5. The display device of claim 1, wherein at least one of a size of the case and a type of the case varies depending on a type of the image display unit.

6. The display device of claim 5, wherein the image display unit comprises at least one of an object, a multi-display having a plurality of display surfaces, and a single display having one display surface.

7. The display device of claim 5, wherein the size of the case increases as a size of the image display unit increases.

8. The display device of claim 1, wherein the combined image is displayed at a height above the opening that increases in proportion to a distance between the first optical mirror and the second optical mirror.

9. The display device of claim 8, wherein the combined image is displayed at a height above that becomes higher as curvatures of the first optical mirror and the second optical mirror vary, while the distance between the first optical mirror and the second optical mirror is maintained.

10. The display device of claim 1, wherein the second distance is reduced, compared to the same first distance, based on changes in curvatures of the first optical mirror and the second optical mirror while the predetermined height is maintained.

11. The display device of claim 1, wherein the display device is disposed on at least one of a vehicle and a home appliance.

12. The display device of claim 11, wherein a type of the image display unit is determined based on the at least one of the vehicle and the home appliance on which the display device is mounted.

13. The display device of claim 1, wherein the first optical mirror is located at an upper rear area inside of the case, wherein the second optical mirror is located at a lower rear area inside of the case, and wherein the image display unit is located at a lower front area inside of the case.

14. The display device of claim 1, wherein the first optical mirror is a freeform type of mirror having a first non-symmetric optical surface, and wherein the second optical mirror is a freeform type of mirror having a second non-symmetric optical surface.

15. The display device of claim 14, wherein the first non-symmetric optical surface has different curvatures than the second non-symmetric optical surface.

16. The display device of claim 1, wherein a first ratio of a distance from a midpoint of a first residual of the first optical mirror having a lowest level, among points in the first residual, to a first end of the first optical mirror is in a range of 0.5 to 0.65, and wherein the first residual is a difference between a curved surface of the first optical mirror and a parabolic surface.

17. The display device of claim 1, wherein a second ratio of a distance from a midpoint of a second residual of the second optical mirror having a lowest level, among points in the second residual, to a first end of the second optical mirror is in a range of 0.5 to 0.65, and wherein the second residual is a difference between a curved surface of the second optical mirror and a parabolic surface.

18. A display device comprising:

a first optical mirror;

a second optical mirror located under the first optical mirror; and an image display unit having a plurality of surfaces for outputting images, wherein a center of the first optical mirror, a center of the second optical mirror and a center of the image display unit form a triangle, wherein the first optical mirror and the second optical mirror are configured to reflect the images output by the plurality of the surfaces of the image display unit and merge the images together to display a combined image floating at a space above the image display unit, wherein a second distance between the second optical mirror and the image display unit is proportional to a first distance between the first optical mirror and the second optical mirror for displaying the combined image at a predetermined height, and wherein the second optical mirror is larger than the first optical mirror.

19. The display device of claim 18, wherein the first optical mirror is a freeform type of mirror having a first non-symmetric optical surface, and wherein the second optical mirror is a freeform type of mirror having a second non-symmetric optical surface.

20. A display device comprising:

a case having an opening;

a first optical mirror disposed at an upper rear area within the case;

a second optical mirror disposed at a lower rear area within the case and located under the first optical mirror; and an image display unit disposed at a lower front area within the case and having a plurality of surfaces for outputting images, wherein the first optical mirror and the second optical mirror are configured to reflect the images output by the plurality of the surfaces of the image display unit and merge the images together to display a combined image at a space located between the opening and a viewer, wherein a second distance between the second optical mirror and the image display unit is proportional to a first distance between the first optical mirror and the second optical mirror for displaying the combined image at a predetermined height, and wherein the second optical mirror is larger than the first optical mirror.

21. The display device of claim 20, wherein the plurality of surfaces can include two flat surfaces arranged perpendicular to each other.

* * * * *